US010288309B2

(12) United States Patent
Svendsen

(10) Patent No.: US 10,288,309 B2
(45) Date of Patent: **\*May 14, 2019**

(54) METHOD AND SYSTEM FOR DETERMINING COMPARATIVE USAGE INFORMATION AT A SERVER DEVICE

(71) Applicant: Hugh Blake Svendsen, Chapel Hill, NC (US)

(72) Inventor: Hugh Blake Svendsen, Chapel Hill, NC (US)

(73) Assignee: Ikorongo Technology, LLC, Chapel Hill, NC (US)

( \* ) Notice: Subject to any disclaimer, the term of this patent is extended or adjusted under 35 U.S.C. 154(b) by 112 days.

This patent is subject to a terminal disclaimer.

(21) Appl. No.: 15/464,440

(22) Filed: Mar. 21, 2017

(65) Prior Publication Data

US 2017/0205102 A1  Jul. 20, 2017

Related U.S. Application Data

(63) Continuation of application No. 15/212,417, filed on Jul. 18, 2016, now Pat. No. 9,702,582.

(Continued)

(51) Int. Cl.
*G06F 19/00* (2018.01)
*F24F 11/62* (2018.01)
(Continued)

(52) U.S. Cl.
CPC .............. *F24F 11/62* (2018.01); *F24F 11/30* (2018.01); *G05B 15/02* (2013.01); *G05B 19/048* (2013.01);
(Continued)

(58) Field of Classification Search
CPC ........ F24F 11/62; F24F 11/30; F24F 2110/00; F24F 11/63; F24F 11/56; F24F 11/58;
(Continued)

(56) References Cited

U.S. PATENT DOCUMENTS 4,223,831 A   9/1980 Szarka
4,276,925 A   7/1981 Palmieri
(Continued)

FOREIGN PATENT DOCUMENTS

CA      2202008 C       2/2000
DE      19609390 A1     9/1997
(Continued)

OTHER PUBLICATIONS

Skerlos, Steven, Interactive Home Energy Monitor, Fall 2013, 30 pages.

(Continued)

*Primary Examiner* — Michael D Masinick

(57) ABSTRACT

Methods, devices, and computer readable medium are described for receiving from a thermostat device at a server device climate system usage information and settings and sending from the server device ecorank information, wherein the ecorank information is derived from a comparison of usage of climate systems controlled by the thermostat device in comparison to a comparison group, the comparison group comprising other climate systems controlled by other thermostat devices. The comparison group is determined based on profile information describing the dwelling, dwelling size, dwelling location, dwelling occupants, climate system technology, and related information. In some embodiments, the ecorank information may be one or more of a numerical score, percentage, graphic, icon, color, letter, and an audio item. In some embodiments, the energy consumed by the climate systems may be reported by an associated energy measurement device or estimated by heating and cooling usage hours.

31 Claims, 55 Drawing Sheets

COMPUTING ECORANK

| Dwelling ID | City | State | Average Cool Setting | Average Heat Setting | Hours Cooling | Hours Heating | Total Hours | Energy Consumption | Ecorank |
|---|---|---|---|---|---|---|---|---|---|
| 28 | Bethlehem | PA | 85 | 63 | 0 | 7 | 7 | 735 | 100 |
| 13 | San Diego | CA | 80 | 66 | 6 | 6 | 12 | 1260 | 90 |
| 7 | Lubbuck | TX | 83 | 69 | 6 | 8 | 14 | 1470 | 80 |
| 24 | Minneapolis | MN | 82 | 67 | 14 | 1 | 15 | 1575 | 70 |
| 23 | Little Rock | AR | 76 | 68 | 3 | 17 | 20 | 2100 | 60 |
| 22 | New Orleans | LA | 71 | 62 | 13 | 8 | 21 | 2205 | 50 |
| 15 | Deadwood | SD | 70 | 68 | 5 | 17 | 22 | 2310 | 40 |
| 1 | Cedar Rapids | IA | 80 | 70 | 9 | 14 | 23 | 2415 | 30 |
| 18 | Montpelier | VT | 85 | 68 | 18 | 8 | 26 | 2730 | 20 |
| 16 | Helena | MT | 81 | 62 | 17 | 17 | 34 | 3570 | 10 |

Related U.S. Application Data

(60) Provisional application No. 62/353,630, filed on Jun. 23, 2016, provisional application No. 62/313,762, filed on Mar. 27, 2016, provisional application No. 62/266,838, filed on Dec. 14, 2015, provisional application No. 62/240,474, filed on Oct. 12, 2015.

(51) Int. Cl.

| | | |
|---|---|---|
| *G05B 15/02* | (2006.01) | |
| *F24F 11/30* | (2018.01) | |
| *G05D 23/00* | (2006.01) | |
| *G05D 23/19* | (2006.01) | |
| *G05B 19/048* | (2006.01) | |
| *F24F 11/52* | (2018.01) | |
| *F24F 110/10* | (2018.01) | |
| *F24F 11/46* | (2018.01) | |
| *F24F 140/60* | (2018.01) | |
| *F24F 11/63* | (2018.01) | |
| *F24F 110/00* | (2018.01) | |
| *F24F 11/58* | (2018.01) | |
| *F24F 11/56* | (2018.01) | |

(52) U.S. Cl.
CPC ......... *G05D 23/00* (2013.01); *G05D 23/1902* (2013.01); *F24F 11/46* (2018.01); *F24F 11/52* (2018.01); *F24F 11/56* (2018.01); *F24F 11/58* (2018.01); *F24F 11/63* (2018.01); *F24F 2110/00* (2018.01); *F24F 2110/10* (2018.01); *F24F 2140/60* (2018.01); *G05B 2219/2614* (2013.01)

(58) Field of Classification Search
CPC .... F24F 2110/10; F24F 2140/60; F24F 11/46; F24F 11/52; G05B 19/048; G05B 15/02; G05B 2219/2614; G05D 23/1902; G05D 23/00
See application file for complete search history.

(56) References Cited

U.S. PATENT DOCUMENTS

| | | |
|---|---|---|
| 4,316,577 A | 2/1982 | Adams et al. |
| 4,335,847 A | 6/1982 | Levine |
| 4,408,711 A | 10/1983 | Levine |
| 4,615,380 A | 10/1986 | Beckey |
| 4,621,336 A | 11/1986 | Brown |
| 4,674,027 A | 6/1987 | Beckey |
| 4,685,614 A | 8/1987 | Levine |
| 4,751,961 A | 6/1988 | Levine et al. |
| 4,768,706 A | 9/1988 | Parfitt |
| 4,897,798 A | 1/1990 | Cler |
| 5,005,365 A | 4/1991 | Lynch |
| 5,088,645 A | 2/1992 | Bell |
| 5,211,332 A | 5/1993 | Adams |
| 5,240,178 A | 8/1993 | Dewolf et al. |
| 5,294,047 A | 3/1994 | Schwer et al. |
| 5,361,982 A | 11/1994 | Liebl et al. |
| 5,395,042 A | 3/1995 | Riley et al. |
| 5,415,346 A | 5/1995 | Bishop |
| 5,428,964 A | 7/1995 | Lobdell |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| 5,808,602 A | 9/1998 | Sellers |
| 5,902,183 A | 5/1999 | D'Souza |
| 5,909,378 A | 6/1999 | De Milleville |
| 5,926,776 A | 7/1999 | Glorioso et al. |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| 6,098,893 A | 8/2000 | Berglund et al. |
| 6,164,374 A | 12/2000 | Rhodes et al. |
| 6,206,295 B1 | 3/2001 | Lacoste |
| 6,209,794 B1 | 4/2001 | Webster et al. |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,349,883 B1 | 2/2002 | Simmons et al. |
| 6,351,693 B1 | 2/2002 | Monie et al. |
| 6,356,204 B1 | 3/2002 | Guindi et al. |
| 6,431,457 B1 | 8/2002 | Dirkes |
| 6,453,687 B2 | 9/2002 | Sharood et al. |
| 6,478,233 B1 | 11/2002 | Shah |
| 6,502,758 B2 | 1/2003 | Cottrell |
| D471,825 S | 3/2003 | Peabody |
| 6,595,430 B1 | 7/2003 | Shah |
| 6,619,055 B1 | 9/2003 | Addy |
| 6,641,054 B2 | 11/2003 | Morey |
| 6,641,055 B1 | 11/2003 | Tiernan |
| 6,644,557 B1 | 11/2003 | Jacobs |
| 6,645,066 B2 | 11/2003 | Gutta et al. |
| 6,726,112 B1 | 4/2004 | Ho |
| 6,741,915 B2 | 5/2004 | Poth |
| 6,769,482 B2 | 8/2004 | Wagner et al. |
| 6,824,069 B2 | 11/2004 | Rosen |
| 6,868,293 B1 | 3/2005 | Schurr et al. |
| D503,631 S | 4/2005 | Peabody |
| 6,951,306 B2 | 10/2005 | Deluca |
| 6,975,958 B2 | 12/2005 | Bohrer et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,040,104 B2 | 5/2006 | Bogner et al. |
| 7,083,109 B2 | 8/2006 | Pouchak |
| 7,099,748 B2 | 8/2006 | Rayburn et al. |
| 7,111,788 B2 | 9/2006 | Reponen |
| 7,114,554 B2 | 10/2006 | Bergman et al. |
| 7,117,129 B1 | 10/2006 | Bash et al. |
| 7,141,748 B2 | 11/2006 | Tanaka et al. |
| 7,142,948 B2 | 11/2006 | Metz |
| 7,152,806 B1 | 12/2006 | Rosen |
| 7,159,789 B2 | 1/2007 | Schwendinger et al. |
| 7,159,790 B2 | 1/2007 | Schwendinger et al. |
| 7,181,317 B2 | 2/2007 | Amundson et al. |
| 7,222,494 B2 | 5/2007 | Peterson et al. |
| 7,225,054 B2 | 5/2007 | Amundson et al. |
| 7,258,280 B2 | 8/2007 | Wolfson |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,299,996 B2 | 11/2007 | Garrett et al. |
| 7,302,642 B2 | 11/2007 | Smith et al. |
| 7,333,880 B2 | 2/2008 | Brewster et al. |
| D566,587 S | 4/2008 | Rosen |
| RE40,437 E | 7/2008 | Rosen |
| 7,434,742 B2 | 10/2008 | Mueller et al. |
| 7,451,937 B2 | 11/2008 | Flood et al. |
| 7,455,240 B2 | 11/2008 | Chapman et al. |
| 7,469,550 B2 | 12/2008 | Chapman et al. |
| 7,476,988 B2 | 1/2009 | Mulhouse et al. |
| 7,509,753 B2 | 3/2009 | Nicosia et al. |
| 7,555,364 B2 | 6/2009 | Poth et al. |
| 7,558,648 B2 | 7/2009 | Hoglund et al. |
| 7,575,179 B2 | 8/2009 | Morrow et al. |
| 7,584,899 B2 | 9/2009 | de Pauw et al. |
| 7,596,431 B1 | 9/2009 | Forman et al. |
| 7,600,694 B2 | 10/2009 | Helt et al. |
| D603,277 S | 11/2009 | Clausen et al. |
| 7,620,996 B2 | 11/2009 | Torres et al. |

(56) References Cited

U.S. PATENT DOCUMENTS

| | | |
|---|---|---|
| 7,624,931 B2 | 12/2009 | Chapman et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| 7,693,582 B2 | 4/2010 | Bergman et al. |
| 7,702,421 B2 * | 4/2010 | Sullivan ................ G05B 15/02 700/276 |
| 7,702,424 B2 | 4/2010 | Cannon et al. |
| 7,703,694 B2 | 4/2010 | Mueller et al. |
| D614,976 S | 5/2010 | Skafdrup et al. |
| 7,721,209 B2 | 5/2010 | Tilton |
| 7,726,581 B2 | 6/2010 | Naujok et al. |
| 7,778,734 B2 | 8/2010 | Oswald et al. |
| 7,784,704 B2 | 8/2010 | Harter |
| 7,802,618 B2 | 9/2010 | Simon et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,854,389 B2 | 12/2010 | Ahmed |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,984,384 B2 | 7/2011 | Chaudhri et al. |
| 8,010,237 B2 | 8/2011 | Cheung et al. |
| 8,019,567 B2 | 9/2011 | Steinberg et al. |
| 8,068,938 B2 | 11/2011 | Fujita |
| D651,529 S | 1/2012 | Mongell et al. |
| 8,090,477 B1 | 1/2012 | Steinberg |
| 8,091,794 B2 | 1/2012 | Siddaramanna et al. |
| 8,131,497 B2 | 3/2012 | Steinberg et al. |
| 8,136,052 B2 | 3/2012 | Shin et al. |
| 8,156,060 B2 | 4/2012 | Borzestowski et al. |
| 8,166,395 B2 | 4/2012 | Omi et al. |
| 8,180,492 B2 | 5/2012 | Steinberg |
| 8,185,164 B2 | 5/2012 | Kim |
| 8,195,313 B1 | 6/2012 | Fadell et al. |
| 8,223,134 B1 | 7/2012 | Forstall et al. |
| 8,234,581 B2 | 7/2012 | Kake |
| 8,243,017 B2 | 8/2012 | Brodersen et al. |
| 8,253,704 B2 | 8/2012 | Jang |
| 8,253,747 B2 | 8/2012 | Niles et al. |
| 8,255,090 B2 | 8/2012 | Frader-Thompson et al. |
| 8,280,536 B1 | 10/2012 | Fadell et al. |
| 8,281,244 B2 | 10/2012 | Neuman et al. |
| 8,285,419 B2 | 10/2012 | Drew |
| 8,316,022 B2 | 11/2012 | Matsuda et al. |
| 8,341,557 B2 | 12/2012 | Pisula et al. |
| 8,442,695 B2 | 5/2013 | Imes et al. |
| 9,069,361 B2 | 6/2015 | Merkulov et al. |
| 9,104,211 B2 | 8/2015 | Fadell et al. |
| 2002/0005435 A1 | 1/2002 | Cottrell |
| 2003/0112262 A1 | 6/2003 | Adatia et al. |
| 2004/0034484 A1 | 2/2004 | Solomita et al. |
| 2004/0055446 A1 | 3/2004 | Robbin et al. |
| 2004/0074978 A1 | 4/2004 | Rosen |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0055432 A1 | 3/2005 | Rodgers |
| 2005/0071780 A1 | 3/2005 | Muller et al. |
| 2005/0119766 A1 | 6/2005 | Amundson et al. |
| 2005/0119793 A1 | 6/2005 | Amundson et al. |
| 2005/0128067 A1 | 6/2005 | Zakrewski |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194455 A1 | 9/2005 | Alles et al. |
| 2005/0280421 A1 | 12/2005 | Yomoda et al. |
| 2006/0079983 A1 | 4/2006 | Willis |
| 2006/0186214 A1 | 8/2006 | Simon et al. |
| 2006/0196953 A1 | 9/2006 | Simon et al. |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0115902 A1 | 5/2007 | Shamoon et al. |
| 2007/0158442 A1 | 7/2007 | Chapman et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0006709 A1 | 1/2008 | Ashworth et al. |
| 2008/0015742 A1 | 1/2008 | Kulyk et al. |
| 2008/0054082 A1 | 3/2008 | Evans et al. |
| 2008/0191045 A1 | 8/2008 | Harter |
| 2008/0245480 A1 | 10/2008 | Knight et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0005912 A1 | 1/2009 | Srivastava et al. |
| 2009/0062970 A1 | 3/2009 | Forbes, Jr. et al. |
| 2009/0105047 A1 * | 4/2009 | Guidi .................. A61B 5/0002 482/9 |
| 2009/0112335 A1 | 4/2009 | Mehta et al. |
| 2009/0140056 A1 | 6/2009 | Leen |
| 2009/0140057 A1 | 6/2009 | Leen |
| 2009/0143916 A1 | 6/2009 | Boll et al. |
| 2009/0171862 A1 | 7/2009 | Harrod et al. |
| 2009/0187499 A1 | 7/2009 | Mulder et al. |
| 2009/0195349 A1 | 8/2009 | Frader-Thompson et al. |
| 2009/0216380 A1 | 8/2009 | Kolk |
| 2009/0254225 A1 | 10/2009 | Boucher et al. |
| 2009/0259713 A1 | 10/2009 | Blumrich et al. |
| 2009/0263773 A1 | 10/2009 | Kotlyar et al. |
| 2009/0273610 A1 | 11/2009 | Busch et al. |
| 2009/0283603 A1 | 11/2009 | Peterson et al. |
| 2009/0312999 A1 | 12/2009 | Kasztenny et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0084482 A1 | 4/2010 | Kennedy et al. |
| 2010/0088131 A1 | 4/2010 | Lundberg et al. |
| 2010/0106305 A1 | 4/2010 | Pavlak et al. |
| 2010/0107070 A1 | 4/2010 | Devineni et al. |
| 2010/0107076 A1 | 4/2010 | Grohman et al. |
| 2010/0163633 A1 | 7/2010 | Barrett et al. |
| 2010/0167783 A1 | 7/2010 | Alameh et al. |
| 2010/0198425 A1 | 8/2010 | Donovan |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0035060 A1 | 2/2011 | Oswald |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077896 A1 | 3/2011 | Steinberg et al. |
| 2011/0106328 A1 | 5/2011 | Zhou et al. |
| 2011/0153089 A1 | 6/2011 | Tiemann et al. |
| 2011/0160913 A1 | 6/2011 | Parker et al. |
| 2011/0167369 A1 | 7/2011 | Van Os |
| 2011/0185895 A1 | 8/2011 | Freen |
| 2011/0196539 A1 | 8/2011 | Nair et al. |
| 2011/0251933 A1 | 10/2011 | Egnor et al. |

(56) References Cited

U.S. PATENT DOCUMENTS

| | | |
|---|---|---|
| 2011/0307103 A1 | 12/2011 | Cheung et al. |
| 2012/0065935 A1 | 3/2012 | Steinberg et al. |
| 2012/0085831 A1 | 4/2012 | Kopp |
| 2012/0131504 A1 | 5/2012 | Fadell et al. |
| 2012/0158350 A1 | 6/2012 | Steinberg et al. |
| 2012/0221151 A1 | 8/2012 | Steinberg |
| 2013/0038470 A1 | 2/2013 | Niemeyer et al. |
| 2014/0058806 A1* | 2/2014 | Guenette ............... G05B 15/02 705/14.1 |
| 2014/0151456 A1* | 6/2014 | McCurnin .......... G05D 23/1905 236/51 |
| 2014/0277761 A1 | 9/2014 | Matsuoka et al. |

FOREIGN PATENT DOCUMENTS

| | | |
|---|---|---|
| EP | 1065079 A2 | 1/2001 |
| EP | 1731984 A1 | 12/2006 |
| EP | 2157492 A2 | 2/2010 |
| EP | 1960699 B1 | 5/2011 |
| EP | 1703356 B1 | 9/2011 |
| WO | 2002035304 A2 | 2/2003 |
| WO | 2002048851 A2 | 9/2003 |
| WO | 2009073496 A2 | 6/2009 |
| WO | 2011128416 A2 | 10/2011 |

OTHER PUBLICATIONS

Levitan, Dave, How Data and Social Pressure Can Reduce Home Energy Use, Yale Environment 360, Dec. 4, 2012, 5 pages.
How Does the Nest Leaf Work? Nest, Jun. 17, 2015, 2 pages.
Wang, Ucilia, The Battle Over the Smart Connected Thermostat Rages On, Gigaom, Aug. 2, 2013, 13 pages.
Smart Thermostats Market Analysis for Social Landlords Jun. 2015, Home Connected Consortium, Jun. 2013, 19 pages.
Henry, Alan, Five Best Smart Thermostats, Lifehacker, Jul. 12, 2015, 16 pages.
Rogers, Matt, Nobody Understands Programmable Thermostats, Nest, Jul. 9, 2015, 4 pages.
ARC Solutions for Intelligent Thermostats, Synopsys.com, Oct. 21, 1 pages.
Snell, Jason, Best Smart Thermostat, the Sweethome, Jan. 26 2016, 14 pages.
4 Best Smart Thermostats, BestReviews, Feb. 7, 2016, 6 pages.
How do I install my 3rd generation Nest Learning Thermostat?, Nest, May 5, 2016, 10 pages.
The Best Programmable Thermostats of 2016, Top 10 Reviews, Jun. 23, 2016, 7 pages.
Higginbotham, Stacy, "Just get a Nest!" My journey into the world of connected thermostats, Gigaom, Feb. 7, 2016, 11 pages.
October numbers are in for 678 Bear Tree Creek Plus cake, 2 pages.
November Home Report, Nest, Dec. 10, 2015, 2 pages.
December Home Report, Nest, Jan. 12, 2016, 2 pages.
January Home Report, Nest, Feb. 11, 2016, 3 pages.
February Home Report, Nest, Mar. 9, 2016, 3 pages.
March Home Report, Nest, Apr. 9, 2016, 3 pages.
April Home Report, Nest, May 10, 2016, 3 pages.
May Home Report, Nest, Jun. 9, 2016, 3 pages.

* cited by examiner

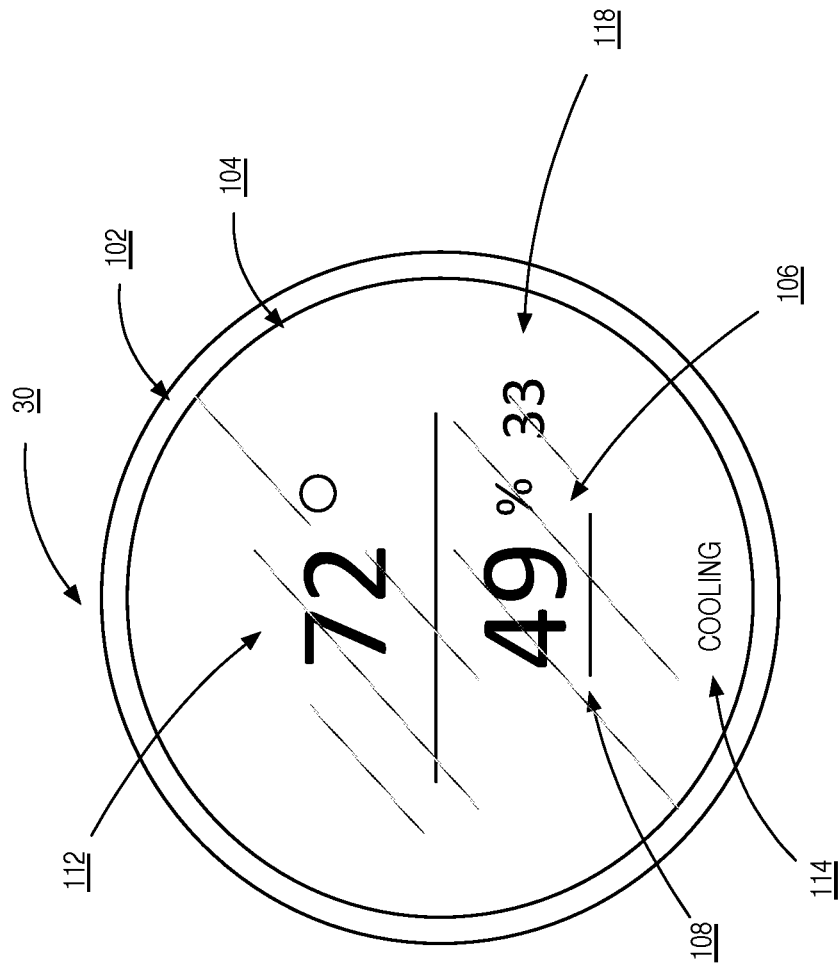

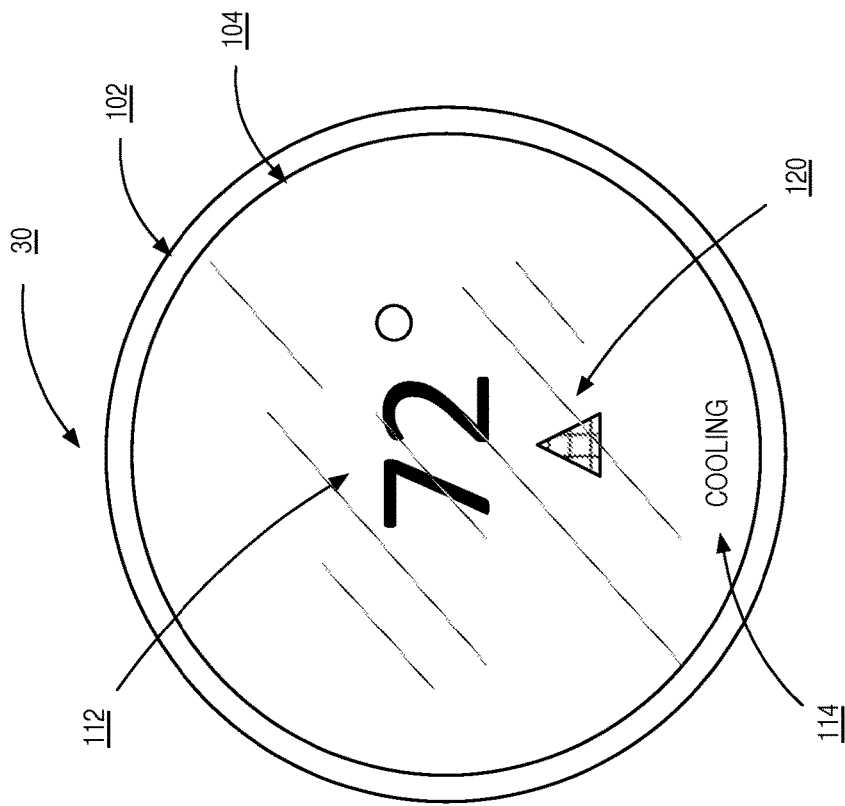

ECORANK TREND INDICATORS

| SHAPE | COLOR | DESCRIPTION |
|-------|-------|-------------|
| ◁ ← 130 | red | ecorank is below but trending towards ecorank target setting |
| ▷ ← 132 | red | ecorank is below and trending away ecorank target setting |
| ◐ ← 134 | green | ecorank matches ecorank target setting |
| ☆ ← 136 | gold | ecorank is better than ecorank target setting |

FIG. 1G

DWELLINGS REPOSITORY

```
DWELLING REPOSITORY 412
  DWELLING RECORD [1-M] 414
    DWELLING ID 416
    DWELLING LOCATION 418
    DWELLING ADDRESS 420
    DWELLING NAME 422
    DWELLING SIZE 424
    DWELLING OCCUPANTS 426
    DWELLING TYPE 428
    DWELLING EXTERIOR WALLS 430
    DWELLING FLOORS 432
    DWELLING FOUNDATION TYPE 433
    DWELLING ECORANK INFORMATION 434
    DWELLING USAGE TYPE 435
    HUB ID 436
```

DATABASE RELATIONSHIP DIAGRAM
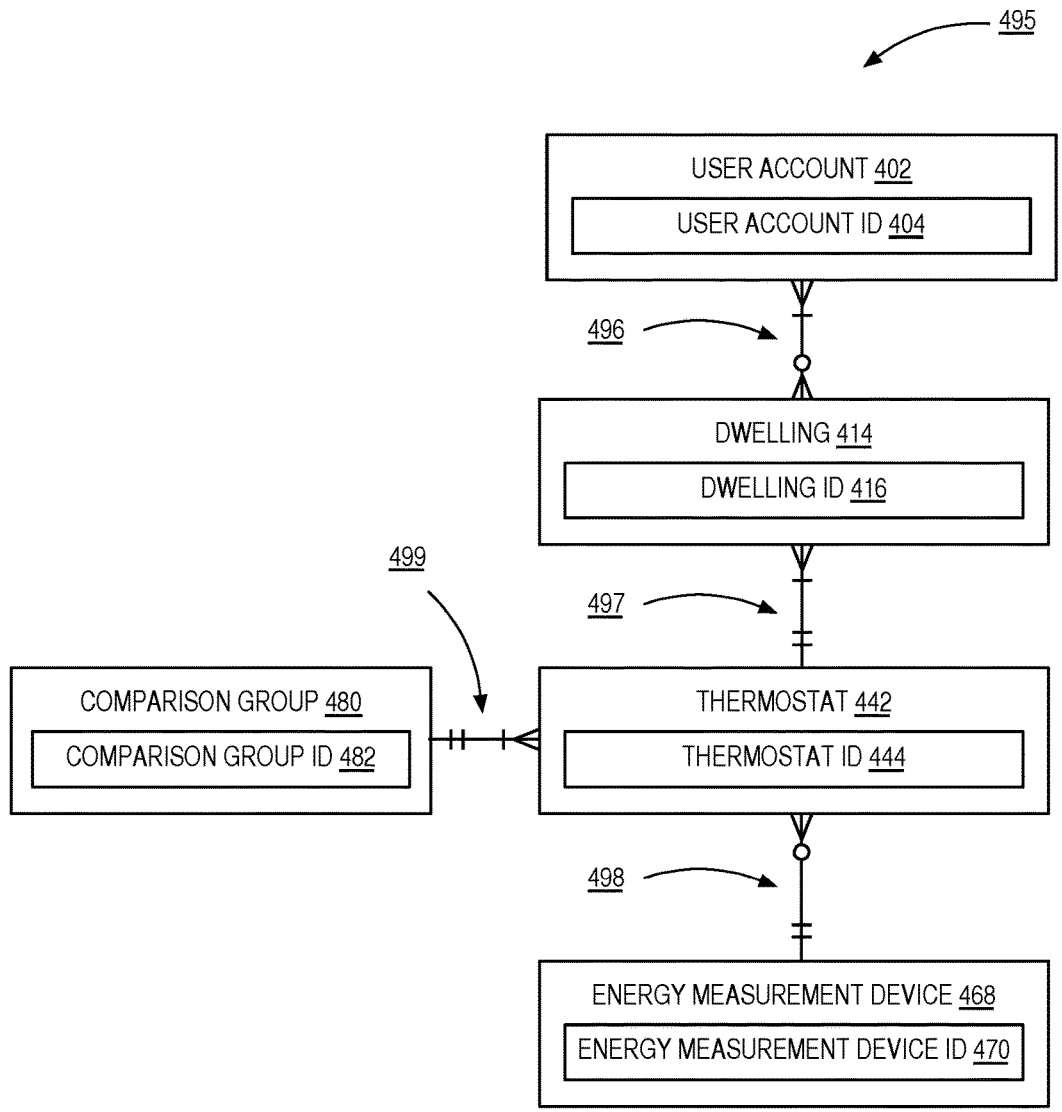
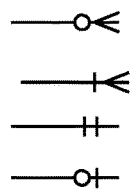
FIG. 4G

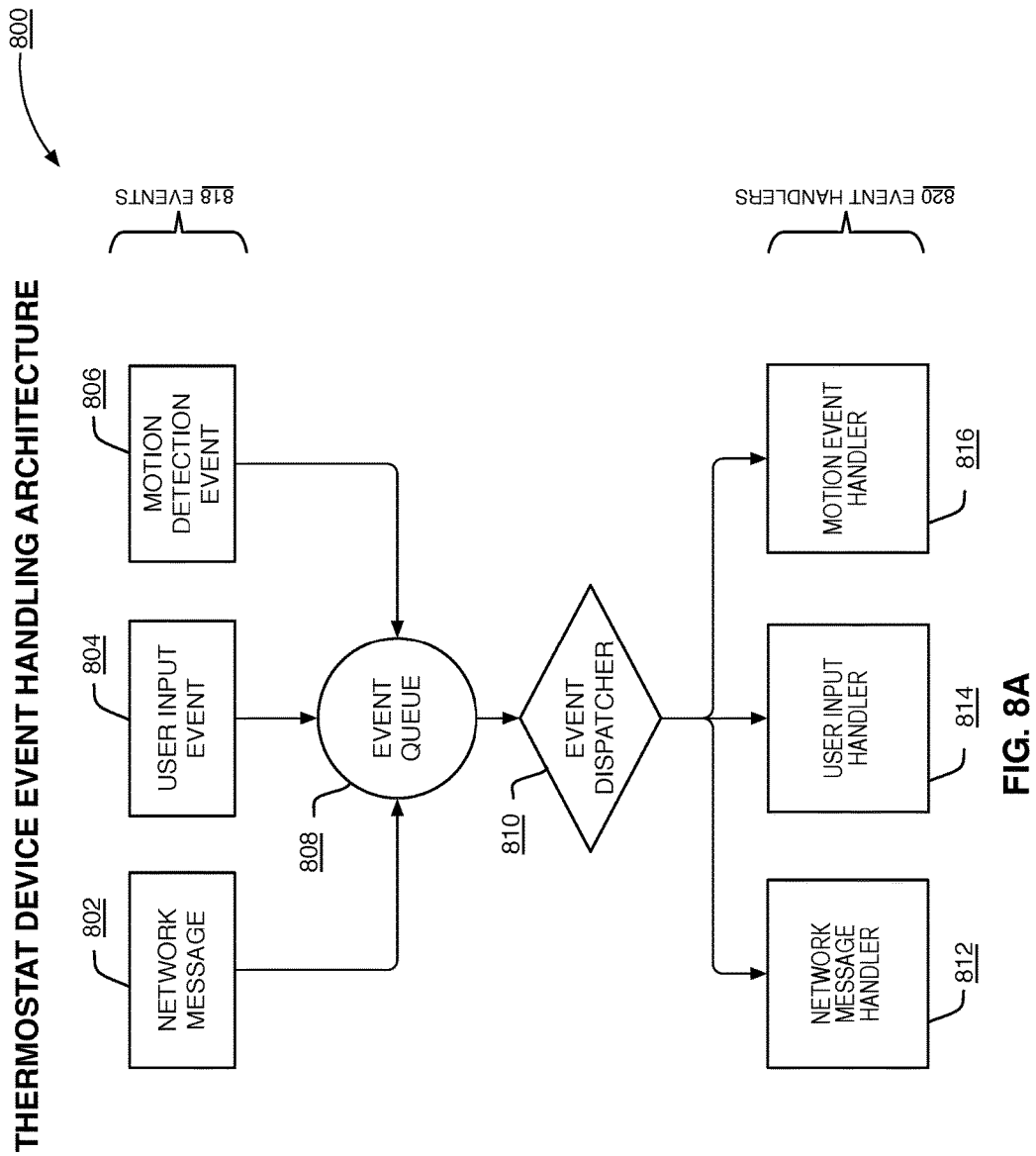

| 1102 | GLF ( Geographic Location Factor ) | Measure of distance between dwelling geographic locations $$GLF = \frac{10}{\Delta L^{\wedge}(1/3) + 1}$$ $\Delta L = $ abs ( mi distance between dwellings ) |
|---|---|---|
| 1104 1106 | GLFW ( Geographic Location Factor Weight ) | Weighting Coefficient for GFL |
| 1108 | DTF ( Dwelling Type Factor ) | 1 if the dwelling types match, 0 otherwise |
| 1110 | DTFW ( Dwelling Type Factor Weight ) | Weighting Coefficient for DTF |
| | DSF ( Dwelling Size Factor ) | Measure of closeness between dwelling sizes $$DSF = \frac{500}{\Delta DS + 500}$$ $\Delta DS = $ abs ( sqft difference in dwelling size ) |
| 1112 1114 | DSFW ( Dwelling Size Factor Weight ) | Weighting Coefficient for DSF |
| | OCF ( Occupant Count Factor ) | Measure of closeness between dwelling occupant counts $$OCF = \frac{1}{\Delta OC + 1}$$ $\Delta OC = $ abs ( differences in occupant counts ) |
| 1116 1118 | OCFW ( Occupant Count Factor Weight ) | Weighting Coefficient for OCF |
| | DFCF ( Dwelling Floor Count Factor ) | Measure of closeness between dwelling floor counts $$DFCF = \frac{1}{\Delta FC + 1}$$ $\Delta FC = $ abs ( differences in floor counts ) |
| 1120 1122 | DFCFW ( Dwelling Floor Count Factor Weight ) | Weighting Coefficient for DFCF |
| 1124 | HFTM ( Heating Fuel Type Match ) | 1 if the heating fuel types match, 0 otherwise |
| 1126 | HFTMW ( Heating Fuel Type Match Weight ) | Weighting Coefficient for HFTM |
| | HETM ( Heating Element Type Match ) | 1 if the heating element types match, 0 otherwise |
| 1128 1130 | HETMW ( Heating Element Type Match Weight ) | Weighting Coefficient for HETM |
| 1132 | UTM ( Usage Type Match ) | 1 if the usage of the dwellings match, 0 otherwise |
| | UTMW ( Usage Type Match Weight ) | Weighting Coefficient for UTM |

FIG. 11

THERMOSTAT / DWELLING DATA

| Dwelling ID | City | State | Longitude | Latitude | Dwelling Type | Dwelling Size | Dwelling Occupants | Dwelling Floors | Heating Fuel Type | Heating Element Type | Special Usage Type | Average Cool Setting | Average Heat Setting | Hours Cooling | Hours Heating | Total Hours | Energy Consumption |
|---|---|---|---|---|---|---|---|---|---|---|---|---|---|---|---|---|---|
| 1 | Cedar Rapids | IA | 41.91 | -91.70 | Single Family Detached | 1200 | 3 | 1 | Gas | Forced Air | None | 80 | 70 | 9 | 14 | 23 | 2415 |
| 2 | Whichita | KS | 37.71 | -97.35 | Condo | 800 | 6 | 1 | Electric | Forced Air | None | 71 | 71 | 15 | 4 | 19 | 1995 |
| 3 | Chapel Hill | NC | 35.92 | -79.03 | Townhouse | 1100 | 4 | 1 | Propane | Forced Air | None | 79 | 69 | 12 | 5 | 17 | 1785 |
| 4 | Key West | FL | 24.56 | -81.78 | Condo | 1000 | 7 | 1 | Oil | Forced Air | Home Office | 84 | 64 | 2 | 20 | 22 | 2310 |
| 5 | Jackson | MS | 35.52 | -78.62 | Single Family Detached | 2000 | 4 | 1 | Geothermal | In Floor Radiant | None | 77 | 70 | 1 | 14 | 15 | 1575 |
| 6 | San Antonio | TX | 29.43 | -98.42 | Apartment | 1800 | 5 | 1 | Solar | Forced Air | None | 83 | 67 | 0 | 0 | 0 | 0 |
| 7 | Lubbuck | TX | 33.53 | -101.94 | Condo | 600 | 2 | 1 | Gas | Forced Air | None | 83 | 69 | 6 | 8 | 14 | 1470 |
| 8 | Albuquerque | NM | 35.10 | -106.58 | Townhouse | 1500 | 2 | 1 | Electric | Forced Air | None | 71 | 65 | 4 | 5 | 9 | 945 |
| 9 | Las Vegas | NV | 36.11 | -115.23 | Condo | 1350 | 5 | 1 | Propane | Forced Air | None | 76 | 71 | 2 | 14 | 16 | 1680 |
| 10 | Truckee | CA | 39.32 | -120.17 | Single Family Detached | 4200 | 3 | 2 | Oil | Forced Air | None | 82 | 68 | 13 | 9 | 22 | 2310 |
| 11 | Sacramento | CA | 38.48 | -121.48 | Single Family Detached | 1200 | 4 | 1 | Geothermal | In Floor Radiant | None | 84 | 62 | 8 | 7 | 15 | 1575 |
| 12 | Eugene | OR | 44.03 | -123.14 | Condo | 800 | 1 | 1 | Solar | Forced Air | Home Office | 84 | 66 | 11 | 8 | 19 | 1995 |
| 13 | San Diego | CA | 32.70 | -117.04 | Townhouse | 1100 | 3 | 1 | Gas | Forced Air | None | 80 | 66 | 6 | 6 | 12 | 1260 |
| 14 | Moab | UT | 38.70 | -109.58 | Condo | 1000 | 3 | 1 | Electric | Electric Baseboard | None | 71 | 62 | 16 | 9 | 25 | 2625 |
| 15 | Deadwood | SD | 44.37 | -103.74 | Single Family Detached | 2000 | 2 | 1 | Gas | Forced Air | None | 70 | 68 | 5 | 17 | 22 | 2310 |
| 16 | Helena | MT | 46.58 | -112.03 | Single Family Detached | 1800 | 3 | 1 | Electric | Forced Air | None | 81 | 62 | 17 | 17 | 34 | 3570 |
| 17 | Syracuse | NY | 42.08 | -76.81 | Condo | 600 | 5 | 1 | Propane | Forced Air | None | 78 | 64 | 17 | 20 | 37 | 3885 |
| 18 | Montpelier | VT | 44.25 | -72.57 | Townhouse | 1500 | 3 | 1 | Oil | Forced Air | None | 85 | 68 | 18 | 8 | 26 | 2730 |
| 19 | Bangor | ME | 44.84 | -68.82 | Condo | 1350 | 4 | 2 | Geothermal | Radiator | None | 77 | 71 | 11 | 9 | 20 | 2100 |
| 20 | Indianapolis | IN | 39.75 | -86.08 | Single Family Detached | 4200 | 2 | 2 | Solar | Forced Air | None | 70 | 62 | 3 | 10 | 13 | 1365 |
| 21 | Montgomery | AL | 32.32 | -86.39 | Single Family Detached | 2750 | 2 | 1 | Gas | Forced Air | Home Office | 83 | 66 | 11 | 9 | 20 | 2100 |
| 22 | New Orleans | LA | 29.91 | -90.04 | Condo | 970 | 4 | 1 | Electric | Forced Air | None | 71 | 62 | 13 | 8 | 21 | 2205 |
| 23 | Little Rock | AR | 34.72 | -92.32 | Townhouse | 1340 | 5 | 1 | Propane | Radiator | None | 76 | 68 | 3 | 17 | 20 | 2100 |
| 24 | Minneapolis | MN | 44.95 | -83.29 | Condo | 1140 | 3 | 1 | Oil | Forced Air | Home Office | 82 | 67 | 14 | 1 | 15 | 1575 |
| 25 | Butte | MT | 46.09 | -112.62 | Single Family Detached | 2230 | 2 | 2 | Electric | Electric Baseboard | None | 79 | 66 | 18 | 20 | 38 | 3990 |
| 26 | Telluride | CO | 37.94 | -107.81 | Single Family Detached | 1780 | 1 | 2 | Gas | Forced Air | None | 72 | 64 | 9 | 9 | 18 | 1890 |
| 27 | Cincinnati | OH | 39.13 | -84.55 | Condo | 500 | 3 | 1 | Electric | Forced Air | None | 84 | 69 | 2 | 16 | 18 | 1890 |
| 28 | Bethlehem | PA | 40.61 | -75.36 | Townhouse | 1630 | 3 | 1 | Gas | Forced Air | None | 85 | 63 | 0 | 7 | 7 | 735 |
| 29 | Ann Arbor | MI | 42.27 | -83.73 | Condo | 860 | 1 | 1 | Electric | Forced Air | None | 80 | 62 | 14 | 5 | 19 | 1995 |
| 30 | Garden City | KS | 37.75 | -100.00 | Single Family Detached | 2900 | 5 | 2 | Electric | Forced Air | None | 77 | 65 | 6 | 18 | 24 | 2520 |

FIG. 12A

COMPUTING MATCH SCORE

| Dwelling ID | City | State | Distance to Cedar Rapids IA | GLFW 8 | 1104 GLF | DTFW 1 | 1108 DTF | DSFW 4 | 1112 DSF | OCFW 4 | 1116 OCF | DFCFW 1 | 1120 DFCF | HTFMW 1 | 1124 HFTM | HETMW 1 | 1128 HETM | UTMW 2 | 1132 UTM | Match Score |
|---|---|---|---|---|---|---|---|---|---|---|---|---|---|---|---|---|---|---|---|---|
| 2 | Whicita | KS | 391 | | 9.63 | | 0 | | 2.22 | | 1.00 | | 1.00 | | 0 | | 1 | | 2 | 16.85 |
| 3 | Chapel Hill | NC | 874 | | 7.57 | | 0 | | 3.33 | | 2.00 | | 1.00 | | 0 | | 1 | | 2 | 16.91 |
| 4 | Key West | FL | 681 | | 8.17 | | 0 | | 2.86 | | 0.80 | | 1.00 | | 0 | | 1 | | 0 | 13.82 |
| 5 | Jackson | MS | 902 | | 7.50 | | 1 | | 1.54 | | 2.00 | | 1.00 | | 0 | | 0 | | 2 | 15.04 |
| 6 | San Antonio | TX | 467 | | 9.13 | | 0 | | 1.82 | | 1.33 | | 1.00 | | 0 | | 1 | | 2 | 16.28 |
| 7 | Lubbock | TX | 708 | | 8.07 | | 0 | | 1.82 | | 4.00 | | 1.00 | | 1 | | 1 | | 2 | 18.89 |
| 8 | Albuquerque | NM | 1028 | | 7.21 | | 0 | | 2.50 | | 2.00 | | 1.00 | | 0 | | 1 | | 2 | 15.71 |
| 9 | Las Vegas | NV | 1626 | | 6.27 | | 0 | | 3.08 | | 1.33 | | 1.00 | | 0 | | 1 | | 2 | 14.68 |
| 10 | Truckee | CA | 1966 | | 5.91 | | 1 | | 0.57 | | 4.00 | | 0.50 | | 0 | | 1 | | 2 | 14.99 |
| 11 | Sacramento | CA | 2056 | | 5.83 | | 1 | | 4.00 | | 2.00 | | 1.00 | | 0 | | 0 | | 2 | 15.83 |
| 12 | Eugene | OR | 2171 | | 5.74 | | 0 | | 2.22 | | 1.33 | | 1.00 | | 0 | | 1 | | 0 | 11.29 |
| 13 | San Diego | CA | 1751 | | 6.13 | | 0 | | 3.33 | | 4.00 | | 1.00 | | 1 | | 1 | | 2 | 18.46 |
| 14 | Moab | UT | 1235 | | 6.82 | | 0 | | 2.86 | | 4.00 | | 1.00 | | 0 | | 0 | | 2 | 16.68 |
| 15 | Deadwood | SD | 832 | | 7.69 | | 1 | | 1.54 | | 2.00 | | 1.00 | | 1 | | 1 | | 2 | 17.23 |
| 16 | Helena | MT | 1404 | | 6.56 | | 0 | | 1.82 | | 4.00 | | 1.00 | | 0 | | 1 | | 2 | 17.38 |
| 17 | Syracuse | NY | 1028 | | 7.21 | | 1 | | 1.82 | | 1.33 | | 1.00 | | 0 | | 1 | | 0 | 14.36 |
| 18 | Montpelier | VT | 1320 | | 6.68 | | 0 | | 2.50 | | 4.00 | | 1.00 | | 0 | | 1 | | 2 | 17.18 |
| 19 | Bangor | ME | 1579 | | 6.33 | | 0 | | 3.08 | | 2.00 | | 0.50 | | 0 | | 0 | | 2 | 13.90 |
| 20 | Indianapolis | IN | 388 | | 9.65 | | 1 | | 0.57 | | 2.00 | | 0.50 | | 0 | | 1 | | 2 | 16.72 |
| 21 | Montgomery | AL | 365 | | 9.82 | | 0 | | 0.98 | | 2.00 | | 1.00 | | 1 | | 1 | | 2 | 16.79 |
| 22 | New Orleans | LA | 115 | | 13.66 | | 0 | | 2.74 | | 2.00 | | 1.00 | | 0 | | 0 | | 2 | 22.40 |
| 23 | Little Rock | AR | 46 | | 17.43 | | 0 | | 3.13 | | 1.33 | | 1.00 | | 0 | | 0 | | 2 | 24.88 |
| 24 | Minneapolis | MN | 110 | | 13.81 | | 1 | | 3.57 | | 4.00 | | 1.00 | | 1 | | 0 | | 0 | 23.38 |
| 25 | Butte | MT | 1445 | | 6.50 | | 1 | | 1.31 | | 2.00 | | 0.50 | | 0 | | 1 | | 2 | 13.31 |
| 26 | Telluride | CO | 1113 | | 7.04 | | 0 | | 1.85 | | 1.33 | | 0.50 | | 1 | | 1 | | 2 | 15.73 |
| 27 | Cincinnati | OH | 493 | | 8.99 | | 0 | | 1.67 | | 1.33 | | 1.00 | | 0 | | 1 | | 2 | 15.99 |
| 28 | Bethlehem | PA | 1128 | | 7.01 | | 0 | | 2.15 | | 4.00 | | 1.00 | | 1 | | 1 | | 2 | 18.16 |
| 29 | Ann Arbor | MI | 550 | | 8.70 | | 0 | | 2.38 | | 1.33 | | 1.00 | | 0 | | 1 | | 2 | 16.42 |
| 30 | Garden City | KS | 573 | | 8.60 | | 1 | | 0.91 | | 1.33 | | 0.50 | | 0 | | 1 | | 2 | 15.34 |

FIG. 12B

SELECTING COMPARISON GROUP

| Dwelling ID | City | State | Distance to Cedar Rapids IA | 1104 GLF | 1108 DTF | 1112 DSF | 1116 OCF | 1120 DFCF | 1124 HFTM | 1128 HETM | 1132 UTM | Match Score |
|---|---|---|---|---|---|---|---|---|---|---|---|---|
| 23 | Little Rock | AR | 46 | 17.43 | 0 | 3.13 | 1.33 | 1.00 | 0 | 0 | 2 | 24.88 |
| 24 | Minneapolis | MN | 110 | 13.81 | 0 | 3.57 | 4.00 | 1.00 | 0 | 1 | 0 | 23.38 |
| 22 | New Orleans | LA | 115 | 13.66 | 0 | 2.74 | 2.00 | 1.00 | 0 | 1 | 2 | 22.40 |
| 7 | Lubbock | TX | 708 | 8.07 | 0 | 1.82 | 4.00 | 1.00 | 1 | 1 | 2 | 18.89 |
| 13 | San Diego | CA | 1751 | 6.13 | 0 | 3.33 | 4.00 | 1.00 | 0 | 1 | 2 | 18.46 |
| 28 | Bethlehem | PA | 1128 | 7.01 | 0 | 2.15 | 4.00 | 1.00 | 1 | 1 | 2 | 18.16 |
| 16 | Helena | MT | 1404 | 6.56 | 1 | 1.82 | 4.00 | 1.00 | 0 | 1 | 2 | 17.38 |
| 15 | Deadwood | SD | 832 | 7.69 | 1 | 1.54 | 2.00 | 1.00 | 1 | 1 | 2 | 17.23 |
| 18 | Montpelier | VT | 1320 | 6.68 | 0 | 2.50 | 4.00 | 1.00 | 0 | 1 | 2 | 17.18 |
| 3 | Chapel Hill | NC | 874 | 7.57 | 0 | 3.33 | 2.00 | 1.00 | 0 | 1 | 2 | 16.91 |
| 2 | Whicita | KS | 391 | 9.63 | 0 | 2.22 | 1.00 | 1.00 | 0 | 0 | 2 | 16.85 |
| 21 | Montgomery | AL | 365 | 9.82 | 1 | 0.98 | 2.00 | 1.00 | 1 | 1 | 2 | 16.79 |
| 20 | Indianapolis | IN | 388 | 9.65 | 1 | 0.57 | 2.00 | 0.50 | 0 | 1 | 0 | 16.72 |
| 14 | Moab | UT | 1235 | 6.82 | 0 | 2.86 | 4.00 | 1.00 | 0 | 0 | 2 | 16.68 |
| 29 | Ann Arbor | MI | 550 | 8.70 | 0 | 2.38 | 1.33 | 1.00 | 0 | 1 | 2 | 16.42 |
| 6 | San Antonio | TX | 467 | 9.13 | 0 | 1.82 | 1.33 | 1.00 | 0 | 1 | 2 | 16.28 |
| 27 | Cincinnati | OH | 493 | 8.99 | 0 | 1.67 | 1.33 | 1.00 | 0 | 0 | 2 | 15.99 |
| 11 | Sacramento | CA | 2056 | 5.83 | 1 | 4.00 | 2.00 | 1.00 | 1 | 1 | 2 | 15.83 |
| 26 | Telluride | CO | 1113 | 7.04 | 1 | 1.85 | 1.33 | 0.50 | 0 | 1 | 2 | 15.73 |
| 8 | Albuquerque | NM | 1028 | 7.21 | 0 | 2.50 | 2.00 | 1.00 | 0 | 1 | 2 | 15.71 |
| 30 | Garden City | KS | 573 | 8.60 | 1 | 0.91 | 1.33 | 0.50 | 0 | 1 | 2 | 15.34 |
| 5 | Jackson | MS | 902 | 7.50 | 1 | 1.85 | 2.00 | 1.00 | 0 | 0 | 2 | 15.04 |
| 10 | Truckee | CA | 1966 | 5.91 | 1 | 0.57 | 4.00 | 0.50 | 0 | 1 | 2 | 14.99 |
| 9 | Las Vegas | NV | 1626 | 6.27 | 0 | 3.08 | 1.33 | 1.00 | 0 | 1 | 2 | 14.68 |
| 17 | Syracuse | NY | 1028 | 7.21 | 0 | 1.82 | 1.33 | 1.00 | 0 | 1 | 2 | 14.36 |
| 19 | Bangor | ME | 1579 | 6.33 | 1 | 3.08 | 2.00 | 0.50 | 0 | 0 | 2 | 13.90 |
| 4 | Key West | FL | 681 | 8.17 | 0 | 2.86 | 0.80 | 1.00 | 0 | 1 | 0 | 13.82 |
| 25 | Butte | MT | 1445 | 6.50 | 1 | 1.31 | 2.00 | 0.50 | 0 | 0 | 2 | 13.31 |
| 12 | Eugene | OR | 2171 | 5.74 | 0 | 2.22 | 1.33 | 1.00 | 0 | 1 | 0 | 11.29 |

FIG. 12C

COMPUTING ECORANK

| Dwelling ID | City | State | Average Cool Setting | Average Heat Setting | Hours Cooling | Hours Heating | Total Hours | Energy Consumption | Ecorank |
|---|---|---|---|---|---|---|---|---|---|
| 28 | Bethlehem | PA | 85 | 63 | 0 | 7 | 7 | 735 | 100 |
| 13 | San Diego | CA | 80 | 66 | 6 | 6 | 12 | 1260 | 90 |
| 7 | Lubbuck | TX | 83 | 69 | 6 | 8 | 14 | 1470 | 80 |
| 24 | Minneapolis | MN | 82 | 67 | 14 | 1 | 15 | 1575 | 70 |
| 23 | Little Rock | AR | 76 | 68 | 3 | 17 | 20 | 2100 | 60 |
| 22 | New Orleans | LA | 71 | 62 | 13 | 8 | 21 | 2205 | 50 |
| 15 | Deadwood | SD | 70 | 68 | 5 | 17 | 22 | 2310 | 40 |
| 1 | Cedar Rapids | IA | 80 | 70 | 9 | 14 | 23 | 2415 | 30 |
| 18 | Montpelier | VT | 85 | 68 | 18 | 8 | 26 | 2730 | 20 |
| 16 | Helena | MT | 81 | 62 | 17 | 17 | 34 | 3570 | 10 |

FIG. 12D

DWELLING / THERMOSTAT / OCCUPANT TABLE 1600

| DWELLING | THERMOSTAT | USER | EXAMPLE |
|---|---|---|---|
| SINGLE DWELLING | SINGLE THERMOSTAT | SINGLE OCCUPANT | ONE OCCUPANT LIVING IN A SINGLE DWELLING, SUCH AS A CONDO, WITH ONLY ONE THERMOSTAT |
| SINGLE DWELLING | SINGLE THERMOSTAT | MULTIPLE OCCUPANTS | MULTIPLE OCCUPANTS LIVING IN A SINGLE DWELLING, SUCH AS A CONDO, WITH ONLY ONE THERMOSTAT |
| SINGLE DWELLING | MULTIPLE THERMOSTATS | SINGLE OCCUPANT | ONE OCCUPANT LIVING IN A SINGLE DWELLING, SUCH AS A CONDO, WITH MULTIPLE THERMOSTATS – FOR EXAMPLE A MULTI FLOOR TOWNHOUSE |
| SINGLE DWELLING | MULTIPLE THERMOSTATS | MULTIPLE OCCUPANTS | MULTIPLE OCCUPANTS LIVING IN A SINGLE DWELLING, SUCH AS A TOWNHOUSE, WITH MULTIPLE THERMOSTATS – FOR EXAMPLE A MULTI FLOOR TOWNHOUSE |

DWELLING / THERMOSTAT / OCCUPANT TABLE

1600

| DWELLING | THERMOSTAT | USER | EXAMPLE |
|---|---|---|---|
| MULTIPLE DWELLINGS | SINGLE THERMOSTAT | SINGLE OCCUPANT | ONE OCCUPANT RESIDING IN TWO DIFFERENT DWELLINGS, WHERE BOTH DWELLINGS ARE CONTROLLED BY THE SAME THERMOSTAT – FOR EXAMPLE A MAIN HOUSE AND AN OUT BUILDING THAT ARE BOTH CONTROLLED BY ONE THERMOSTAT |
| MULTIPLE DWELLINGS | SINGLE THERMOSTAT | MULTIPLE OCCUPANTS | MULTIPLE OCCUPANTS RESIDING IN TWO DIFFERENT DWELLINGS, WHERE BOTH DWELLINGS ARE CONTROLLED BY THE SAME THERMOSTAT – FOR EXAMPLE A MAIN HOUSE AND AN OUT BUILDING THAT ARE BOTH CONTROLLED BY ONE THERMOSTAT |
| MULTIPLE DWELLINGS | MULTIPLE THERMOSTATS | SINGLE OCCUPANT | ONE OCCUPANT RESIDING IN TWO DIFFERENT DWELLINGS, WHERE EACH DWELLING IS CONTROLLED BY A SEPARATE THERMOSTAT – FOR EXAMPLE A MAIN HOUSE AND AN OUT BUILDING WHEREIN EACH BUILDING HAS ITS OWN THERMOSTAT |
| MULTIPLE DWELLINGS | MULTIPLE THERMOSTATS | MULTIPLE OCCUPANTS | MULTIPLE OCCUPANTS RESIDING IN TWO DIFFERENT DWELLINGS, WHERE EACH DWELLING IS CONTROLLED BY A SEPARATE THERMOSTAT – FOR EXAMPLE A MAIN HOUSE AND AN OUT BUILDING WHEREIN EACH BUILDING HAS ITS OWN THERMOSTAT |

METHOD AND SYSTEM FOR DETERMINING COMPARATIVE USAGE INFORMATION AT A SERVER DEVICE

CROSS REFERENCE TO RELATED APPLICATIONS

This application is a continuation of U.S. patent application Ser. No. 15/212,417, entitled ECORANK which was filed on Jul. 18, 2016, and claims the benefit of U.S. Provisional Patent Application Ser. Nos. 62/353,630, filed Jun. 23, 2016, 62/313,762, filed Mar. 27, 2016, 62/266,838, filed Dec. 14, 2015, and 62/240,474, filed Oct. 12, 2015, the disclosures of which are all incorporated herein by reference in their entirety.

TECHNICAL FIELD

The present disclosure relates to a thermostat for providing feedback to a user as to how the energy consumption of their climate control system compares to the energy consumption of other related climate control systems. In another aspect of the present disclosure, the user sets an ecorank target setting among other climate control systems, and the energy consumption is controlled in order to meet or better the ecorank target.

BACKGROUND

With an ever increasing worldwide population consuming the world's fossil fuel supply at an ever increasing rate, many people have become interested in reducing their energy consumption footprint. Reducing energy consumption also results in lower pollution emissions and reduced energy expenditures. Recent developments in connected thermostats allow for more efficient energy use through machine learning and artificial intelligence techniques to adaptively control the climate system setting of a thermostat. Some thermostat devices are smart enough to notify users through portals and messaging when they have decreased or increased their energy consumption due to the thermostats adaptive temperature control. However, this information is not available in real-time nor at the thermostat device itself.

SUMMARY OF THE DISCLOSURE

The following disclosure describes a connected thermostat. Aspects of the disclosure include as the user changes climate settings at the thermostat, the system provides real-time feedback as to how energy consumed by a climate system controlled by the thermostat compares to other energy consumed by other climate systems controlled by other thermostats and other user. While current thermostats may provide feedback on climate settings that represent an improvement over past settings, they do not provide feedback on energy consumption in real-time, and they do not provide information to the user in regards to where they rank in energy consumption in comparison to similar consumers through the use of comparison groups, nor at the thermostat device itself.

In a further aspect of the disclosure, in a second mode of operation, the thermostat user is enabled to change an ecorank target setting indicating where they would like to rank in a comparable group in terms of energy consumption. Based on this "ecorank target setting", the disclosed system adjusts the climate system setting to achieve this ecorank target setting. The thermostat device displays in real-time a climate system setting that will achieve this goal. However, it is important to note that as other users of the system adjust their climate system settings, then this climate system setting may also have to change to achieve the ecorank target setting.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a unitary thermostat device including: a housing, a signaling interface attached to the housing and operable to control a climate system including one or more climate system components, where the one or more climate system components are included of one or more of a heating component, a cooling component, a fan component, a humidification component, and a dehumidification component. The unitary thermostat device also includes a communications interface attached to the housing and; a processor and memory located within the housing and associated with the communications interface and the signaling interface and operable to send, to a server device, an ecorank target setting. The unitary thermostat device also includes receiving, from the server device, a climate system setting. The unitary thermostat device also includes controlling the climate system based on the climate system setting; and a display attached to the housing and operable to present the climate system setting. Other embodiments of this aspect include corresponding computer systems, apparatus, and computer programs recorded on one or more computer storage devices, each configured to perform the actions of the methods.

Implementations may include one or more of the following features. The unitary thermostat device where the ecorank target setting is included of information reflecting a desired usage of the climate system controlled by the unitary thermostat device in comparison to other usage of other climate systems controlled by other unitary thermostat devices. The unitary thermostat device where the one or more climate system components are fueled by one or more of electricity, gas, oil, wood, and coal. The unitary thermostat device further including: the processor and memory operable to send, to the server device, usage information indicating usage of the one or more climate system components and including one or more of heating component usage information, cooling component usage information, fan component usage information, humidification component usage information, and dehumidification component usage information. The unitary thermostat device may also include receiving, from the server device, ecorank information; and the display operable to present the ecorank information. The unitary thermostat device where sending usage information further includes sending a climate system setting. The unitary thermostat device further including: the processor and memory further operable to: receive, from an other device, the ecorank target setting; and apply the ecorank target setting. The unitary thermostat device where the climate system setting includes one or more of a heat setting, cool setting, fan setting, a humidifier setting, and an ecorank target setting. The unitary thermostat device further including: the processor and memory further operable to receive an updated ecorank target setting. The unitary thermostat device may also include sending, to the server device, the updated ecorank target setting. The unitary thermostat device may also include receiving, from the server device, an updated climate system setting. The unitary thermostat device may also include applying the updated climate system setting to the unitary thermostat device; and the display operable to present the updated climate system setting, where the unitary thermostat device is a first thermostat device associated with a first dwelling and the updated climate system setting is received in response to the server device receiving updated information from an other thermostat device associated with an other dwelling. The unitary thermostat device further including: the processor and memory further operable to receive, at the unitary thermostat device, user input identifying the ecorank target setting. The unitary thermostat device may also include sending, to the server device, the ecorank target setting. The unitary thermostat device further including: the processor and memory further operable to receive an updated climate system setting; and the display operable to present the updated climate system setting, where the unitary thermostat device is a first thermostat device associated with a first dwelling and the updated climate system setting is received in response to the server device receiving updated information from an other thermostat associated with an other dwelling. The unitary thermostat device further including: the processor and memory operable to receive a climate priority mode setting. The unitary thermostat device may also include applying the climate priority mode setting to the unitary thermostat device. The unitary thermostat device may also include send climate system usage information to the server device. The unitary thermostat device may also include receiving updated ecorank information from the server device; and the display operable to present a visual indicator of the climate priority mode. The unitary thermostat device further including: the processor and memory, capable of receiving the ecorank target setting and sending the climate system setting, and further operable to receive information identifying a user providing the ecorank target setting; and send the information identifying the user providing the ecorank target setting with the ecorank target setting. The unitary thermostat device where the unitary thermostat device is connected to a plurality of thermostat devices associated with a dwelling. The unitary thermostat device where the plurality of thermostat devices operate independently from one another, and the ecorank target setting applied to one of the plurality thermostat devices, is applied to only the one of the plurality thermostat devices. The unitary thermostat device where the plurality of thermostat devices operate dependently with one another, and the ecorank target setting applied to one of the plurality thermostat devices, is applied to all of the plurality of thermostat devices. The unitary thermostat device where the ecorank target setting is one or more of a numerical score, percentage, graphic, icon, color, letter, ecorank trend indicator, an audio item, and a video item. The unitary thermostat device where the received climate system setting is determined at the server based on needed energy savings, the needed energy savings determined by comparing energy consumed by the climate system controlled by the unitary thermostat device to a comparison group, the comparison group including other climate systems associated with a plurality of other thermostat devices providing other climate system usage information to the server device, the comparison made over a temporal comparison period based on the usage information provided by the thermostat device and the plurality of other thermostat devices including the comparison group. The unitary thermostat device where the comparison group is determined by profile information. The unitary thermostat device where the profile information is included of one or more of: a geographical location of a dwelling associated with the unitary thermostat device, a dwelling structural volume of the dwelling associated with the unitary thermostat device, a construction year of the dwelling associated with the unitary thermostat device, a foundation type of the dwelling associated with the unitary thermostat device, an elevation of the dwelling associated with the unitary thermostat device, a size of the dwelling associated with the unitary thermostat device, a format of the dwelling associated with the unitary thermostat device, a number of floors in the dwelling associated with the unitary thermostat device, a number of occupants associated with the dwelling associated with the unitary thermostat device, and a social group associated with a user of the unitary thermostat device. The unitary thermostat device where the comparison group is one of a symmetric group and an asymmetric group, where the symmetric group is defined as a group where if entity a is in entity b's group, then entity b is in entity a's group, and where the asymmetric group is defined as a group where entity a is in entity b's group, but entity b is not in entity a's group. The unitary thermostat device further including: the processor and memory, capable of receiving the climate system setting and further operable to request, by the unitary thermostat device, the climate system setting. The unitary thermostat device may also include receiving, in real-time, the climate system setting in response to the request and in temporal proximity to the request. The unitary thermostat device further including: the processor and memory, where to receive the climate system setting, further operable to: receive the climate system setting at a time designated by the server device. The unitary thermostat device where the climate system setting is determined based on a temporal comparison period, the temporal comparison period being n days in length and being repositioned by the server device on a daily basis. The unitary thermostat device where the climate system setting is determined based on a temporal comparison period, the temporal comparison period being n days in length and being moved by the server device at an end of the n days. The unitary thermostat device further including: the processor and memory further operable to determine a privacy mode setting; and the display operable to present, based on the privacy mode setting, the ecorank target setting. The unitary thermostat device where the unitary thermostat device communicates with the server device through a hub device. The unitary thermostat device where the unitary thermostat device and the hub device communicate using a first communication protocol and the hub device and the server device communicate using a second different communication protocol. Implementations of the described techniques may include hardware, a method or process, or computer software on a computer-accessible medium.

One general aspect includes a method of operating a unitary thermostat device including: sending, to a server device, an ecorank target setting, the ecorank target setting reflecting the desired usage of the climate system controlled by the unitary thermostat device in comparison to other usage of other climate systems controlled by other unitary thermostat devices; receiving, from the server device, a climate system setting; controlling, through a signaling interface, according to the climate system setting, a climate system including one or more climate system components, where the one or more climate system components are included of one or more of a heating component, a cooling component, a fan component, a humidification component, and a dehumidification component; and presenting, on a display of the unitary thermostat device, the climate system setting. Other embodiments of this aspect include corresponding computer systems, apparatus, and computer programs recorded on one or more computer storage devices, each configured to perform the actions of the methods.

One general aspect includes a non-transitory computer readable medium storing program codes that when executed instruct a processor in a unitary thermostat device to perform the steps of: sending, to a server device, an ecorank target setting, the ecorank target setting reflecting the desired usage of the climate system controlled by the unitary thermostat device in comparison to other usage of other climate systems controlled by other unitary thermostat devices; receiving, from the server device, a climate system setting; controlling, through a signaling interface, according to the climate system setting, a climate system including one or more climate system components, where the one or more climate system components are included of one or more of a heating component, a cooling component, a fan component, a humidification component, and a dehumidification component; and presenting, on a display of the unitary thermostat device, the climate system setting. Other embodiments of this aspect include corresponding computer systems, apparatus, and computer programs recorded on one or more computer storage devices, each configured to perform the actions of the methods.

One general aspect includes a system including: a unitary thermostat device including: a housing, a signaling interface attached to the housing and operable to control a climate system including one or more climate system components. The system also includes a first communications interface attached to the housing; a first processor and a first memory within to the housing and associated with the first communications interface and operable to send, to a server device, an ecorank target setting. The system also includes receiving, from the server device, a climate system setting; and a display attached to the housing and operable to present the climate system setting. The system also includes a second communications interface; a second processor and a second memory associated with the second communications interface and operable to receive, from the thermostat device, the ecorank target setting. The system also includes determining, based on climate system usage information, the climate system setting. The system also includes sending, to the thermostat device, the climate system setting. Other embodiments of this aspect include corresponding computer systems, apparatus, and computer programs recorded on one or more computer storage devices, each configured to perform the actions of the methods.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1D is a graphical depiction of the thermostat device according to the eco priority mode of operation without privacy enabled;

FIG. 1E is a graphical depiction of the thermostat device according to the eco priority mode of operation with privacy enabled;

FIG. 1G is a graphical depiction of thermostat device using ecorank trend indicators according to some embodiments;

FIG. 4G illustrates an exemplary database relationship diagram according to some embodiments;

Figure 5A:
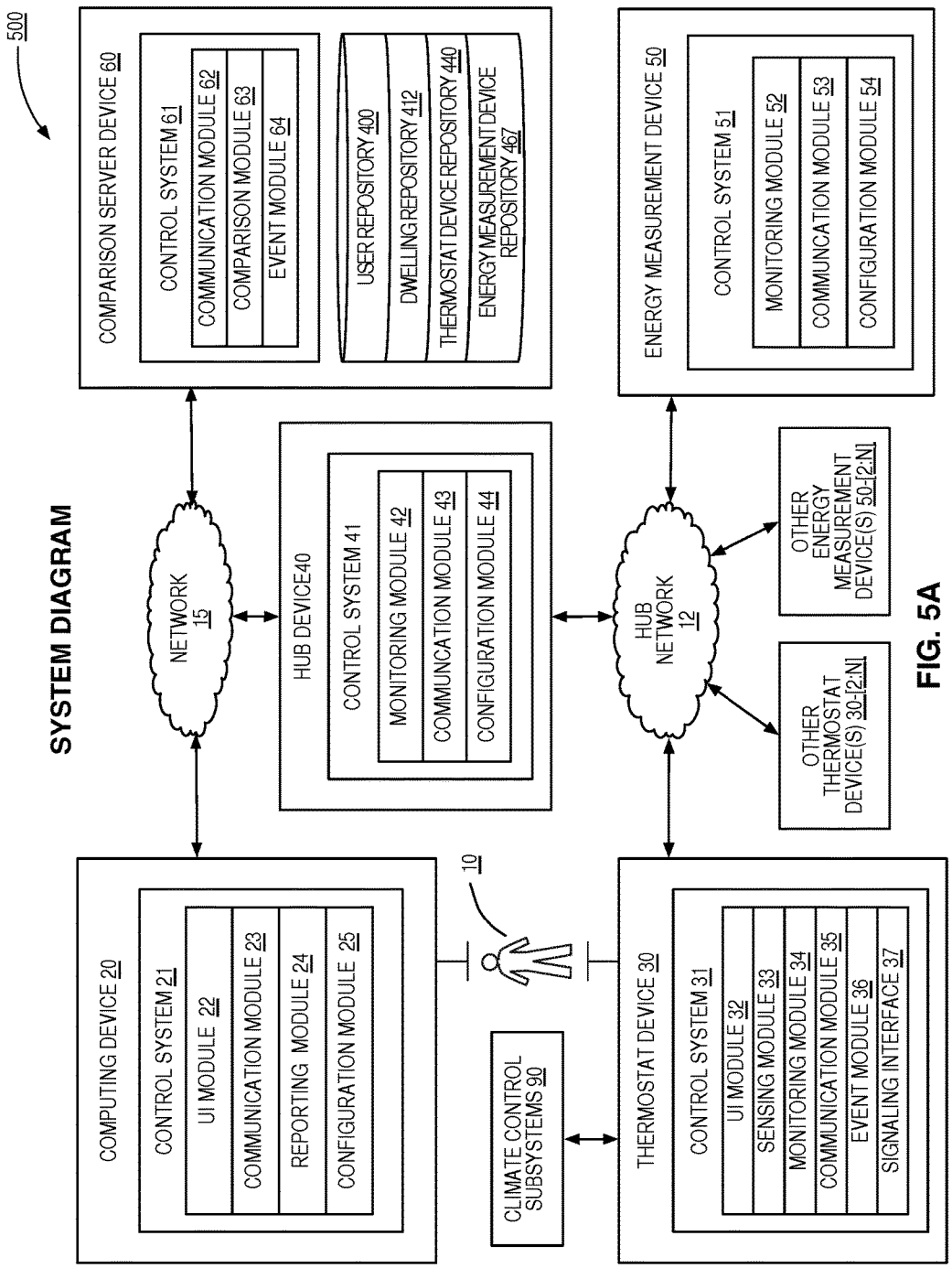
Figure 5B:
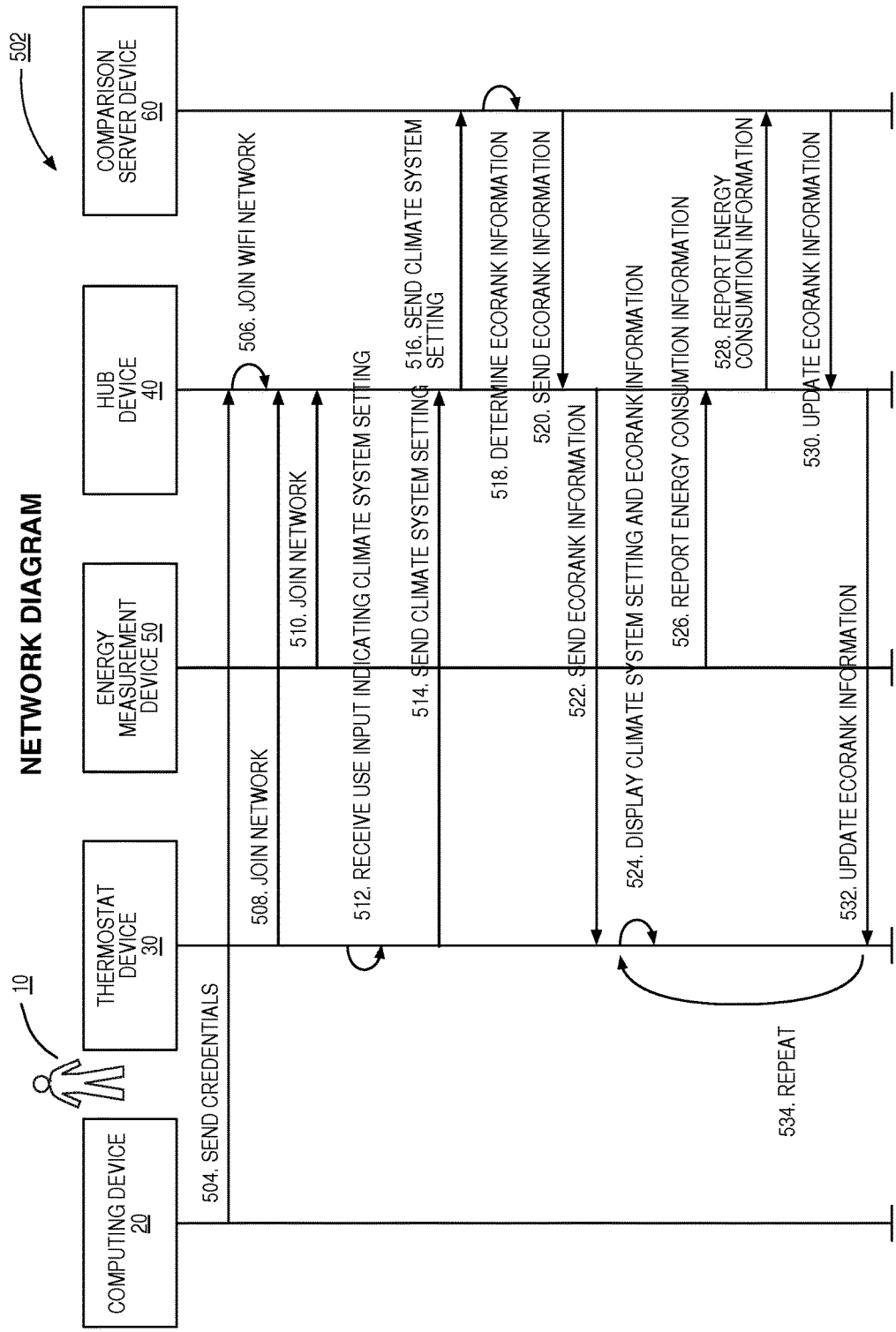
Figure 5C:
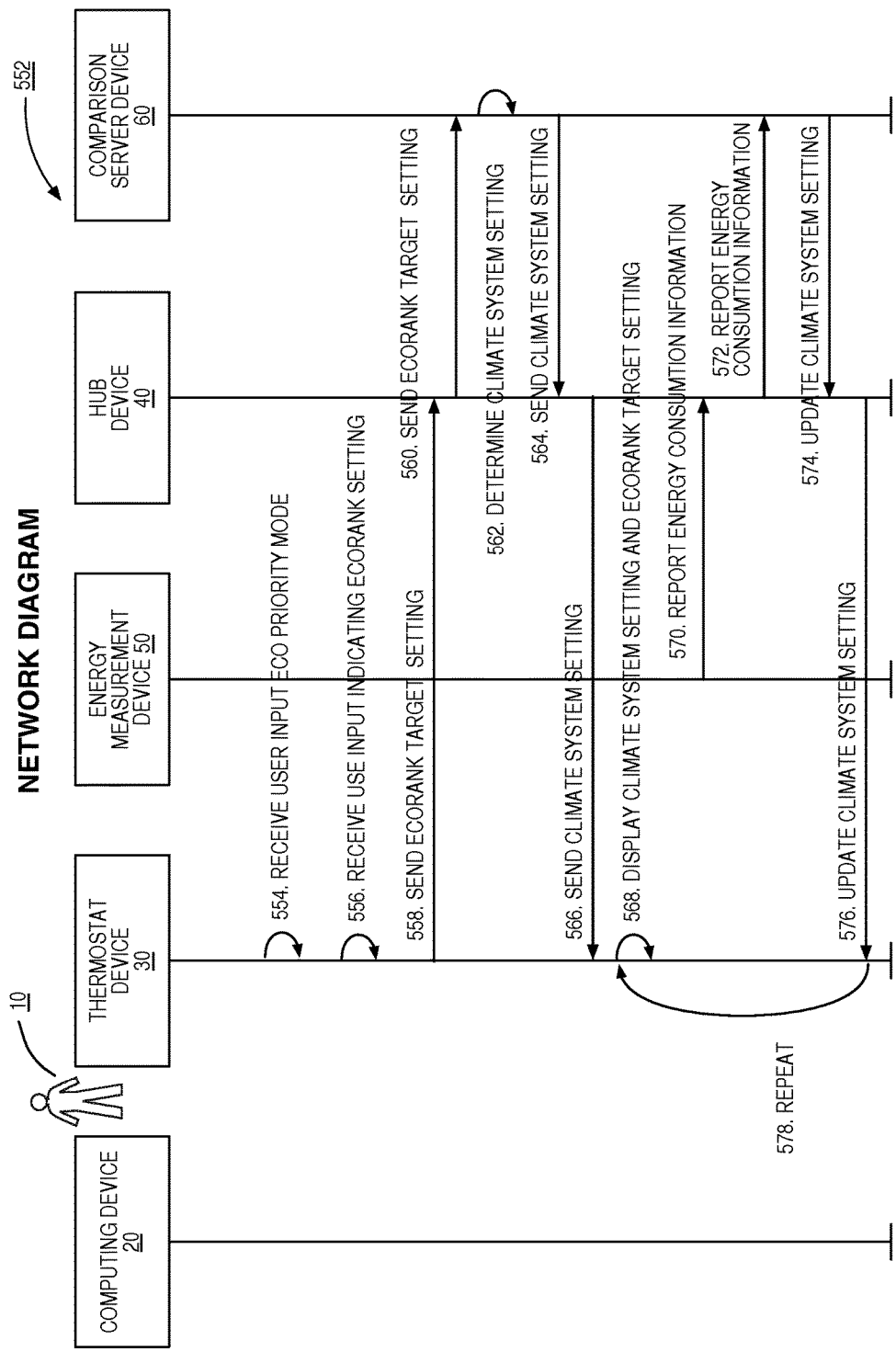
Figure 6A:
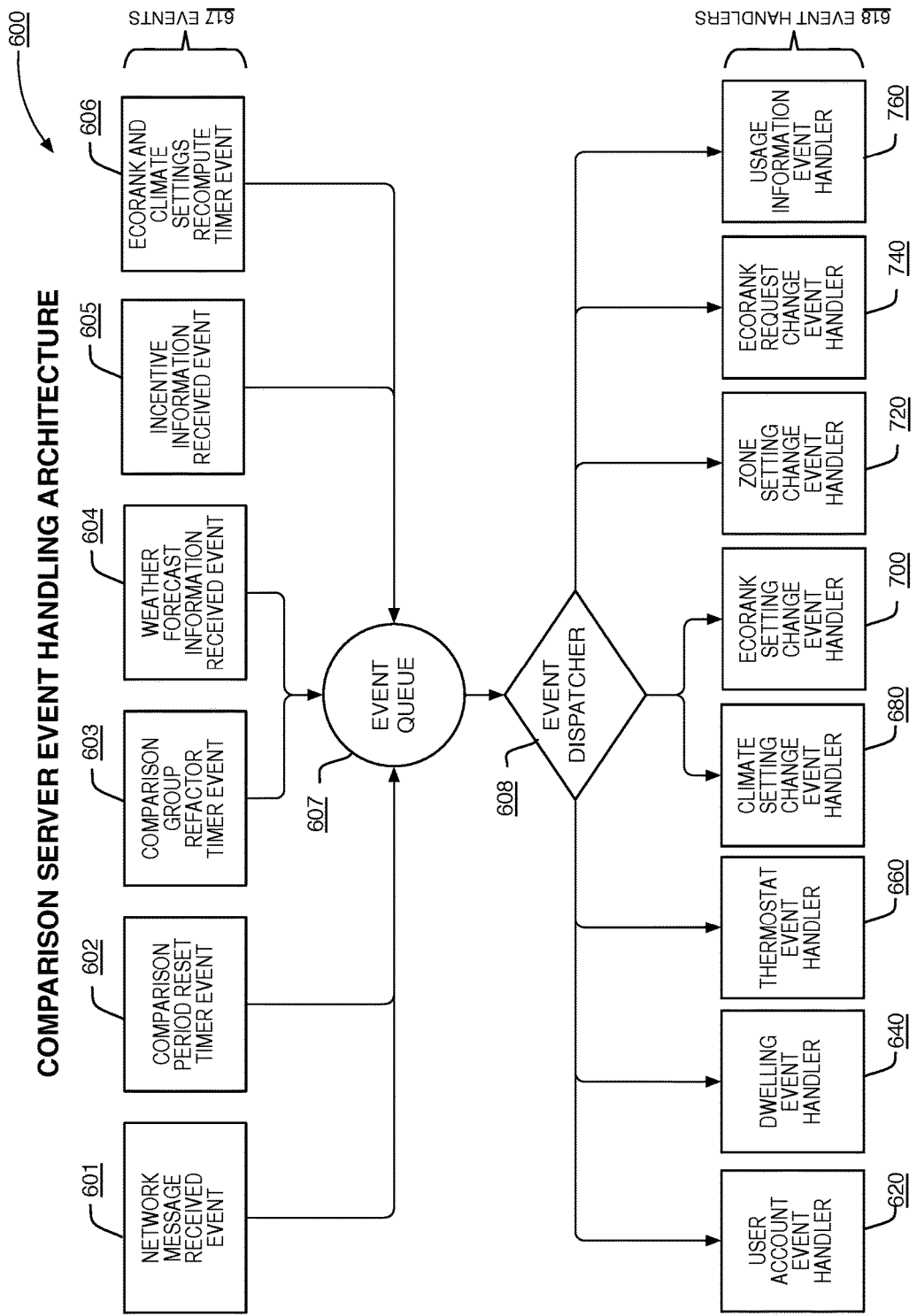
Figure 6B:
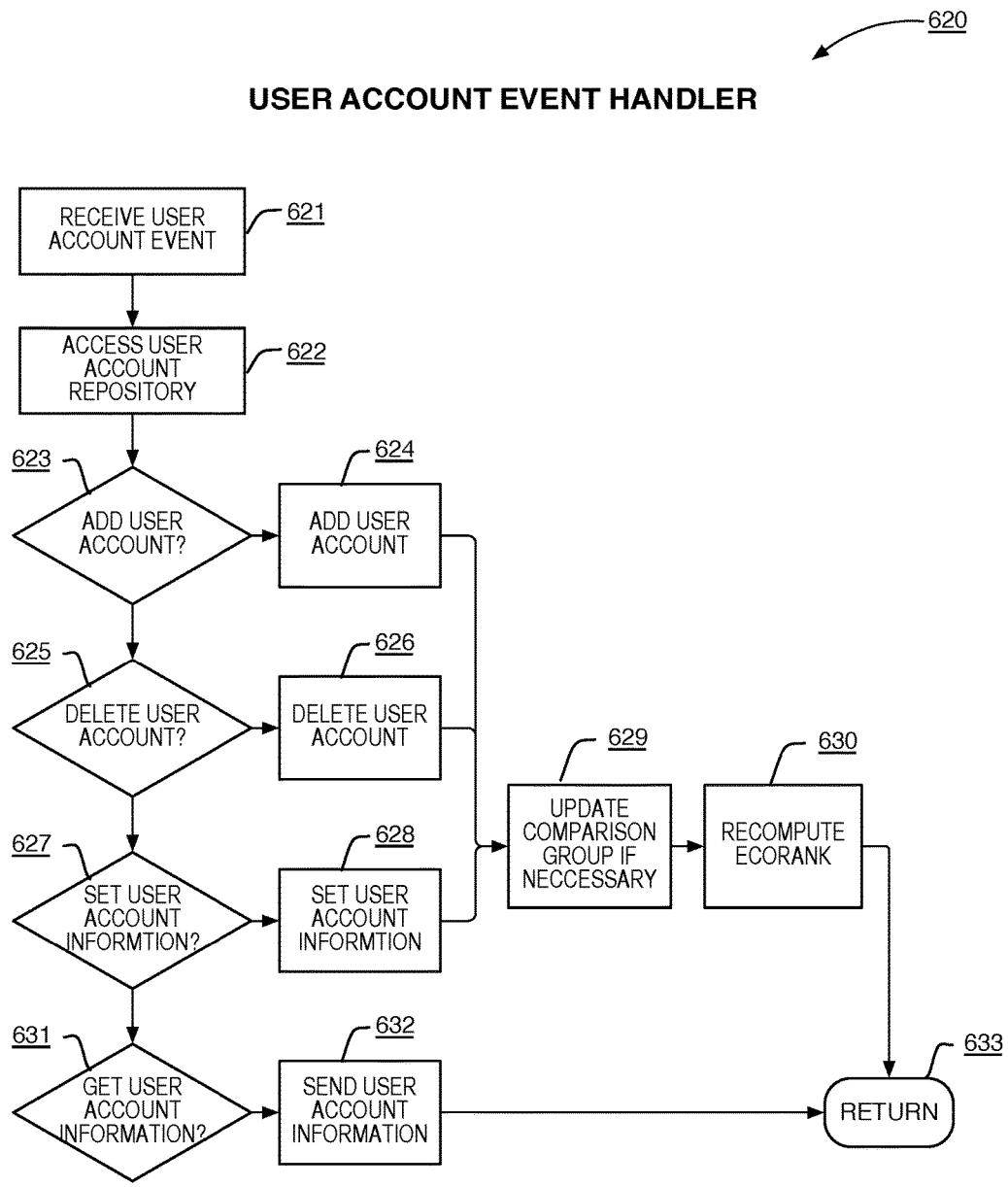
Figure 6C:
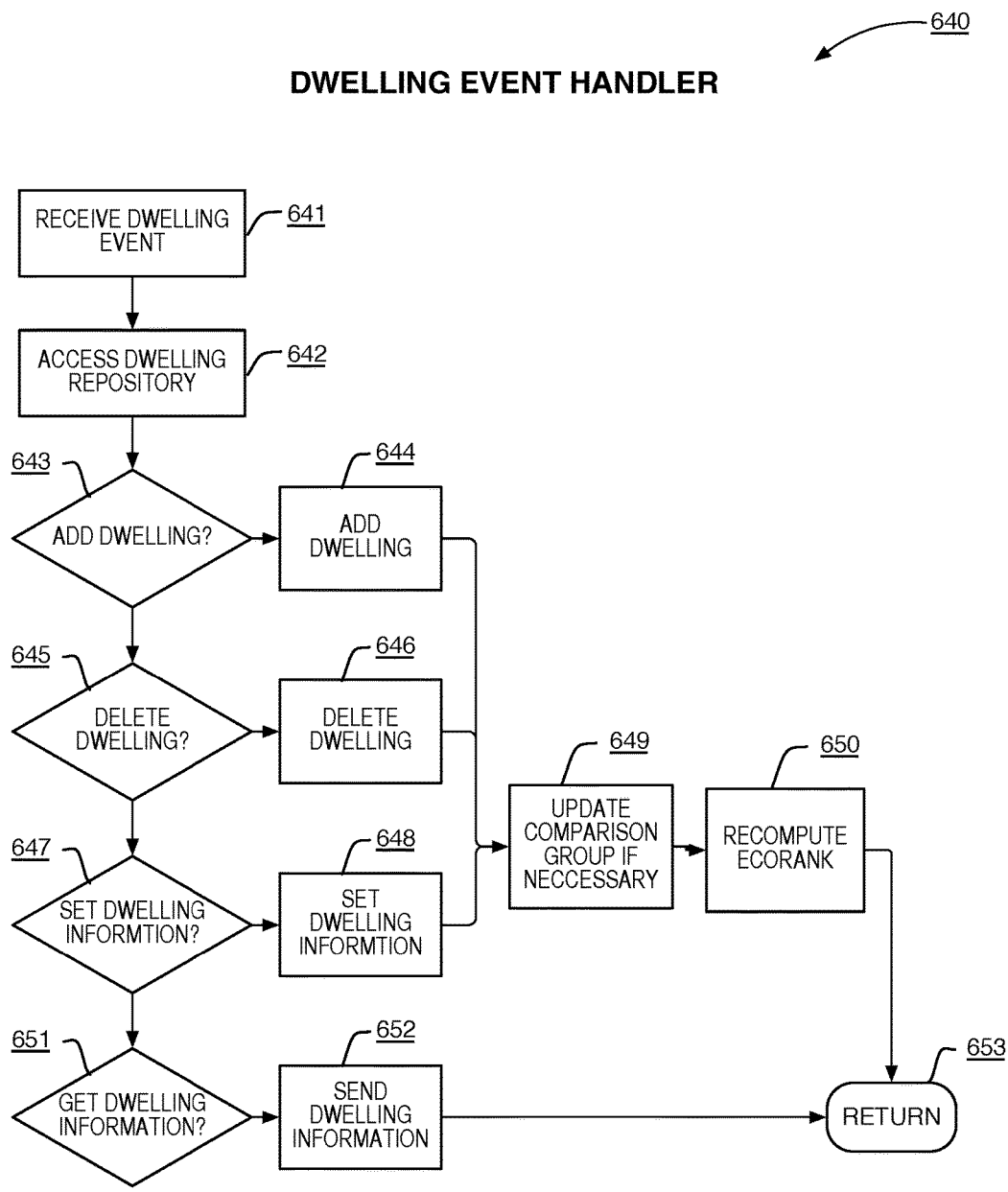
Figure 6D:
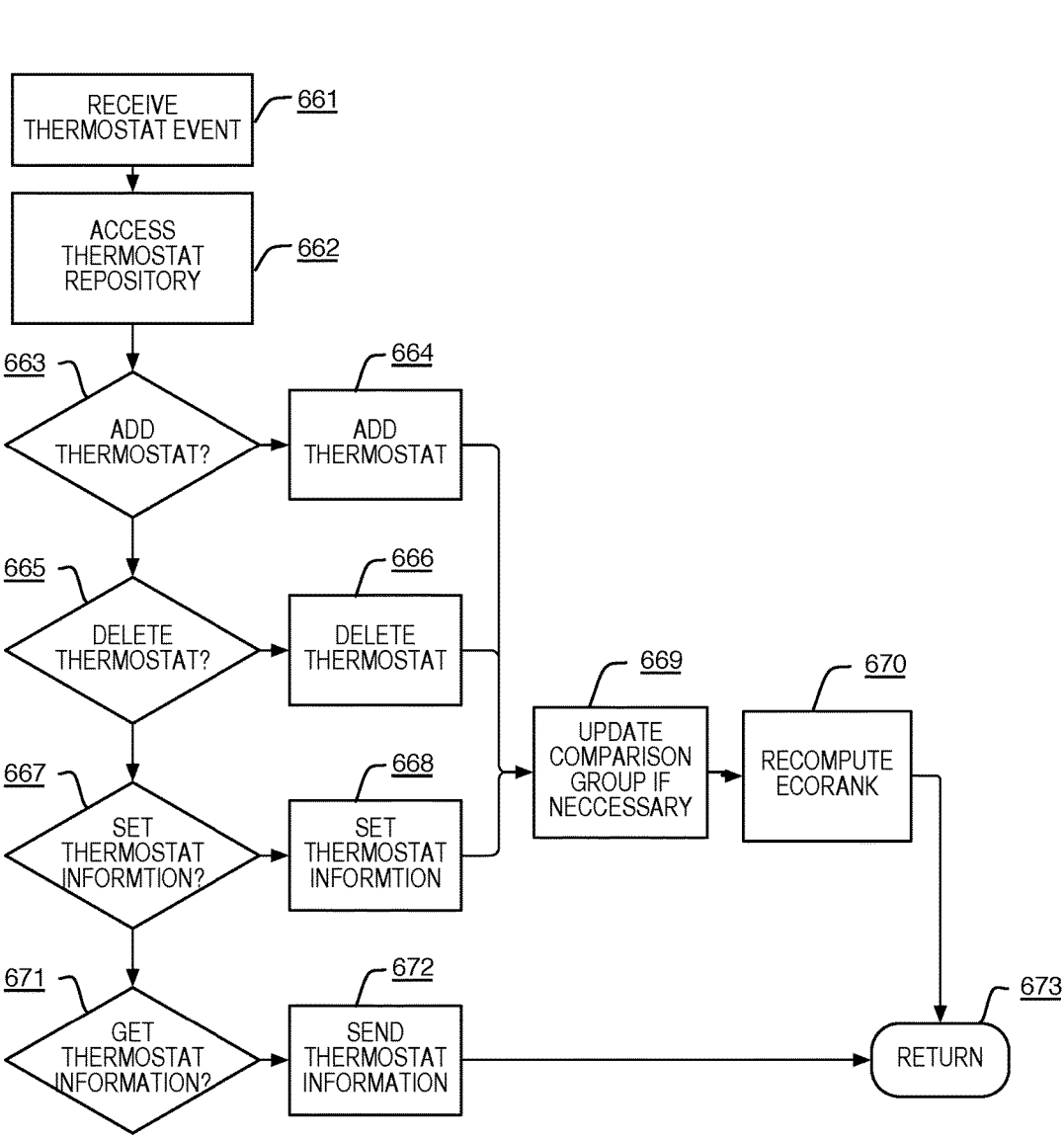
Figure 6E:
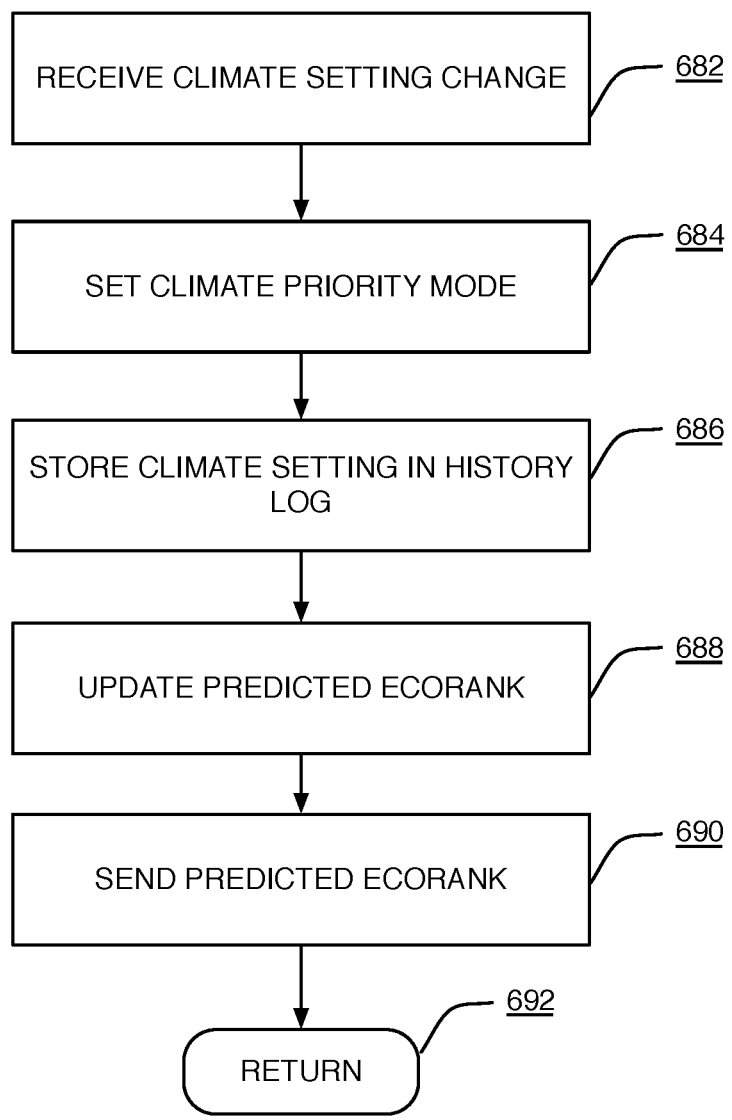
Figure 7A:
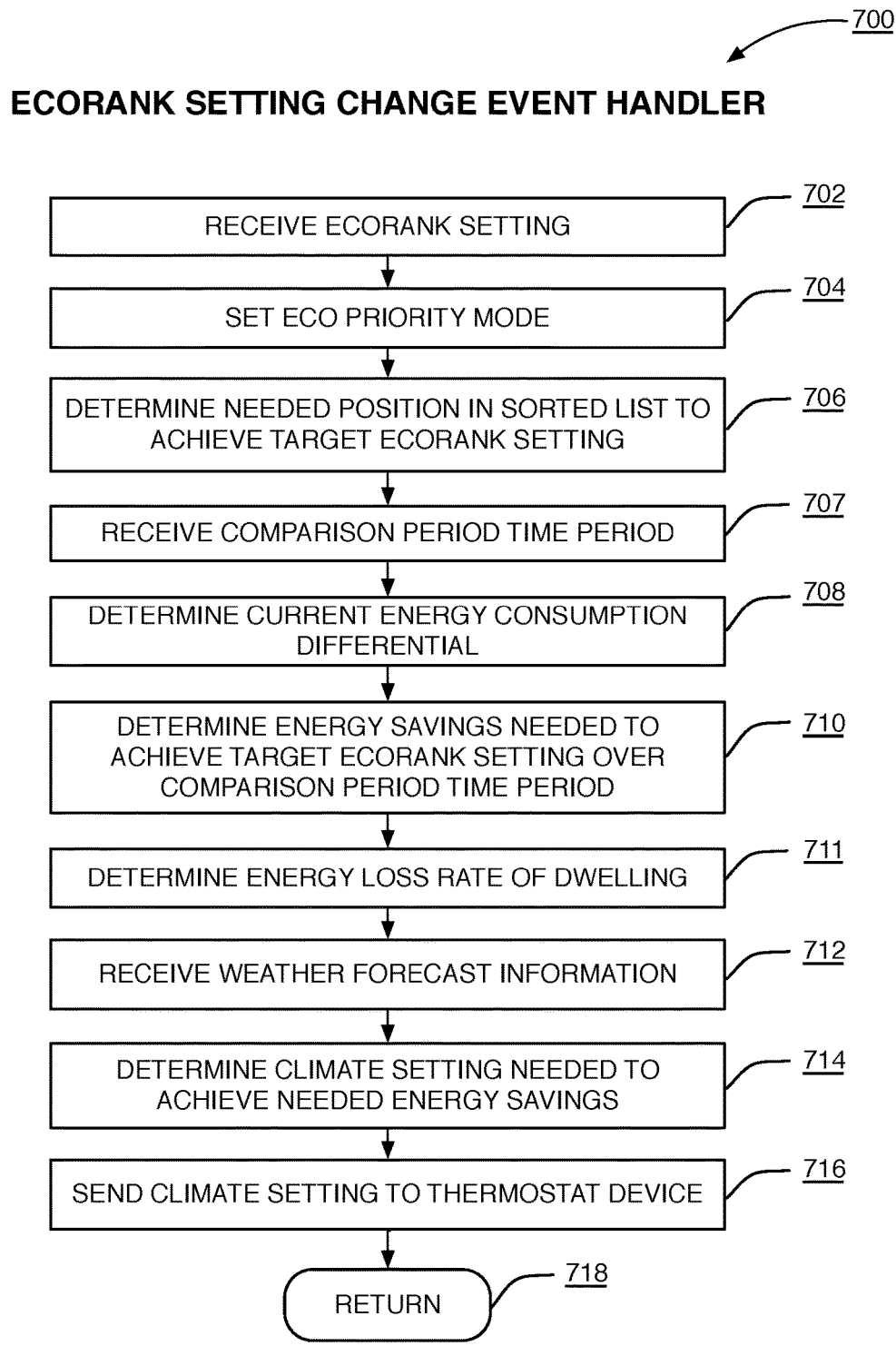
Figure 7B:
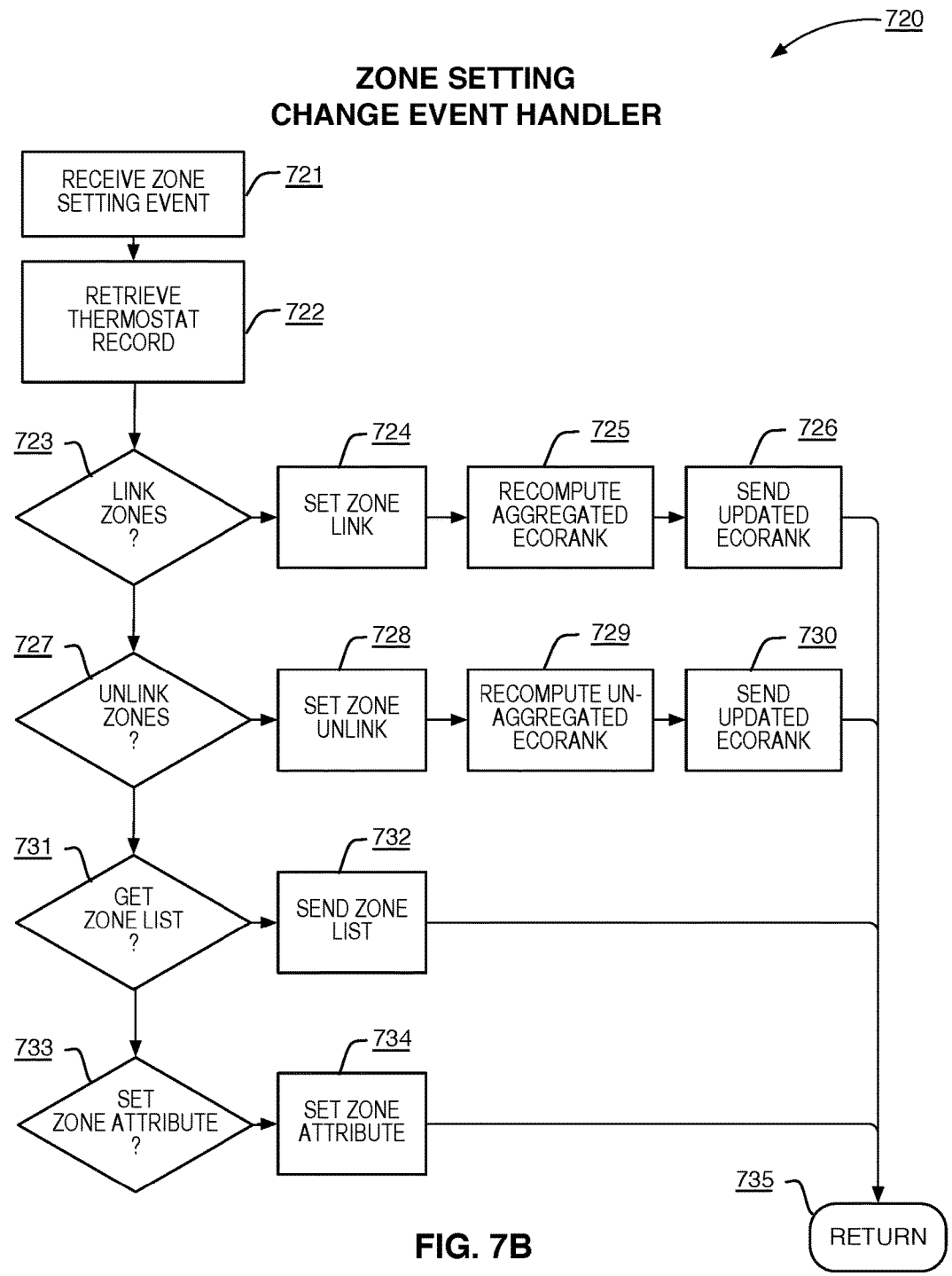
Figure 7C:
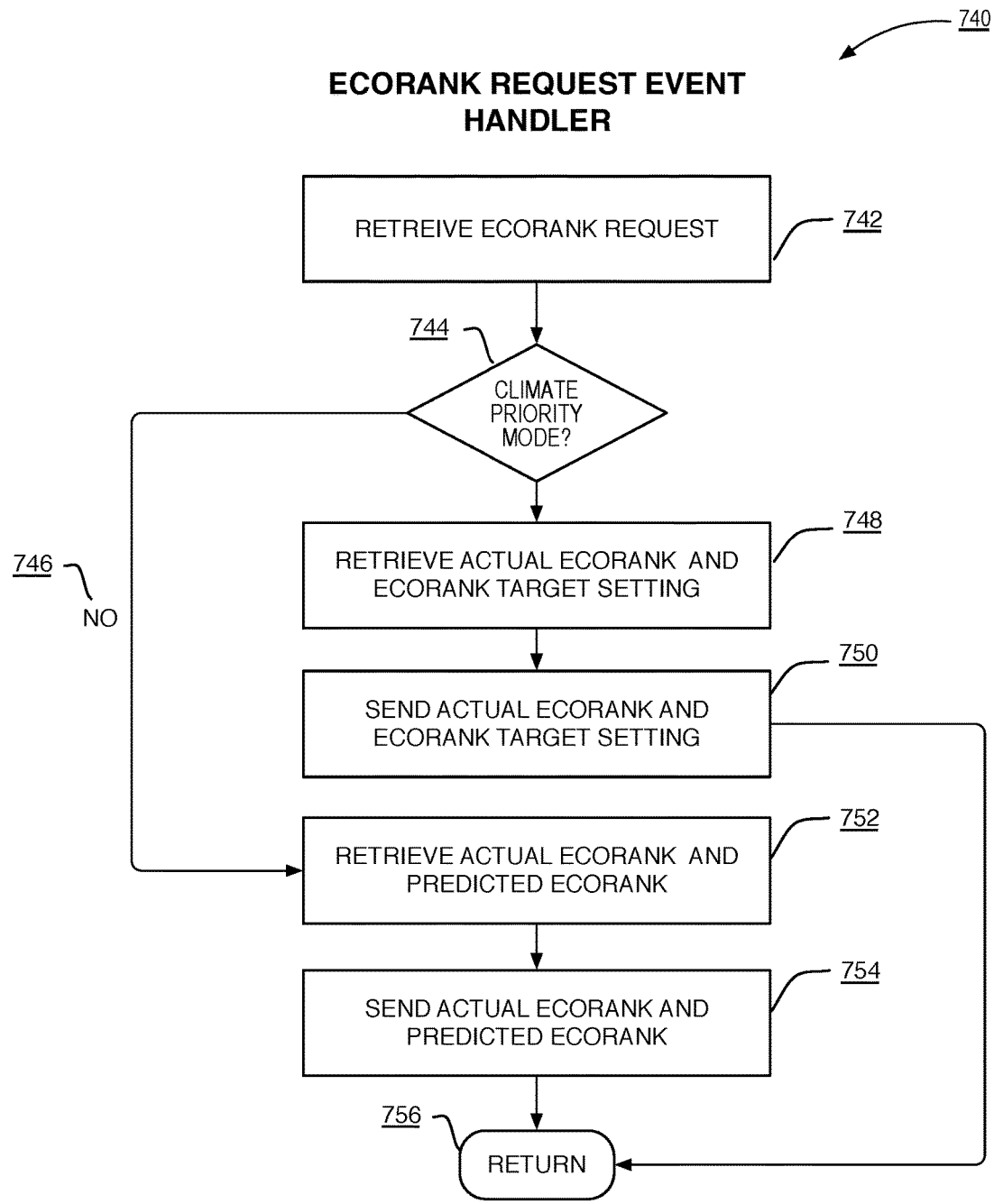
Figure 7D:
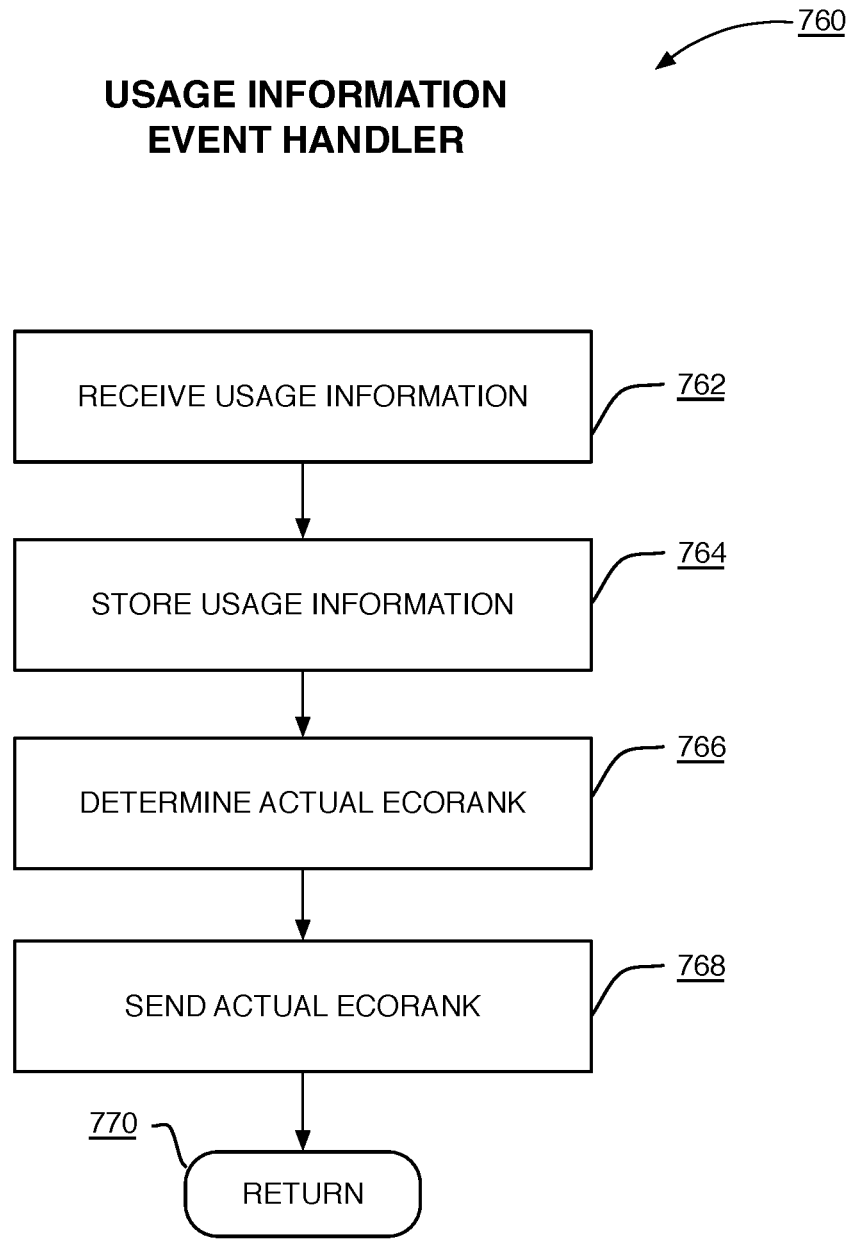
Figure 7E:
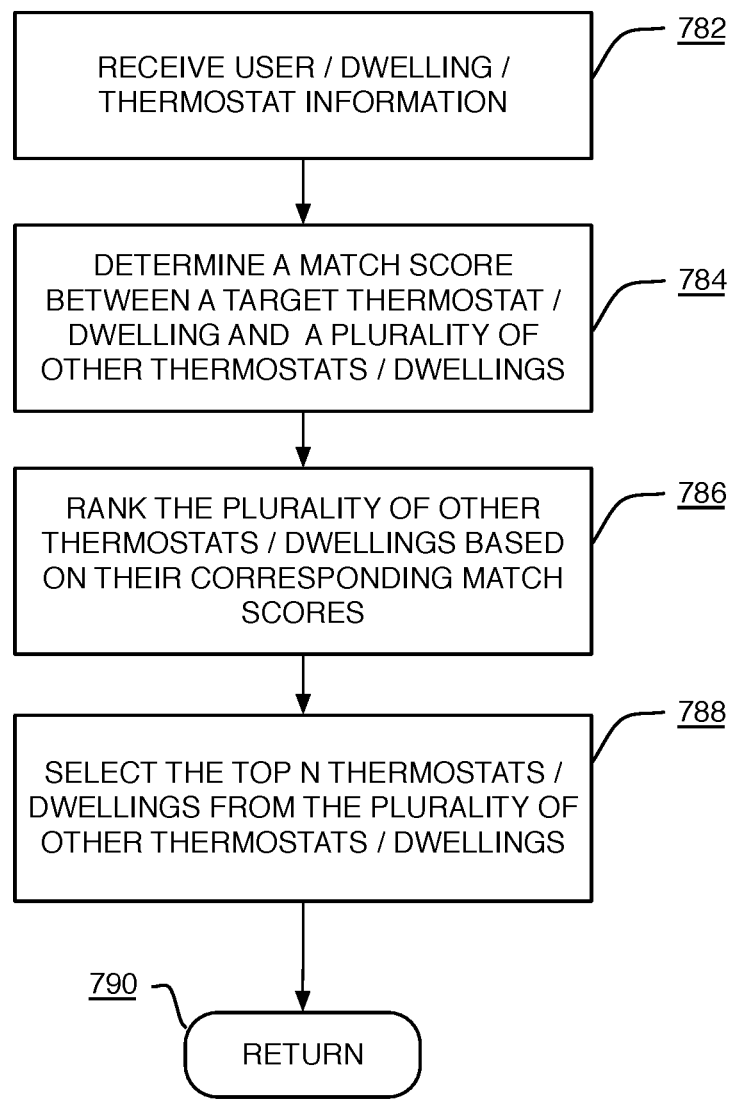
Figure 8B:
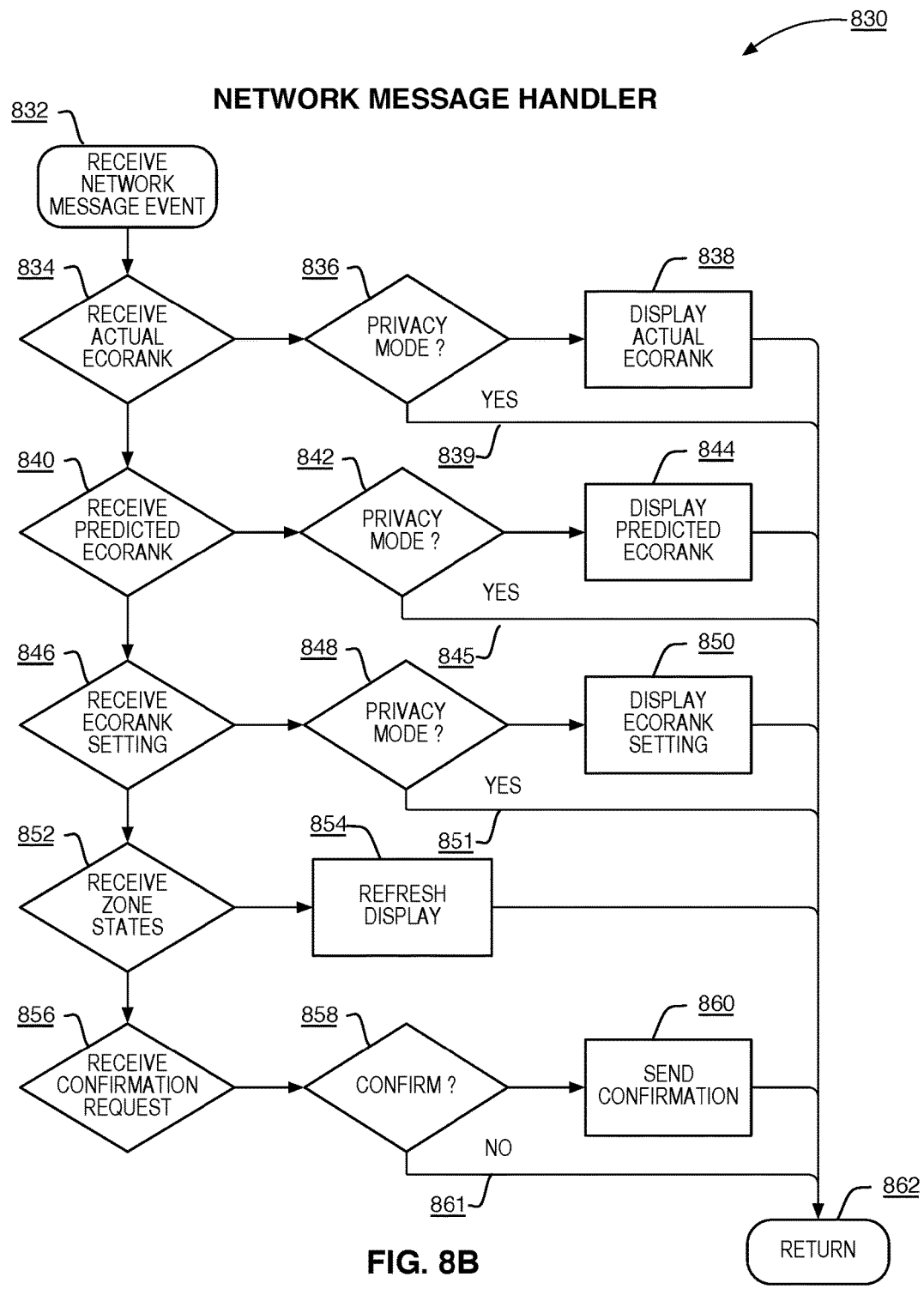
Figure 8C:
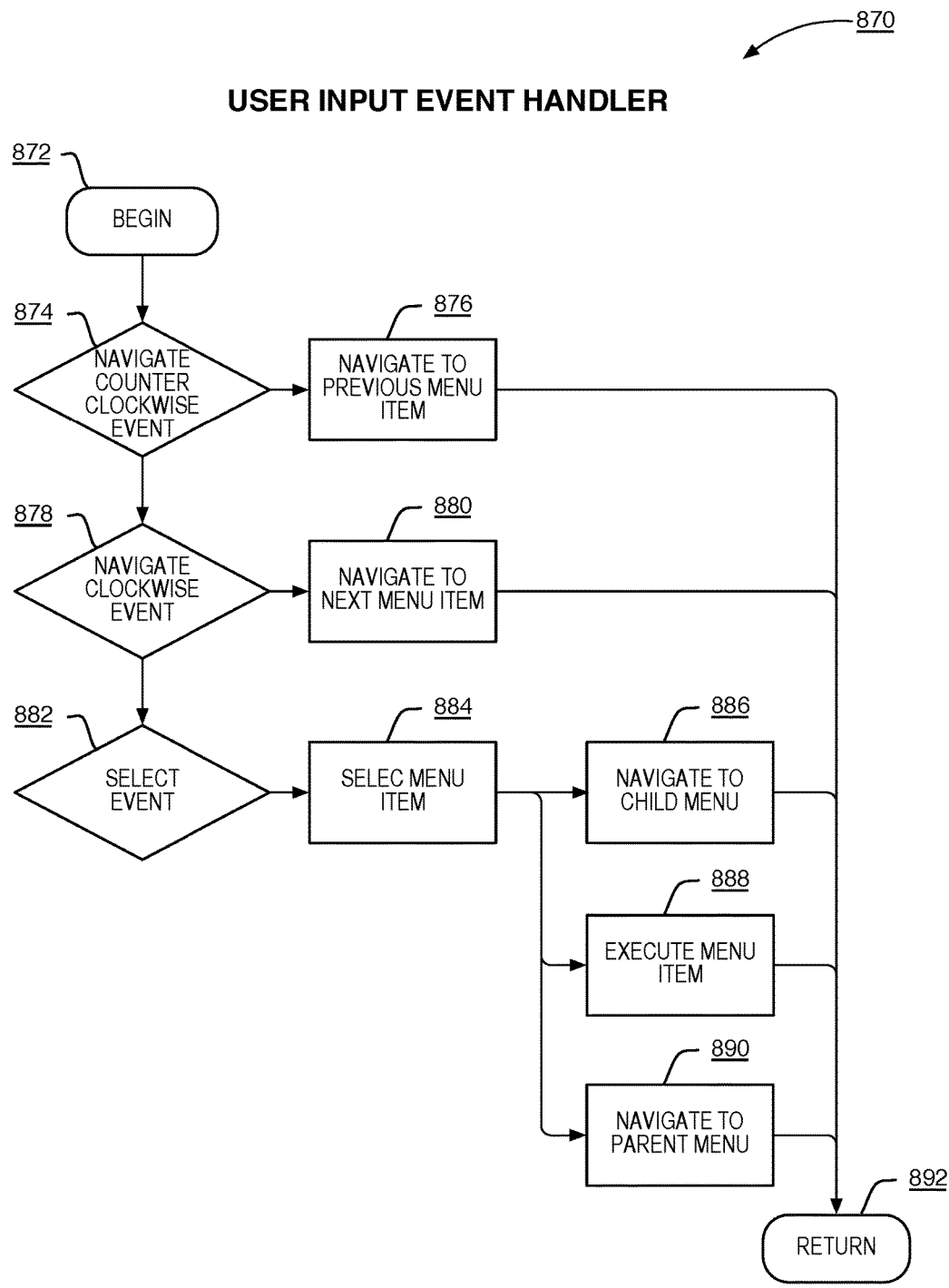
Figure 9:
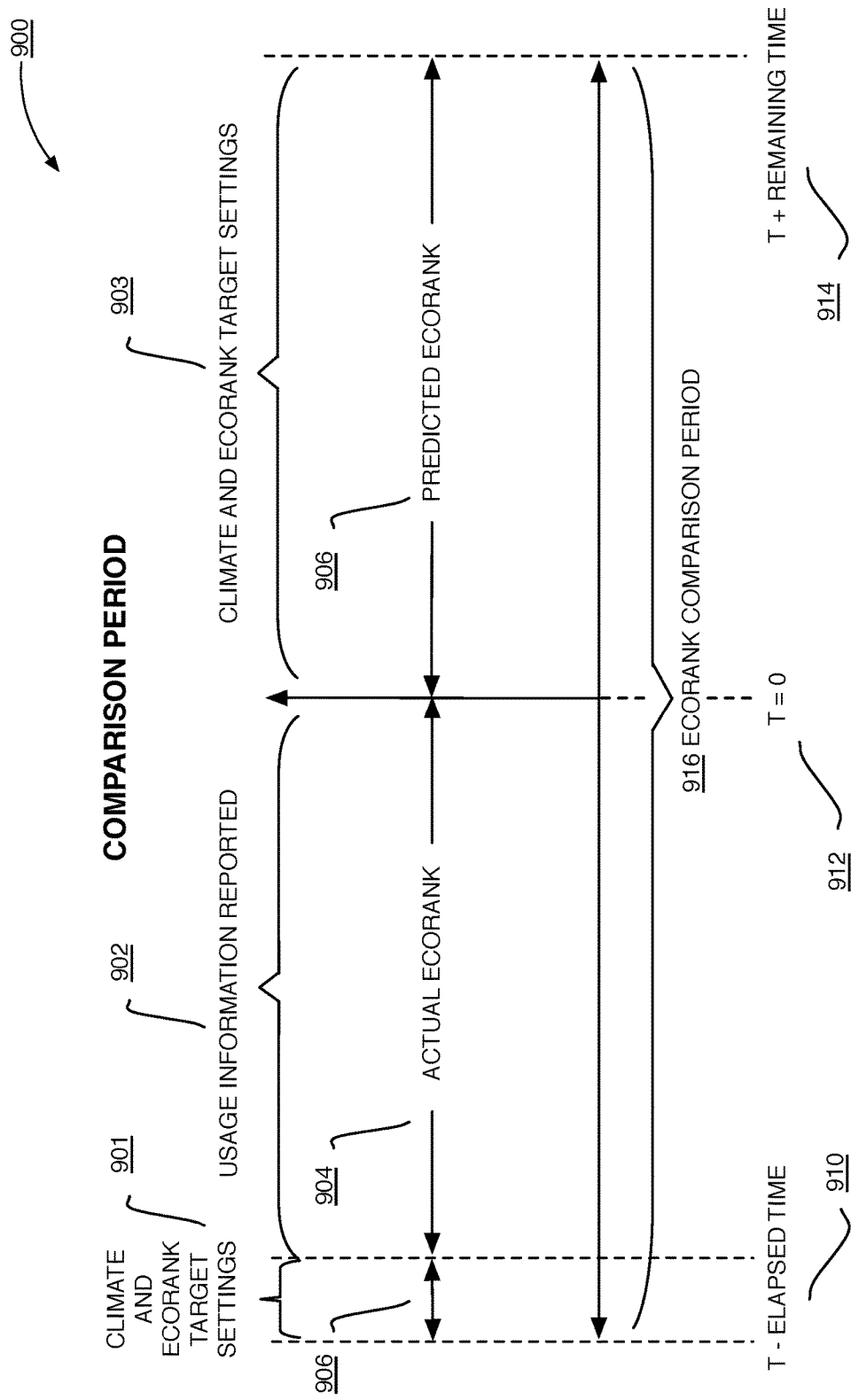
Figure 10:
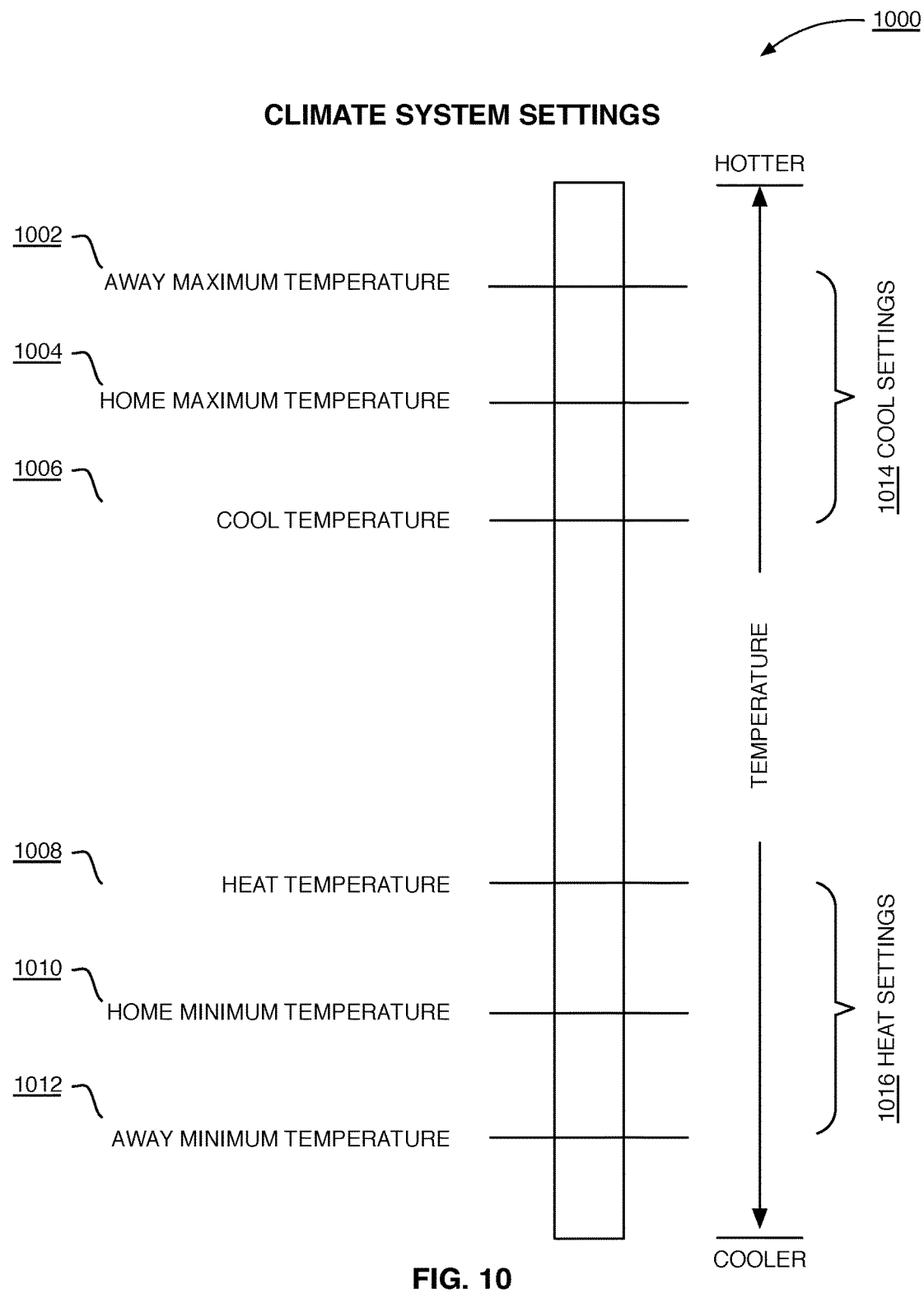
Figure 13:
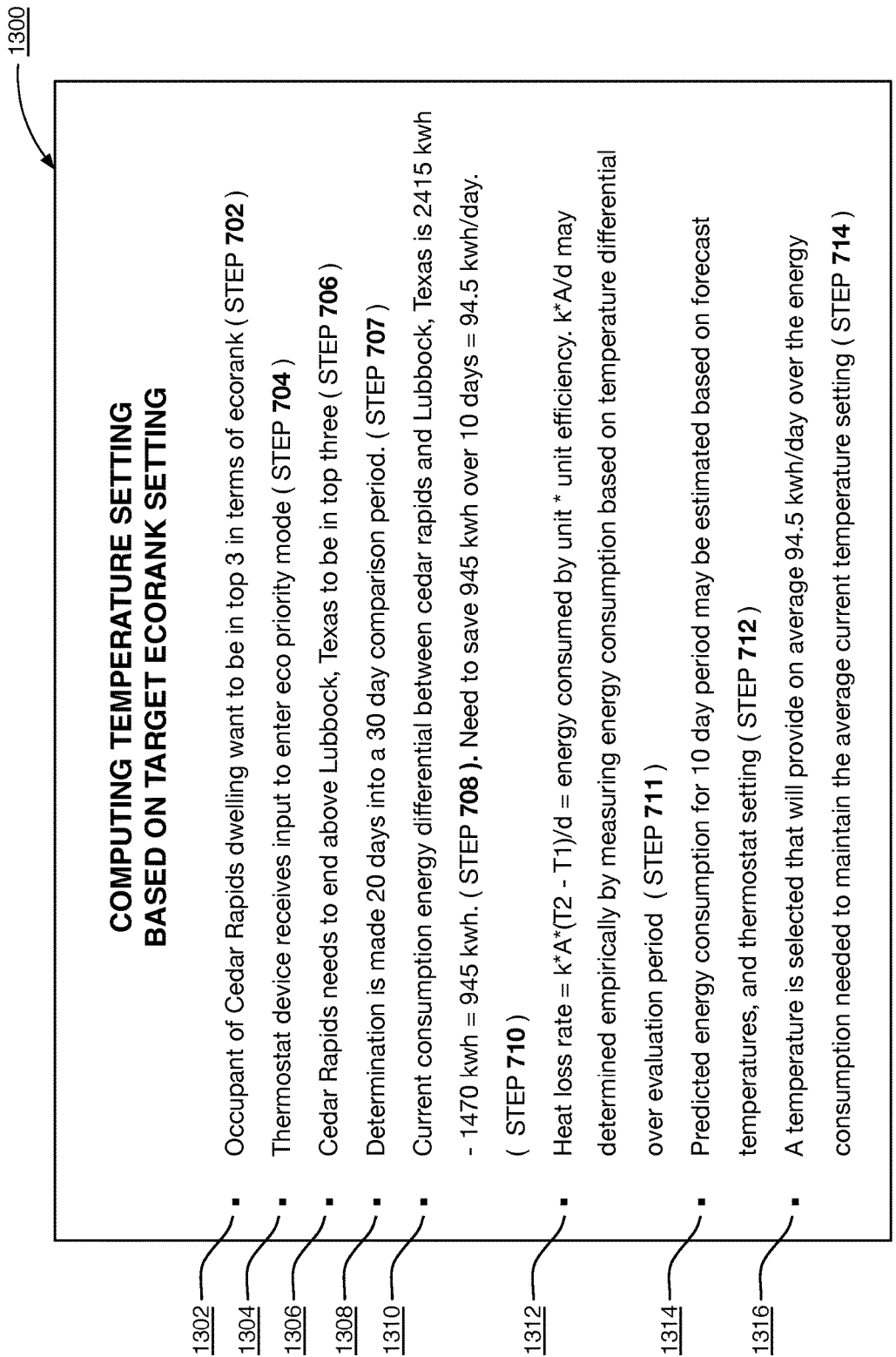
Figure 14A:
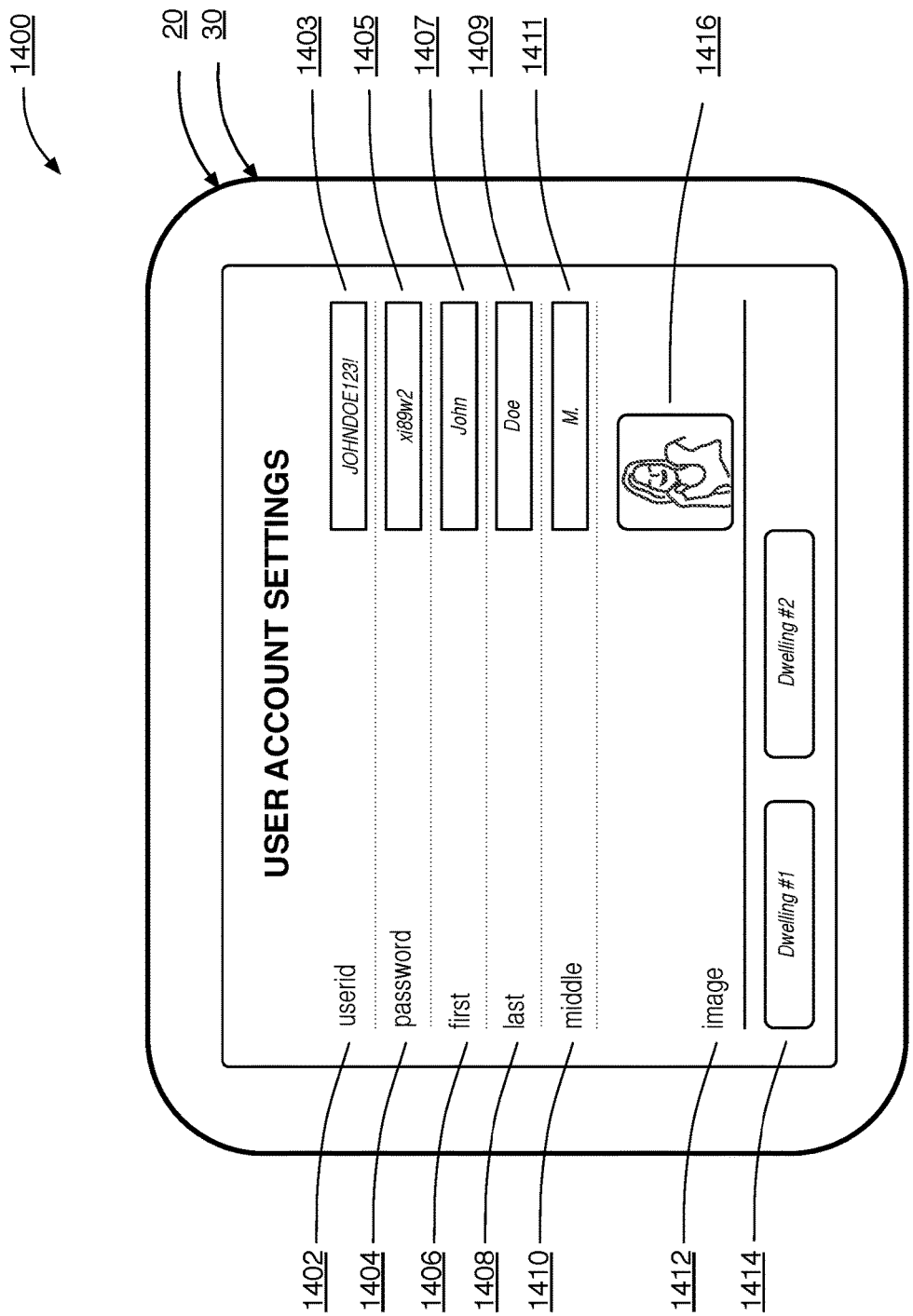
Figure 14B:
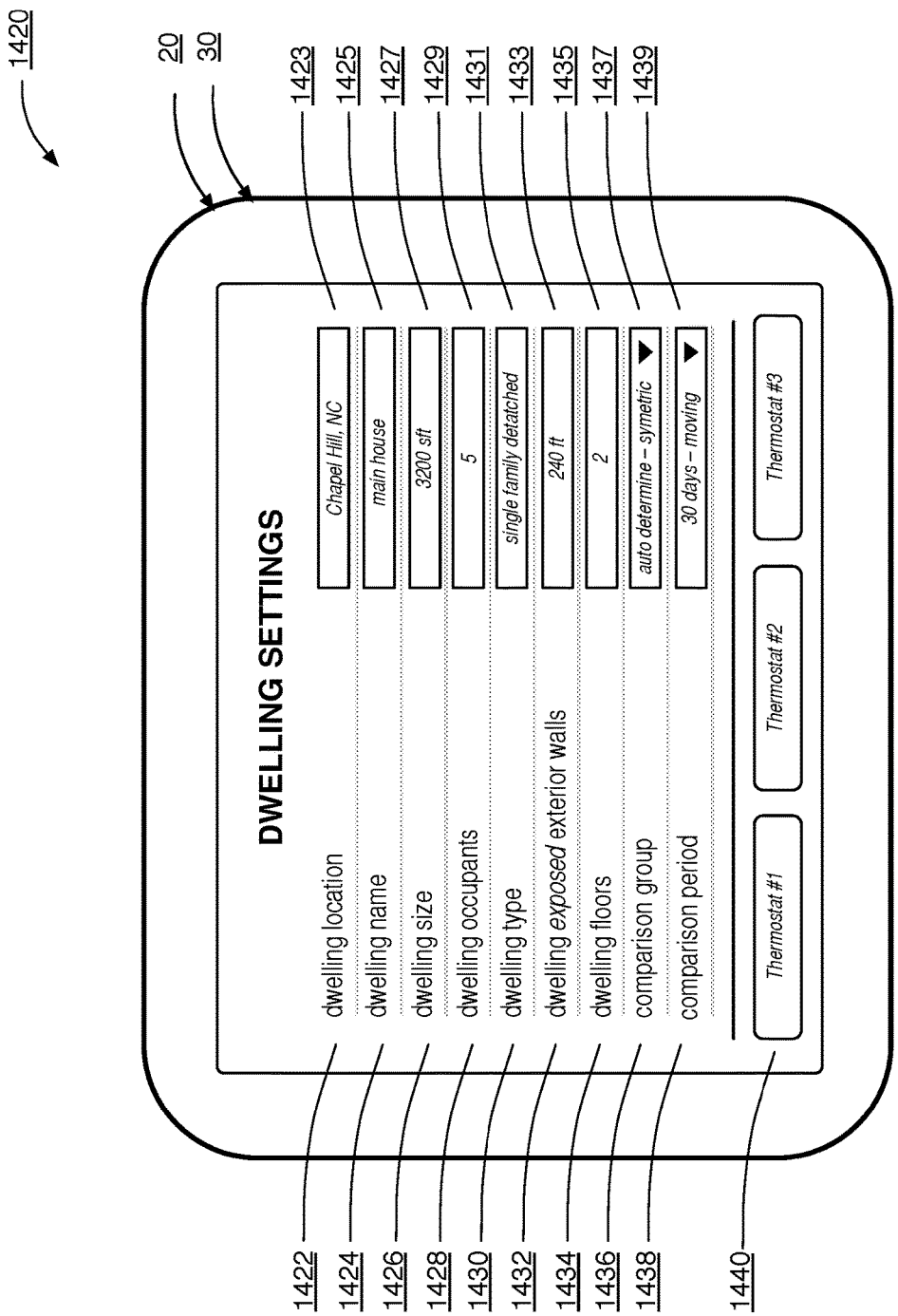
Figure 14C:
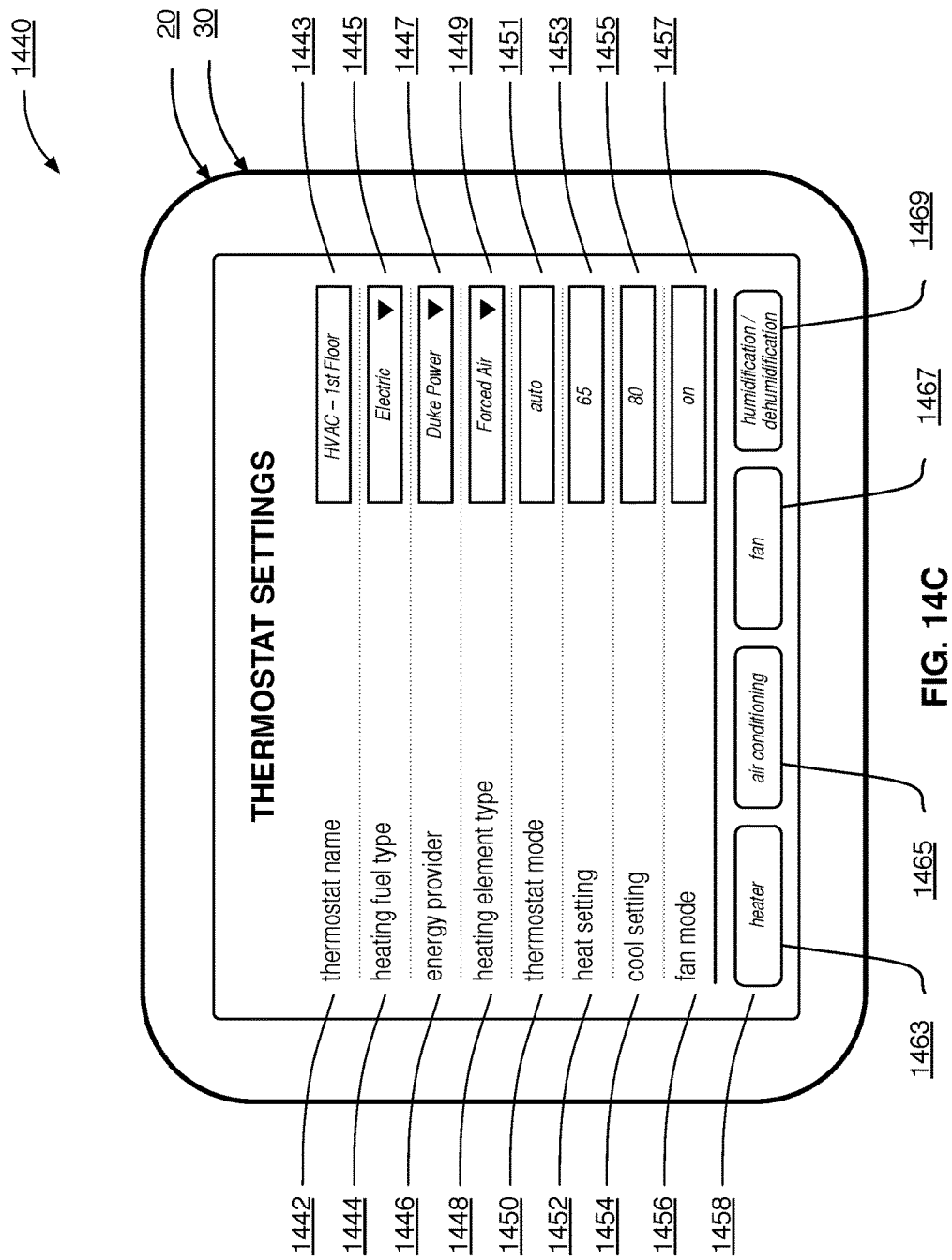
Figure 14D:
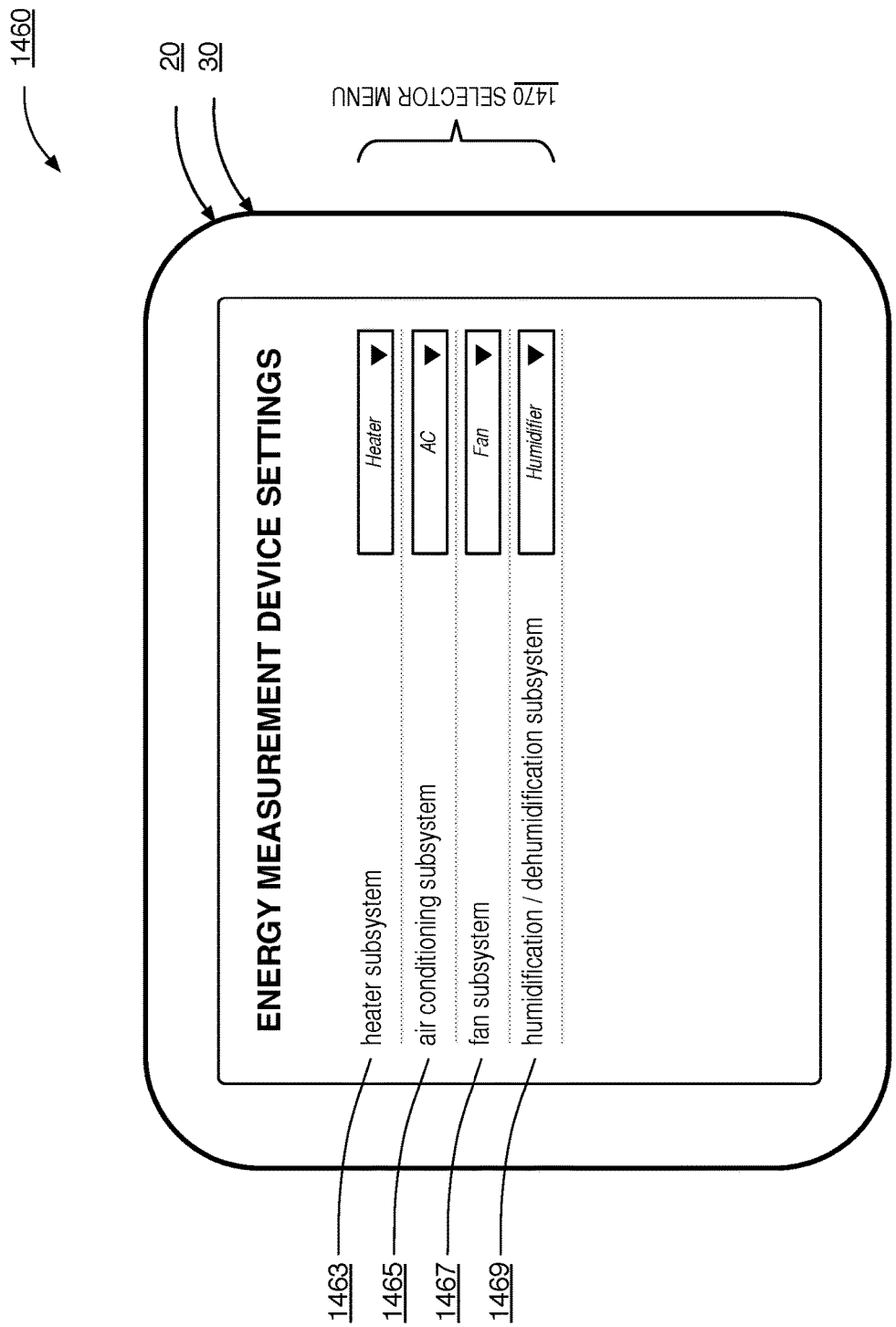
Figure 15A:
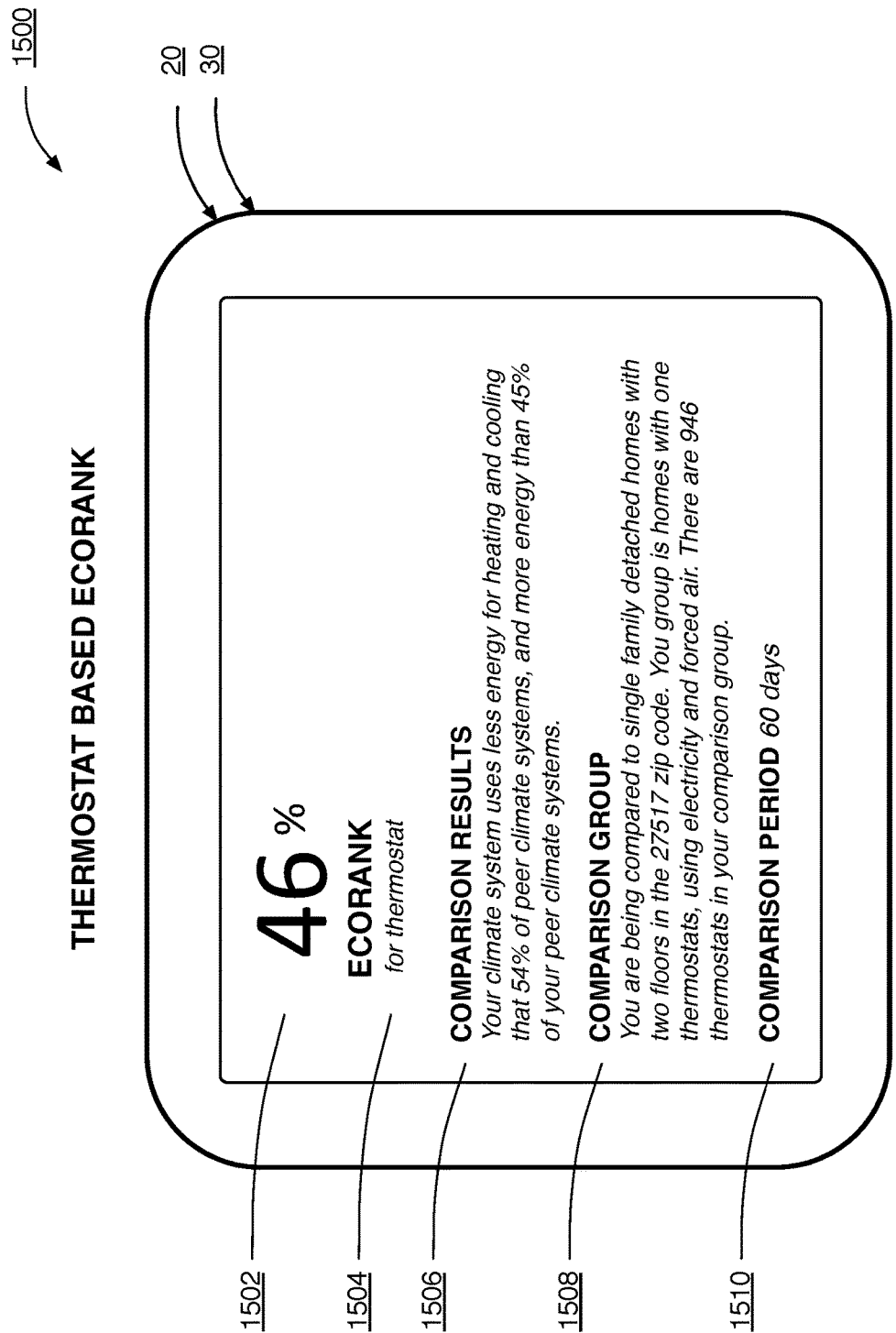
Figure 15B:
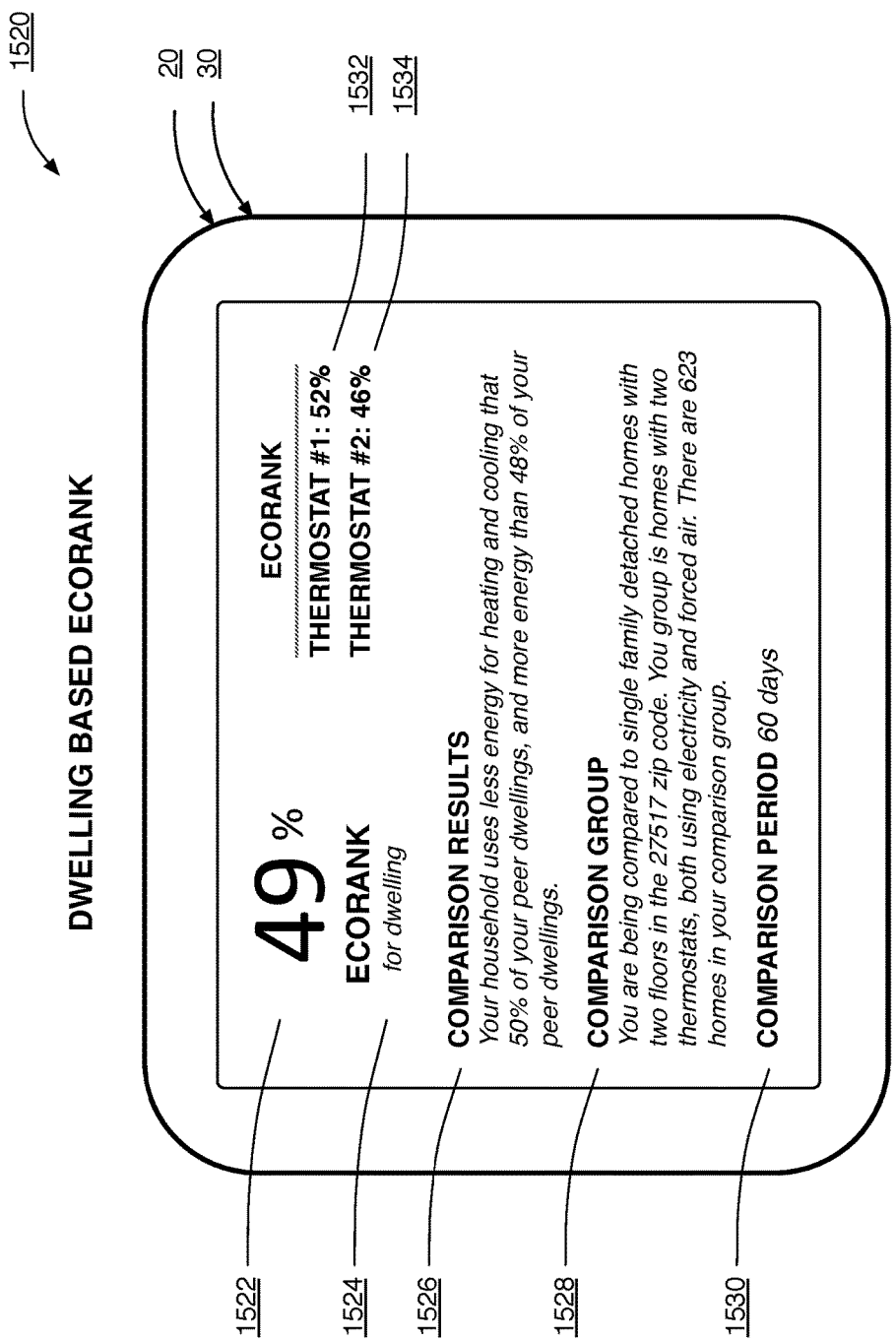
Figure 15C:
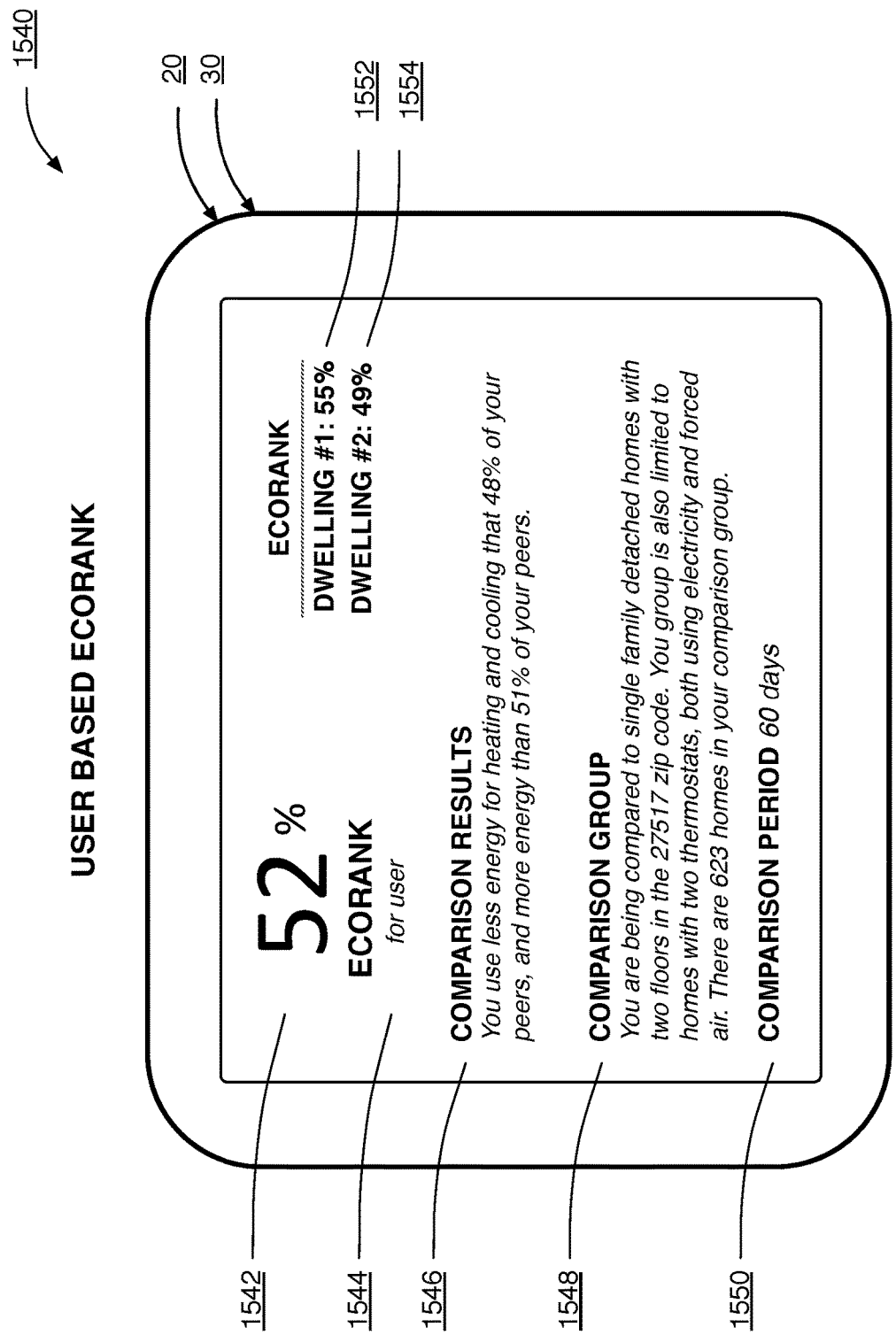
Figure 17A:
Figure 17B:
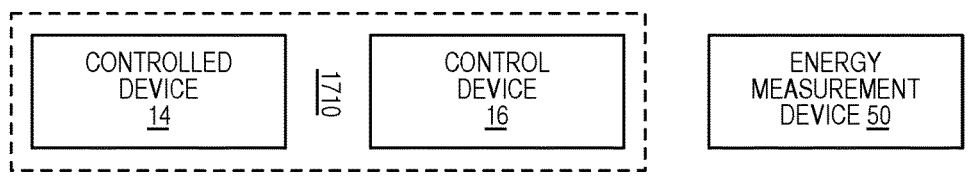
Figure 17C:
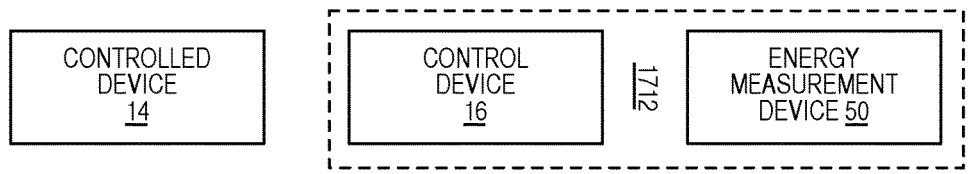
Figure 17D:
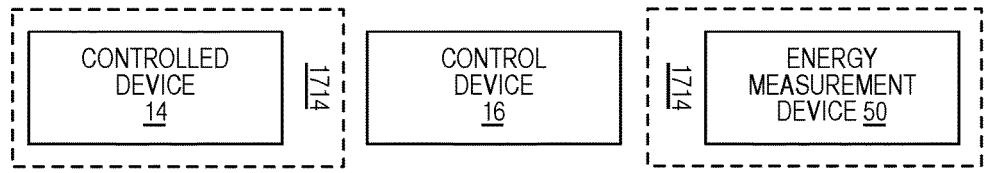
Figure 17E:
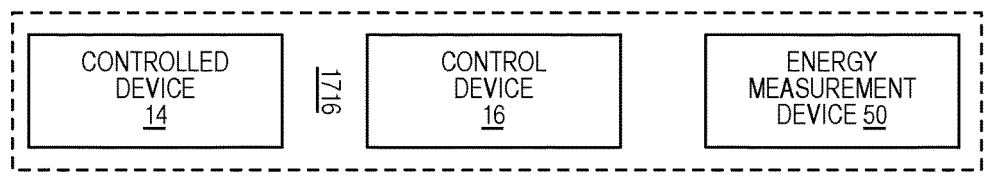
Figure 17F:
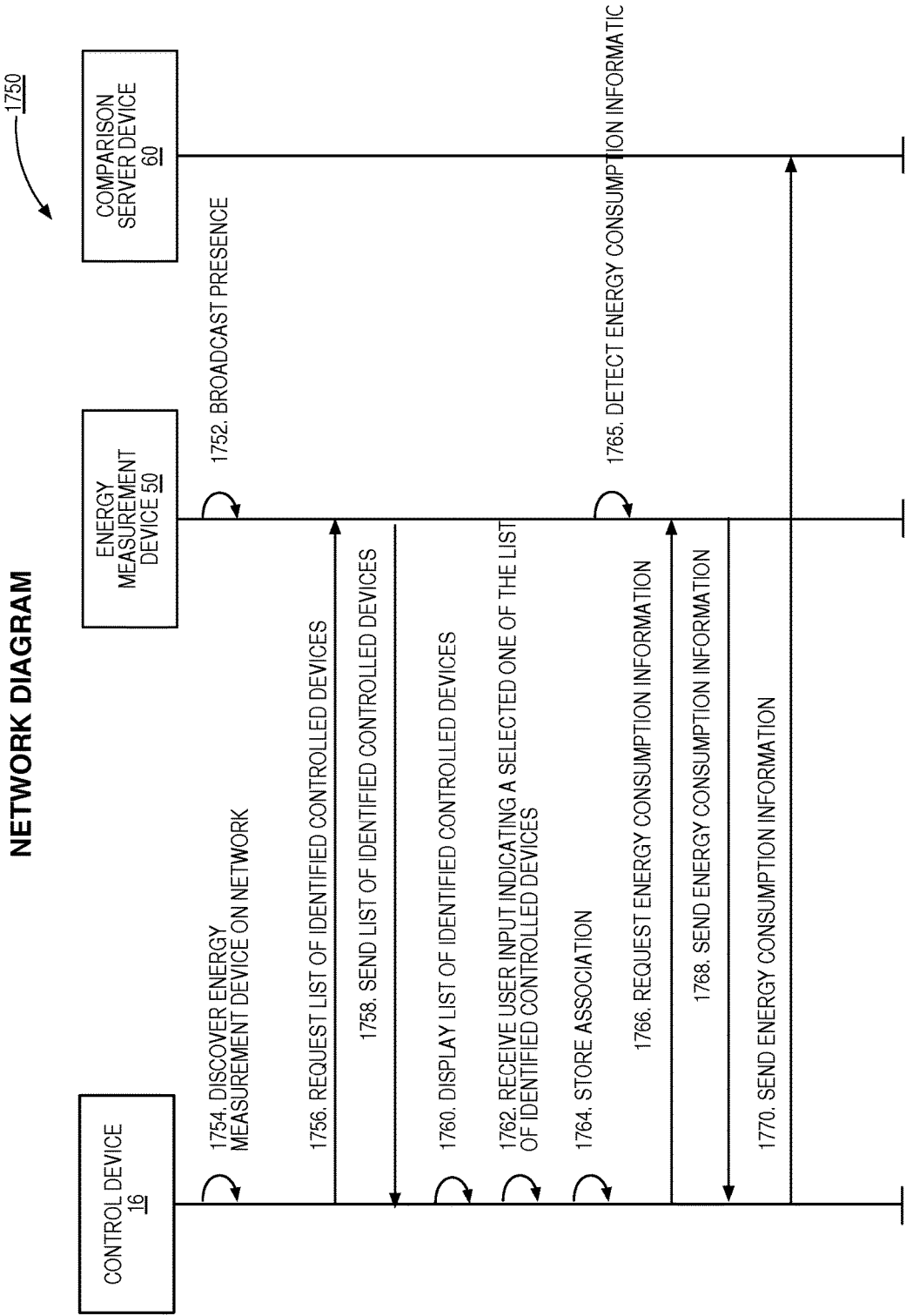
Figure 18:
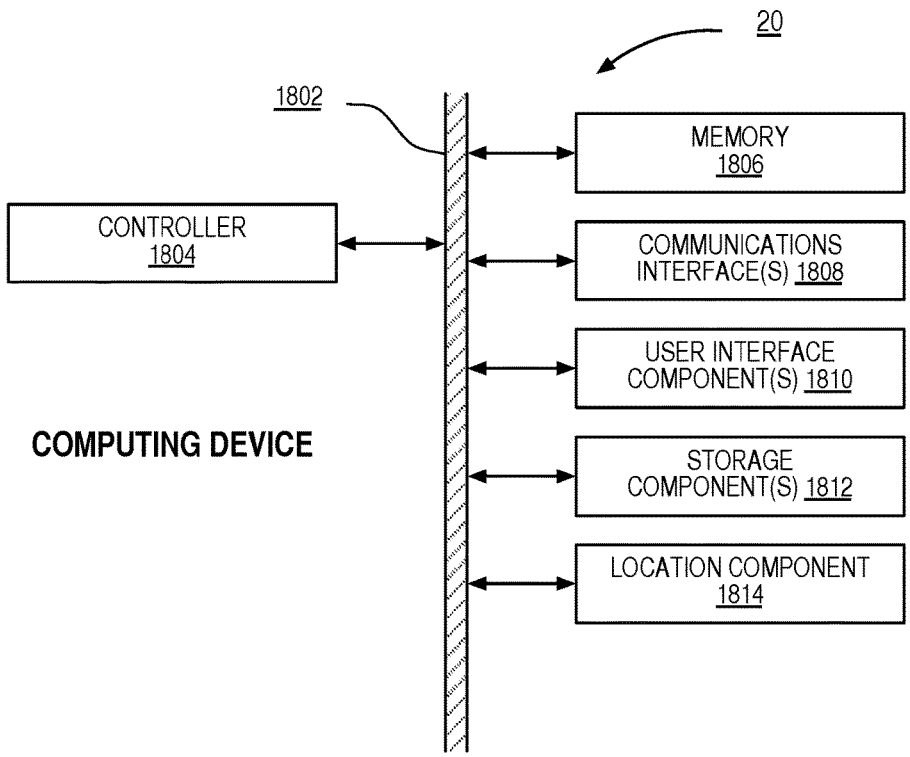
Figure 19:
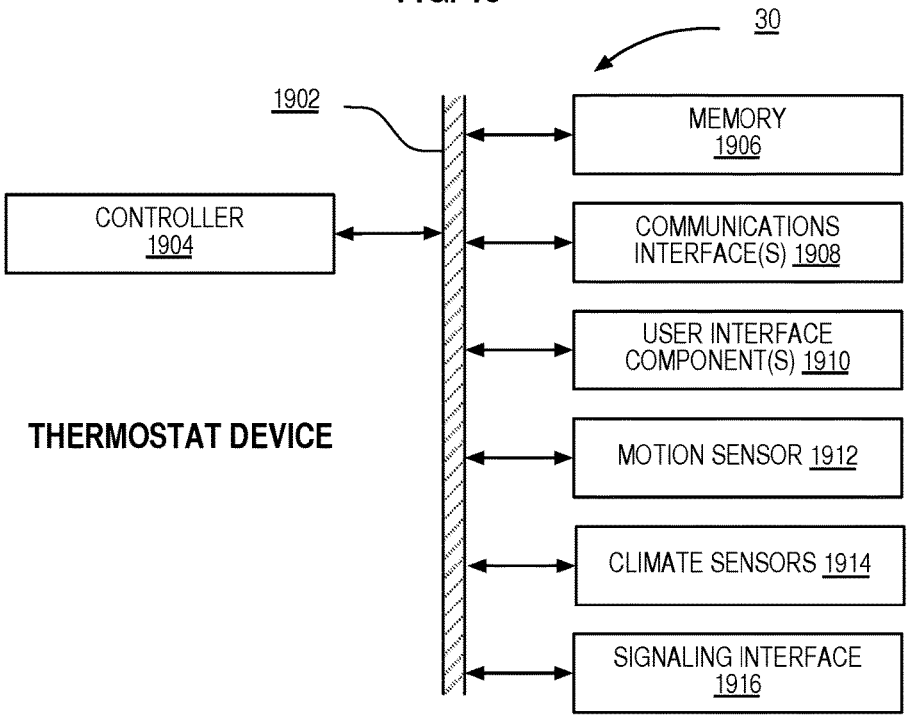
Figure 20:
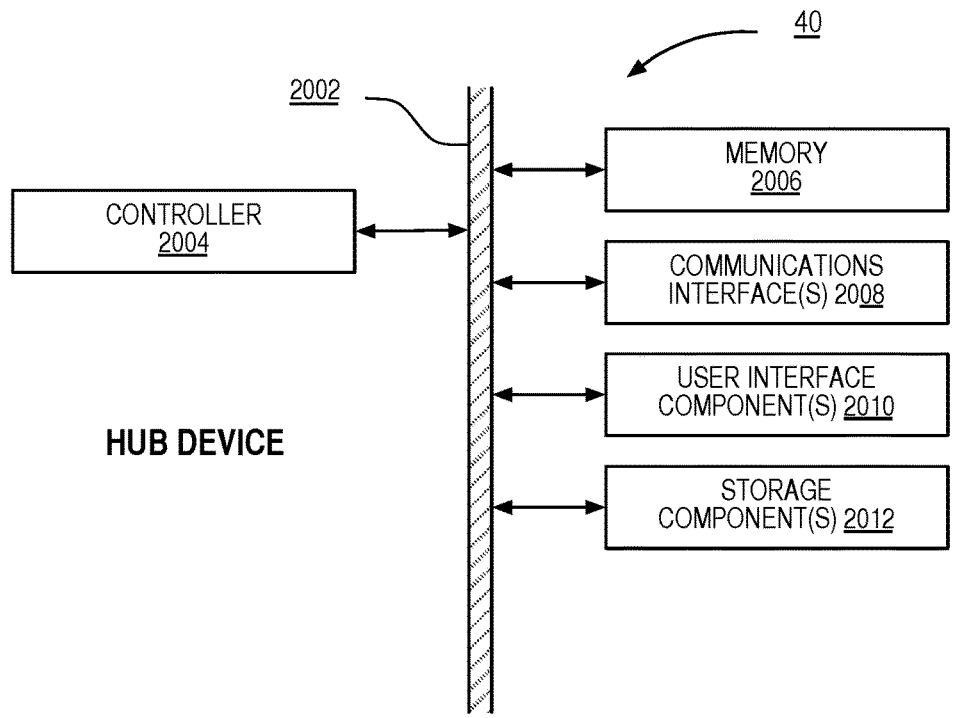
Figure 21:
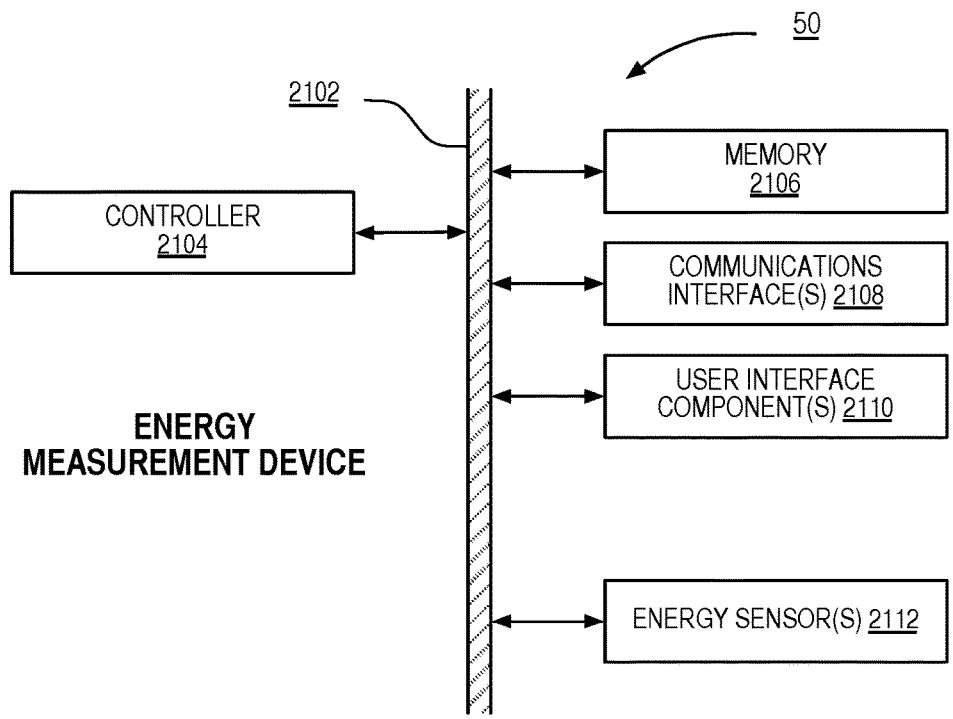
Figure 22:
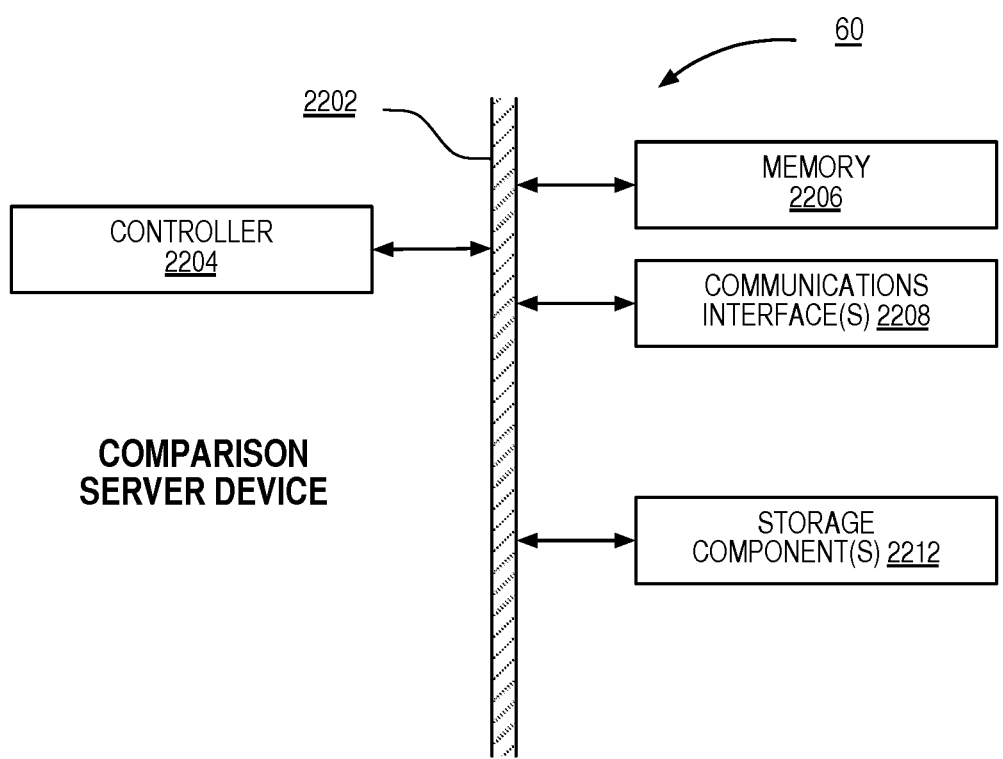

FIG. 5A illustrates a thermostat device for controlling heating and cooling within a physical structure, a computing device providing remote interactions with the thermostat device, a comparison server device providing additional features and intelligence to the thermostat device, a hub device enabling communications between devices operating in the system within the physical structure, and an energy measurement device for measuring energy consumption for the device controlled by the thermostat device;

FIG. 5B is a network diagram showing the communications between the thermostat device, computing device, hub device, energy measurement device, and comparison server device in climate priority mode;

FIG. 5C is a network diagram showing additional communications between the thermostat device, computing device, hub device, energy measurement device, and comparison server device in eco priority mode;

FIG. 6A is a flowchart illustrating the process involved in operating an exemplary comparison server;

FIG. 6B is a flowchart illustrating the process involved in responding to a user account event at an exemplary comparison server;

FIG. 6C is a flowchart illustrating the process involved in responding to a dwelling event at an exemplary comparison server;

FIG. 6D is a flowchart illustrating the process involved in responding to a thermostat event at an exemplary comparison server;

FIG. 6E is a flowchart illustrating the process involved in receiving a climate setting at an exemplary comparison server;

FIG. 7A is a flowchart illustrating the process involved in receiving an ecorank target setting at an exemplary comparison server;

FIG. 7B is a flowchart illustrating the process involved in receiving a zone setting at an exemplary comparison server;

FIG. 7C is a flowchart illustrating the process involved in requesting ecorank information at an exemplary comparison server;

FIG. 7D is a flowchart illustrating the process involved in receiving usage information at an exemplary comparison server;

FIG. 7E is a flowchart illustrating the process involved in determining a comparison group for computing an ecorank;

FIG. 8A is a flowchart illustrating the process involved in operating an exemplary thermostat device;

FIG. 8B is a flowchart illustrating the process involved in receiving a network message at exemplary thermostat device;

FIG. 8C is a flowchart illustrating the process involved in receiving user input at exemplary thermostat device;

FIG. 9 is a diagram illustrating the comparison period used in determining ecorank;

FIG. 10 is a diagram illustrating the various climate settings of the present system;

FIG. 11 illustrates factors and equations used in an exemplary formula for determining a match score between two dwellings/thermostats according some embodiments of the present disclosure;

FIG. 12A illustrates exemplary data for use in computing ecorank;

FIG. 12B illustrates an exemplary computation of a match score based on the data of FIG. 12A;

FIG. 12C illustrates an exemplary selection of a comparison group based on the match score of FIG. 12B;

FIG. 12D illustrates an exemplary computation of an ecorank based on the comparison group of FIG. 12C;

FIG. 13 illustrates an exemplary computation for determining a climate setting based on an ecorank target setting;

FIG. 14A graphically illustrates an exemplary user interface for setting user profile settings at either the computing device or thermostat device;

FIG. 14B graphically illustrates an exemplary user interface for setting dwelling profile settings at either the computing device or thermostat device;

FIG. 14C graphically illustrates an exemplary user interface for effecting climate system settings at either the computing device or thermostat device;

FIG. 14D graphically illustrates an exemplary user interface for setting energy measurement device settings at either the computing device or thermostat device;

FIG. 15A graphically illustrates an exemplary user interface for displaying an ecorank for a thermostat device at either the computing device or thermostat device;

FIG. 15B graphically illustrates an exemplary user interface for displaying an ecorank for a dwelling at either the computing device or thermostat device;

FIG. 15C graphically illustrates an exemplary user interface for displaying a user at either the computing device or thermostat device;

FIG. 16A graphically illustrates relationships between dwellings, thermostat devices and users in instances when one or more of each are involved;

FIG. 16B graphically illustrates additional relationships between dwellings, thermostat devices and users in instances when one or more of each are involved;

FIG. 17A graphically illustrates a controlled device, control device, and energy measurement device wherein each is a device is a separate device;

FIG. 17B graphically illustrates a controlled device, control device, and energy measurement device wherein the controlled device and the control device are a same device but the energy measurement device is a separate device;

FIG. 17C graphically illustrates a controlled device, control device, and energy measurement device wherein the control device and the energy measurement device are a same device and the controlled device is a separate device;

FIG. 17D graphically illustrates a controlled device, control device, and energy measurement device wherein the controlled device and the energy measurement device are a same device and the control device is a separate device;

FIG. 17E graphically illustrates a controlled device, control device, and energy measurement device wherein all devices are the same device;

FIG. 17F shows a networking diagram graphically illustrating the interactions between an exemplary control device, energy measurement device, and a comparison server;

FIG. 18 graphically illustrates a block diagram of the hardware elements comprising the computing device;

FIG. 19 graphically illustrates a block diagram of the hardware elements comprising the thermostat device;

FIG. 20 graphically illustrates a block diagram of the hardware elements comprising the hub device;

FIG. 21 graphically illustrates a block diagram of the hardware elements comprising the energy measurement device; and FIG. 22 graphically illustrates a block diagram of the hardware elements comprising the comparison server device.

DETAILED DESCRIPTION

While most people want to reduce energy consumption, it can be discouraging when one considers the impact that a single person can have given a world population of 7.3 billion. Even if that one consumer used no energy at all, the savings in worldwide energy consumption would be infinitesimal. However, if groups of people change their consumption habits, the impact is more substantial. However, there is currently no way for energy consumption habits to be easily shared in a timely and actionable way. It is easy to see how such a mechanism could have a substantial impact on a user's habits. In other words, an average consumer would be more likely to make sacrifices in energy consumption if they knew others were making similar sacrifices. The proposed connected thermostat device offers the ability to provide that information in a real-time fashion allowing for instant gratification. Similarly, users might be more likely to make sacrifices in everyday consumption if they knew how they compared to others. I.e. if they knew they were using more energy than 90% of other users, then they might be more likely to change. Key to the practicality of this assumption is being able to compare a user to similar other users. I.e. comparing the energy consumption of someone living in a 600 sq. ft. urban condo to someone living in 3,000 sq. ft. suburban home for five is not likely to produce useful comparisons and provide the needed behavioral incentive. Another example would be comparing a single occupant dwelling to another single occupant dwelling where the occupant works from a home office. The two occupants might in fact use the same amount of energy, but in one case that energy consumption is being captured completely at the home dwelling and in the other case part of the energy is occurs at the home dwelling and part occurs at an office building. For a more meaningful comparison to occur, the comparison group for the user with the home office would not include others that did not work at home, or adjustments would be made to account for the fact.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of computing device, for example, a smart phone, a cell phone, a pager, a personal digital assistant (PDA, e.g., with GPRS NIC), a mobile computer with a cellular radio, or the like. A typical computing device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the constrained operating environment of wireless devices on wireless networks. In a representative embodiment, the computing device is a cellular telephone or smart phone that operates over GPRS (General Packet Radio Services), which is a data technology for GSM networks. In addition to a conventional voice communication, a given computing device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a computing device, the examples may similarly be implemented on any suitable "computing device".

Throughout this specification, like reference numbers signify the same elements throughout the description of the figures.

When elements are referred to as being "connected" or "coupled", the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media is non-transitory and includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage components, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Operating environments in which embodiments of the present disclosure may be implemented are also well-known. In a representative embodiment, a device, such as a computing device 30, is connectable to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by computing devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a computing device). The HLR also controls certain services associated with incoming calls. Of course, the present disclosure may be implemented in other and next-generation mobile networks and devices as well. The computing device is the physical equipment used by the end user, typically a subscriber to the wireless network. Typically, a computing device is a 2.5G-compliant device, 3G-compliant device, or a 4G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The computing device may also include a memory or data store. The presently disclosed subject matter is now described in more detail.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

Figure 1A:
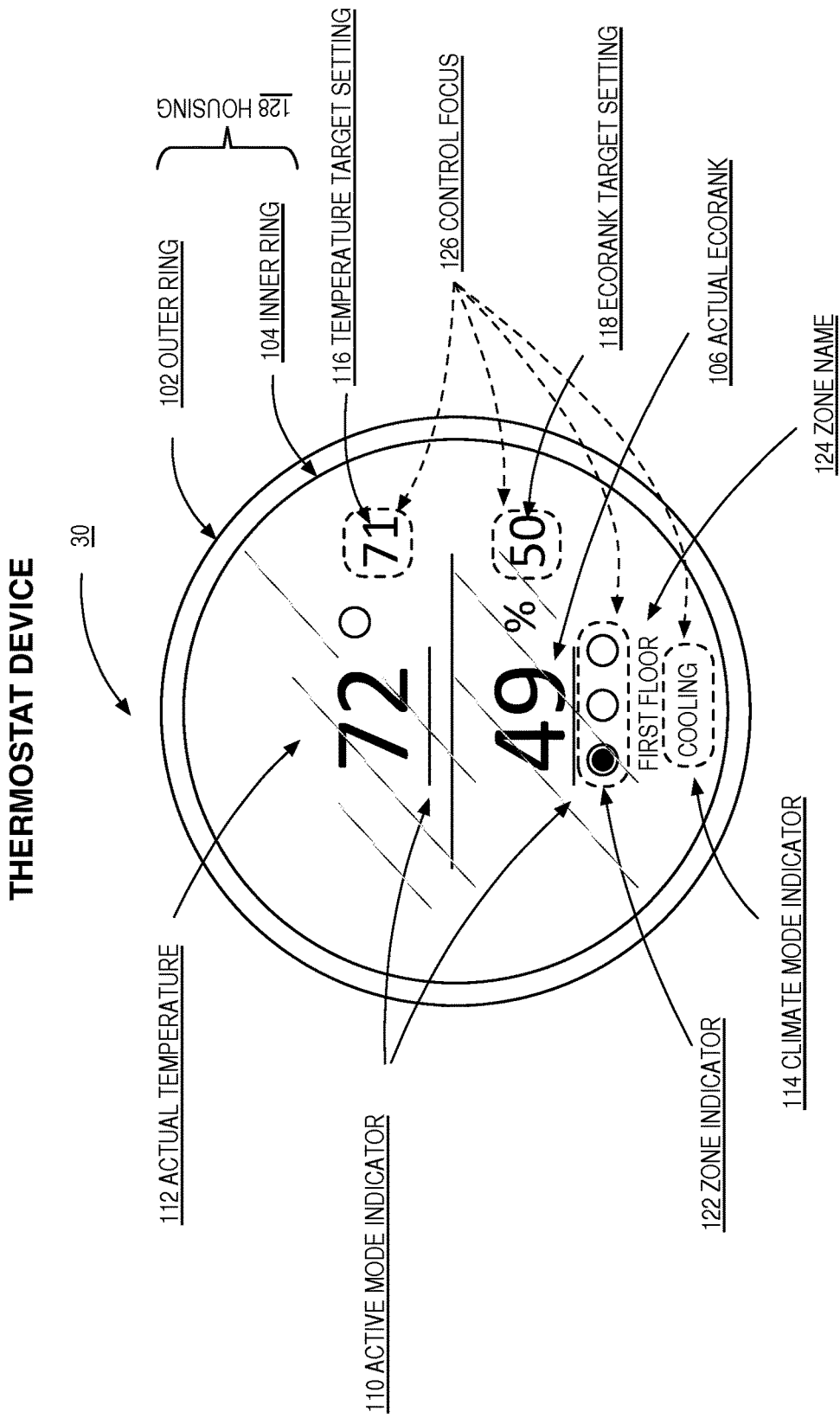
FIG. 1A illustrates the various elements of a thermostat device having an interface.

FIG. 1A illustrates various elements of thermostat device 30 according to one embodiment. The drawing does not represent a particular mode of operation, but instead enumerates various user interface elements of the thermostat device 30. The thermostat device 30 user interface is comprised of an outer ring 102, inner ring 104, actual ecorank 106, active control indicator 110, actual temperature 112, climate mode indicator 114, temperature target setting 116, ecorank target setting 118, zone indicator 122, and zone name 124. The outer ring operates to allow physical manipulation of the thermostat around a stationary inner ring, providing for navigation through various functions and features. The actual ecorank 106 operates to provide visual indication of the current actual ecorank. The active control indicator 110 operates to provide visual indication of the active control, thus indicating that the device is operating in climate priority mode or in eco priority mode. The actual temperature 112 operates to provide visual indication of the current actual temperature. The climate mode indicator 114 is capable of providing visual indication of the current climate mode. Possible modes include (but are not limited to) "heating", "cooling", "auto", "emergency heat", and "off". The temperature target setting 116 operates to provide visual indication of the desired temperature. The temperature ecorank target setting 116 operates to provide visual indication of the desired ecorank. The zone indicator 122 Is capable of providing visual indication of the current zone being manipulated at the thermostat device 30. By default, the thermostat device being operated is the local thermostat device 30. The zone name 124 provides visual indication of the name of the thermostat being operated, and operates in conjunction with the zone indicator 122, changing as the operator cycles through the various zones. The control focus indicator 126 demarcates the setting currently available for user manipulation via the user interface controls.

Figure 1B:
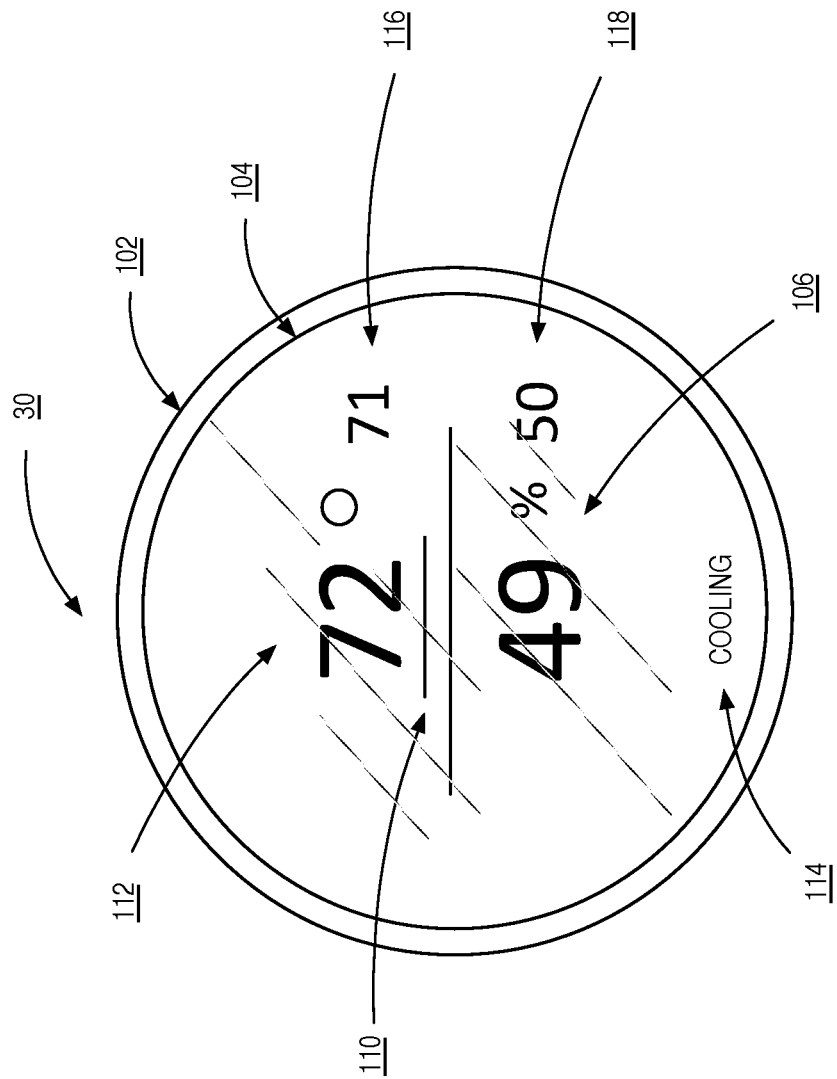
FIG. 1B is a graphical depiction of the thermostat device according to the climate priority mode of operation without privacy enabled.

Referring now to FIG. 1B, a graphical depiction of thermostat device 30 is presented in climate priority mode of operation without privacy enabled. As used herein, climate priority mode is used to refer to a mode of operation wherein the thermostat device 30 receives a climate setting, such as a target temperature setting 116, and an ecorank 106 is determined from that climate setting and displayed on the thermostat device 30. The active mode indicator 110 is activated in association with the actual temperature 112 to provide feedback to the user of the thermostat device 30 indicating the climate priority mode of operation.

Possible climate mode indicators 114 include cooling, heating, auto, and off. In cooling operation mode, a maximum temperature is supplied, and the climate system attempts to keep the operating temperature of the dwelling at or below that climate setting. In heating operation mode, a minimum temperature is supplied, and the climate system attempts to keep the operating temperature of the dwelling at or above that climate setting. In auto operation mode, a maximum temperature and minimum temperature are supplied, and the climate system attempts to keep the temperature at or above the minimum temperature and at or below the maximum temperature. An off operation mode state indicates the climate system is not being employed. In some embodiments, the thermostat device will be programmable or configurable, and the settings may vary over time according to program settings.

Figure 1C:
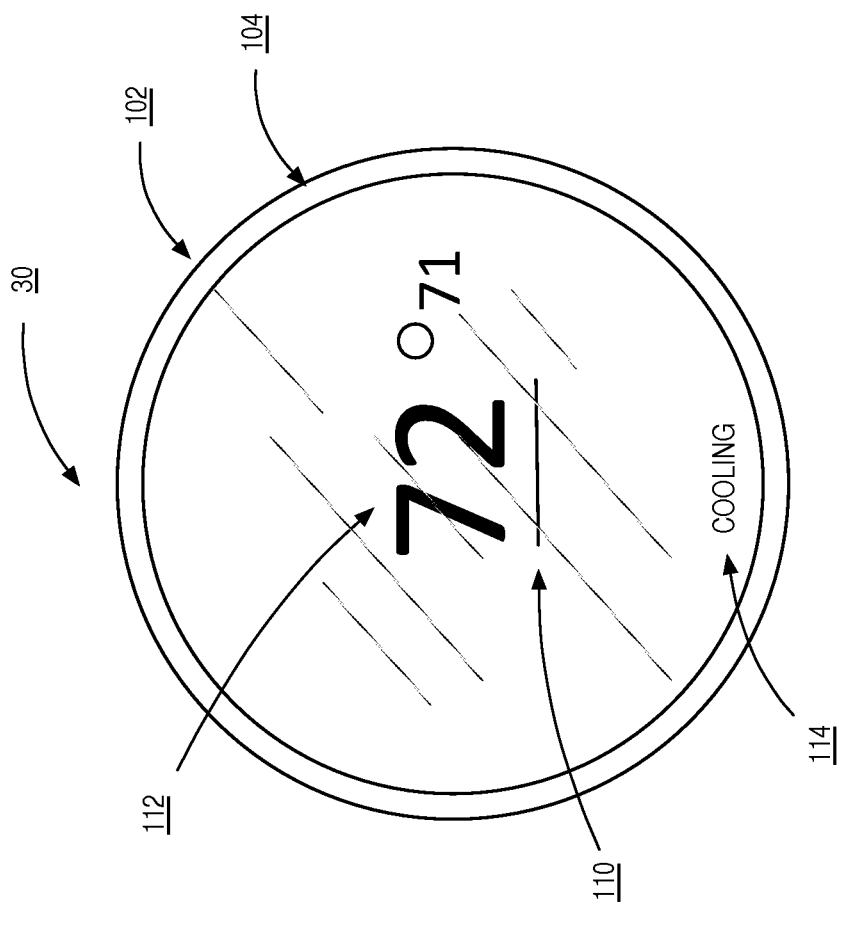
FIG. 1C is a graphical depiction of the thermostat device according to the climate priority mode of operation with privacy enabled.

Referring now to FIG. 1C, a graphical depiction of the thermostat device in climate priority mode of operation with privacy enabled is shown. With privacy enabled as shown in FIG. 1B, the ecorank indicator 106 and the ecorank target setting 118 are not displayed. This may be desirable to users where their ecorank is not favorable, and they do not wish to share it.

Referring now to FIG. 1D, a graphical depiction of the thermostat device 30 is presented in eco priority mode of operation without privacy enabled. As used herein, eco priority mode is used to refer to the mode of operation wherein the thermostat device 30 receives an ecorank target setting 118, and a temperature target setting 116 is determined from that ecorank target setting 118, and applied at the thermostat device 30. The active control indicator 110 is displayed in association with the actual ecorank 106 to provide feedback to the user of the thermostat device 30 indicating the eco priority mode of operation.

When in eco priority mode the thermostat device may display two ecoranks. The first is an indicator of the actual ecorank 106, as calculated based on past usage data, while the second is a ecorank target setting 118, which is user settable and indicates the desired ecorank. An ecorank indicator is a human observable indication of an ecorank. The ecorank indicator may comprised one or more of a numerical score, graphic, icon, color, letter, symbol, and audio item. The actual ecorank 106 and the ecorank target setting 118 may be the same, but if the user is adjusting the ecorank target setting 118, the actual ecorank 106 will take time to adjust, and will likely be different. In some embodiments, the ecorank target setting 118 may act as a desired convergence point. That is, the system will attempt to achieve that value within a tolerance range. In other embodiments, the ecorank target setting 118 may act as a threshold, in which the system attempts to achieve that score or better. A "better" ecorank score is one that reflects a lower energy consumption. In this respect, the threshold may share the same value range as the ecorank target setting. Some examples may include above average, top one third, top 10 percent etc. In some embodiments, the ecorank is indicated by a ranking falling between 0 and 100. The threshold may share that same value range.

In some embodiments, in addition to or in replacement of showing an ecorank indicator, an ecorank relative indicator may be shown. For example, instead of showing an ecorank target setting 118 and an actual ecorank 106, an ecorank relative indicator may be displayed. This information may comprise, for example, an indication of whether the actual ecorank is equal to or better than the ecorank target setting. It also may comprise information indicating whether the actual ecorank is trending in a direction to match (within a tolerance) to or be better than the ecorank target setting.

In some embodiments, ecorank information may be provided to a thermostat device for other entities, for example other entities of a comparison group. In some embodiments, a list of all comparison group entities and their corresponding ecorank information is provided to the thermostat device and is available for display. Due to the limited display area of a typical thermostat device, it is likely that only a small number of entities would be displayed, for example the entity with the best actual ecorank.

Referring now to FIG. 1E, a graphical depiction of the thermostat device in eco priority mode of operation with privacy enabled is shown. With privacy enabled as shown in FIG. 1E, the actual ecorank 106 is not displayed. As discussed above, this may be desirable to users where their ecorank is not favorable, and they do not wish to share it.

According to one embodiment, the thermostat device 30 is a circular shaped device with a stationary inner ring 102 and a movable outer ring 104. In climate priority mode, moving the inner ring clockwise will increase the climate setting, and moving the inner ring counter-clockwise will decrease the climate setting. Pushing in on the inner ring 104 will toggle between climate priority mode and eco priority mode. Double pressing on the inner ring 104 in quick succession will bring up a display for entering additional settings at the thermostat device 30. Additionally, the thermostat device may be operated and programmed from a computing device as depicted in FIGS. 3B and 5B.

Figure 1F:
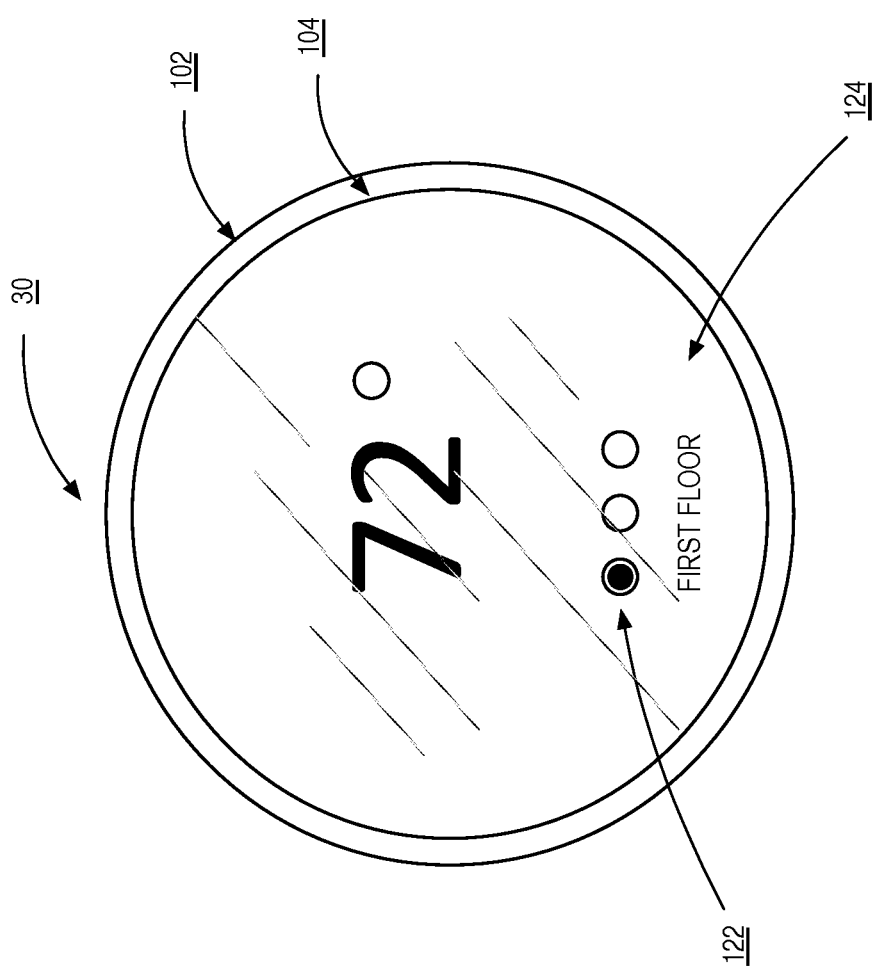
FIG. 1F is a graphical depiction a thermostat device associated with dwelling having multiple zones.

FIG. 1F is a graphical depiction of a thermostat device associated with a dwelling having multiple zones. When more than one zone (i.e., a thermostat device) is detected in a dwelling, the thermostat displays a zone indicator 122 for itself, plus each of the other thermostats. The dwelling associated with the thermostat device depicted in by FIG. 1F therefore has three thermostats (or zones). The user may interact with either of the zones at either thermostat device by using the navigation control 104 to select a different thermostat. As the user navigates through the zone indicators 122, the name for each zone is shown on the display 124 (e.g., FIRST FLOOR). The thermostats within the dwelling may operate in two different ways: independently or dependently (linked). When operating independently, as shown in FIG. 1E, each zone operates independently (i.e., according to its own settings). That is changing one thermostats setting does not change the settings on the other thermostat(s). In the second mode, the thermostats are linked, and changing the settings at one thermostat changes the settings at all of the thermostats. The linking may involve all thermostats within a dwelling. In alternative embodiments, the linking may be one or more groups of one or more thermostats within the same or different dwellings. Note that even in linked mode, when the settings are the same for each thermostat within a group, the climate equipment controlled by the thermostat may turn on or off at different times based on the current conditions (temperature) detected by that thermostat.

In some embodiments, a setting change entered at one thermostat may cause notifications to be sent to other related thermostats or computing devices. Related thermostats may include thermostats found in the same dwelling. Related computing devices may include computing devices operated by a user living in the dwelling where the thermostat device is located.

In some embodiments, setting changes entered at a thermostat may not take effect unless and until confirmed by an authorized user. In some embodiments, an authorized user may be a user in possession of a Personal Identification Number (PIN) which may be entered at the thermostat device where the change setting was requested, another thermostat device within the dwelling, or a computing device associated with the authorized user. Examples of setting changes requiring confirmation may include changes in priority mode, changes in privacy mode, changes in settings that would increase energy consumption, changes in settings that would increase energy consumption above a certain percentage, changes in settings that would result in a ecorank target setting not being achieved, etc.

FIG. 1G is a graphical depiction of a thermostat device 30 employing ecorank trend indicators according to some embodiments. A number of visual cues may be employed to convey information using the indicators, including but not limited to indicator shape, indicator color, indicator size, indicator opacity, etc. The trend indicators in FIG. 1G use indicator shape and color. Indicator 130 shows an upward pointing triangle of red color to indicate an ecorank below the desired ecorank target setting (below a comparison threshold) the ecorank target setting but trending towards/converging on the ecorank target setting. Indicator 132 shows a downward pointing triangle of red color to indicate an ecorank below desired ecorank target setting (below a comparison threshold) the ecorank target setting and trending away/diverging from the ecorank target setting. Indicator 134 shows a green circle to indicate an ecorank is at the ecorank target setting within a certain tolerance (within the range of an upper and lower comparison threshold). Indicator 136 shows a star of gold color to indicate that an ecorank exceeding the ecorank target setting (above a comparison threshold). Other shape and color combinations may be used to represent the above described and/or additional indicators.

Figure 2:
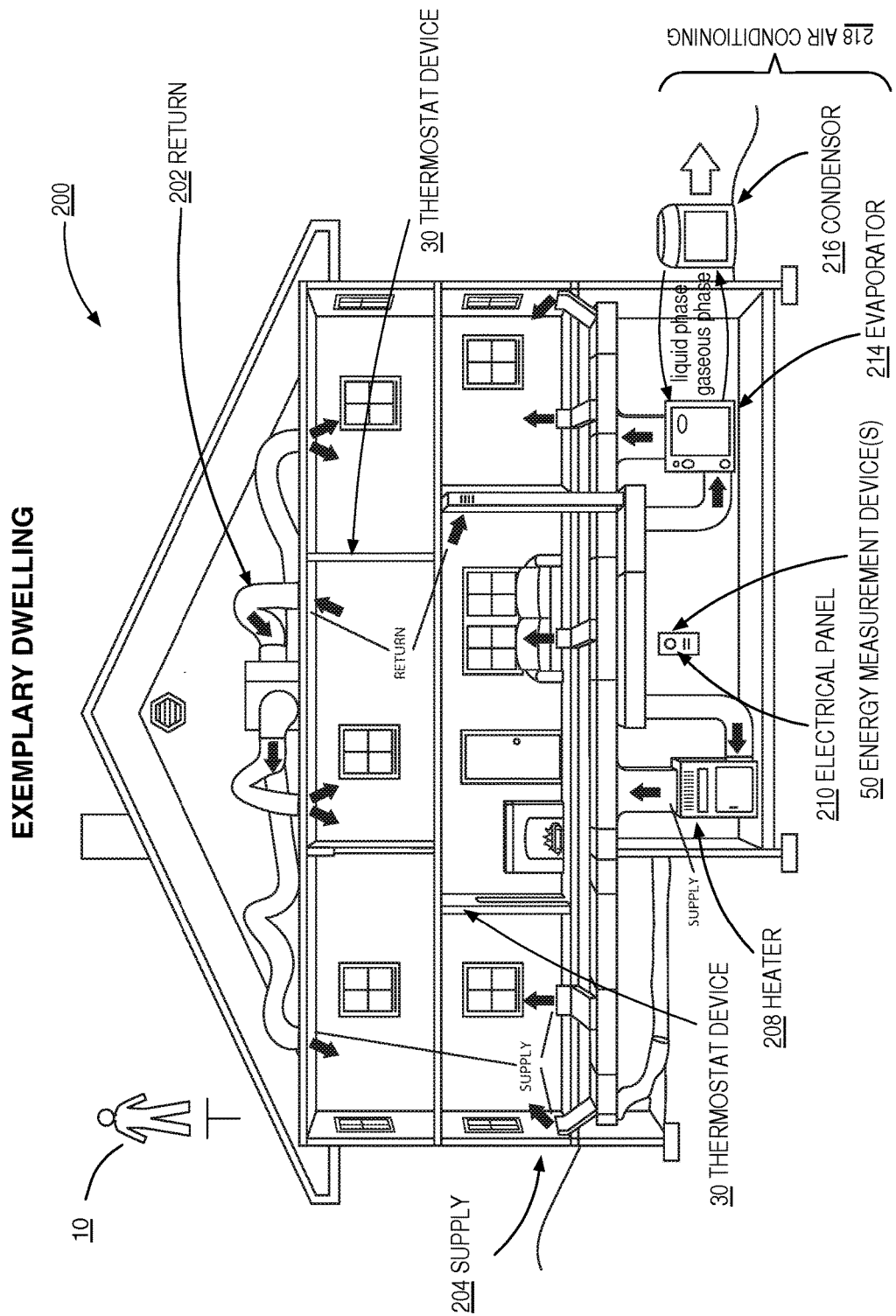
FIG. 2 is a graphical depiction of an exemplary dwelling depicting various elements of a climate system.

FIG. 2 is a graphical depiction of a dwelling 200 with multiple zones (i.e., more than one thermostat device 30) and various climate system 300 elements. The dwelling may be associated with one or more occupants 10. As background, climate-control devices or systems typically have three basic components: a source of warmed or cooled air, a means of distributing the air (supplies 204 and returns 202) to the rooms being heated or cooled, and a control used to regulate the system (e.g., thermostat device 30). The source of warm air, such as a furnace 208, and cool air, such as an air conditioner, in a house often use the same distribution and control systems, as is the case in FIG. 2. The dwelling further comprises an electrical panel 210 comprising zero or more energy measurement devices 50. The dwelling further comprises a furnace (heating component) 208 and an air conditioner (cooling component) 218 comprising an evaporator 214 and a condenser 216.

Figure 3A:
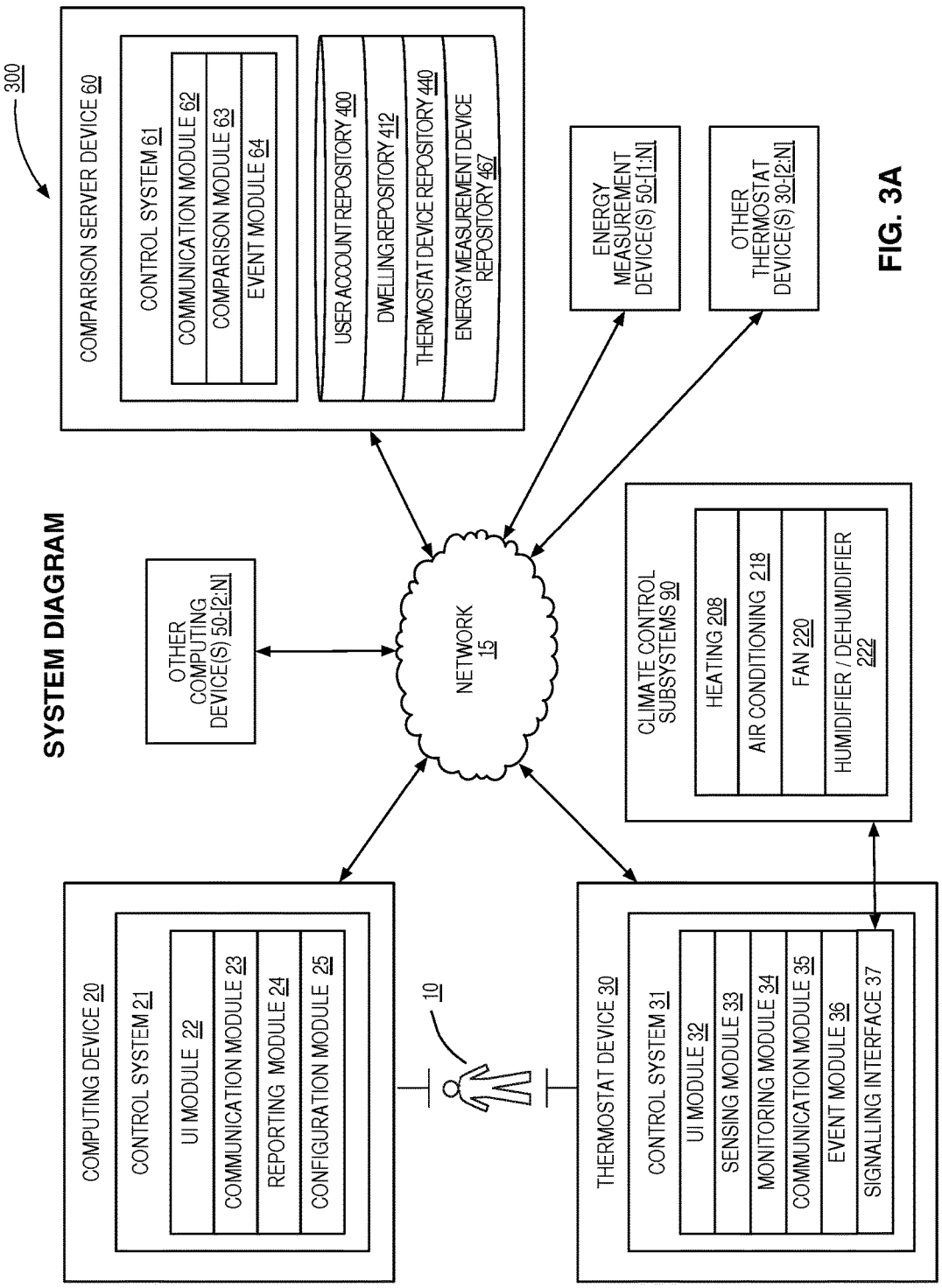
FIG. 3A illustrates a thermostat device for controlling heating and cooling within a physical structure, a computing device providing remote interactions with the thermostat device, and a comparison server device for providing additional features and intelligence to the thermostat device.
Figure 3B:
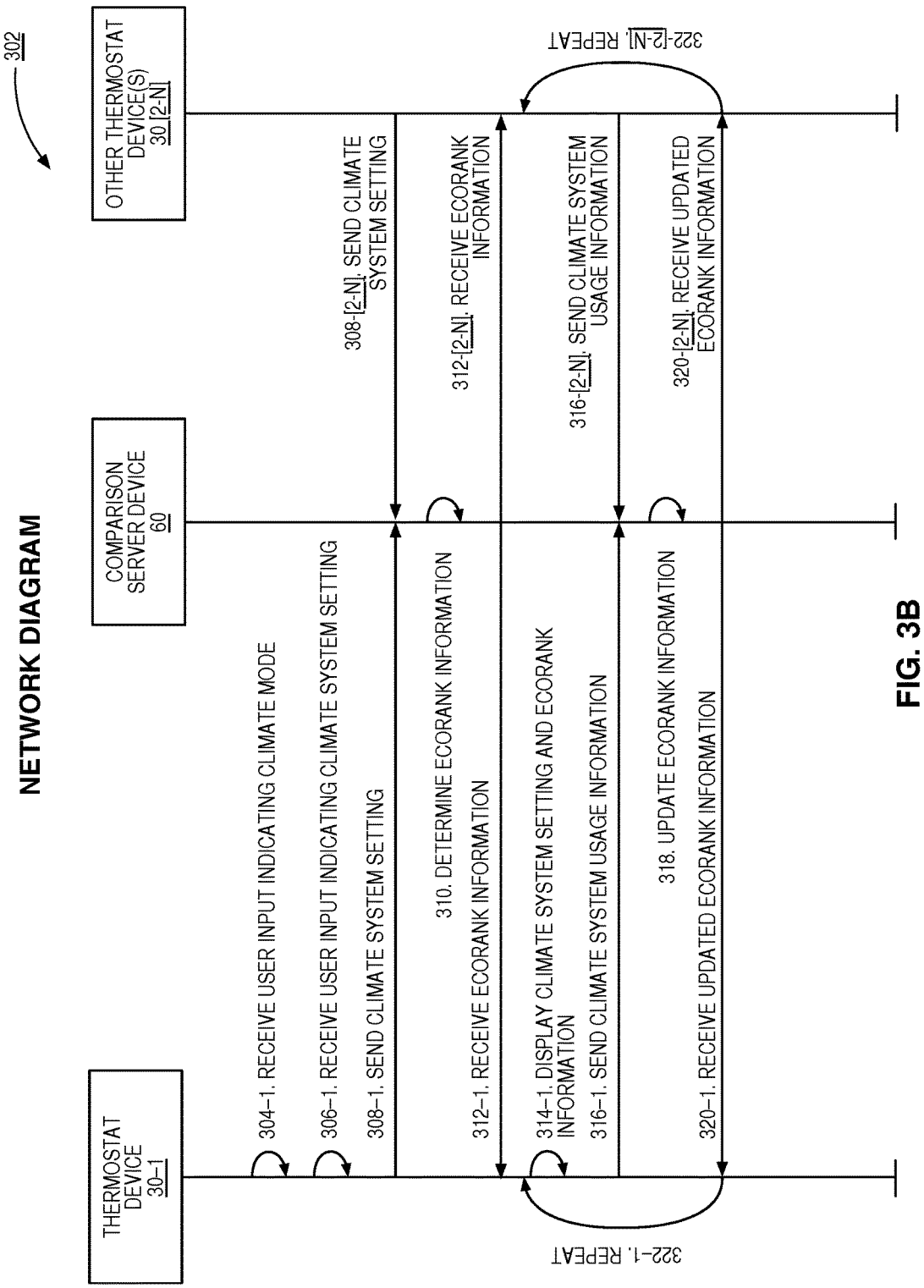
FIG. 3B is a network diagram showing the communications between the thermostat device, computing device, and comparison server device in climate priority mode.

FIG. 3A shows a system diagram for a climate system 300 according to some embodiments. In these embodiments, the climate system 300 is comprised of a thermostat device 30, a computing device 20, climate control subsystems 90, a comparison server device 60, and a network 15.

The computing device 20 is comprised of a control system 21, UI module 22, communication module 23, reporting module 24, and configuration module 25. The UI module 22 operates to facilitate interactions between the user of the computing device 20 and the hardware and software of the computing device 20. The communication module 23 facilitates between the computing device 20 and other devices connected through the network 15, such as the thermostat device 30 and the comparison server device 60. The reporting module 24 enables browsing of web content hosted on the Internet and by other devices addressable through the network, some of which may be local devices. The configuration module 25 facilitates remote configuration of the thermostat device 30 in some embodiments of the present disclosure.

The thermostat device 30 is comprised of a control system 31, UI module 32, sensing module 33, monitoring module 34, communications module 35, event module 36, and a signaling interface 37. The UI module 32 operates to facilitate interactions between the user of the thermostat device 30 and the hardware and software of the thermostat device 30. The sensing module 33 operates to interact with other elements of the thermostat device to determine climatic factors. Climactic factors include but are not limited to temperature, humidity, and the like. The monitoring module 34 operates to monitor the climatic factors around the thermostat device 30 and record them to the usage history 466. The communication module 35 provides the communications between the thermostat device 30 and other devices connected through the network 15. The event module 36 operates to facilitate communications and interactions between the comparison server device 60 and the thermostat device 30. The signaling interface 37 operates as an electromechanical interface providing voltage line levels to the climate subsystems to turn them on and off.

The comparison server device 60 is comprised of a control system 61, communication module 62, comparison module 63, an event module 64, user repository 400, dwelling repository 412, thermostat device repository 440, energy measurement device repository 467. The communication module 62 provides the communications between the comparison server device 60 and other devices connected through the network 15. The comparison module 63 operates to determine an ecorank based on a climate system setting, or conversely, a climate system setting based on a ecorank target setting. For some embodiments, the processes used to make these determinations are outlined in FIGS. 6E, 7A, and 7E. The user repository 400 stores information related to the various thermostat devices 30 and their associated users 10 and dwellings 200. The dwelling repository 412 stores information related to dwellings 200. The thermostat device repository 440 stores information related to thermostat devices 30. The energy measurement device repository 467 stores information related to energy measurement devices 50. In some embodiments, the aforementioned repositories (400, 412, 440, 467) are stored as xml in the file system. In some embodiments, the aforementioned repositories (400, 412, 440, 467) are stored in a database. In some embodiments, the aforementioned repositories (400, 412, 440, 467) are stored in a blockchain. In some embodiments, the aforementioned repositories 400, 412, 440, 467) are stored according to differing mechanisms.

Those of ordinary skill in the art will appreciate that the network 15 is not limited by the implementations listed above. More specifically, the network 15 may be any type of network suitable to allow interaction between the computing devices 20, member thermostat devices 30, and the comparison servers 60. For example, the network 15 may be a wired network, a wireless network, or any combination thereof. Further, the network 15 may include a distributed computing network, an intranet, a local-area network (LAN) and/or a wide-area network (WAN), or any combination thereof.

In an alternative embodiment the thermostat device control system is implemented as a client that is downloaded on initialization. As a non-limiting example, the thermostat device boots into a "stub" that is configured to connect to the network and download a latest version of the client from the network.

In an alternative embodiment the thermostat device is a unitary thermostat device with all elements physically packaged with the housing of the thermostat device. In another aspect of the present disclosure the thermostat device is a modular thermostat device. As used herein, unitary refers to a single standalone entity or device. Namely, a device that has all ascribed function within a single housing or enclosure. In some embodiments, the thermostat device is a unitary thermostat device, wherein all constituent parts of the device are housed in a single enclosure.

In another aspect of the present disclosure the thermostat device further comprises a signaling interface 37 operable to control the climate system components. While there is no industry standard for the signaling interface 37, many suppliers have covered on a common wiring scheme. As used herein, a signaling interface refers to the interface through which the thermostat device controls the various climate system subsystems 90. In some embodiments, the signaling interface 37 is comprised of a low voltage interface wherein the thermostat control raises the voltage on one of a plurality of lines to turn a climate system component on. Subsequently lowering the voltage on said line to turn the same climate system component off. The climate control subsystem 90 is comprised of one or more of a heating subsystem 208, air conditioning subsystem 218, fan subsystem 220, and humidification/dehumidification subsystem 222. In some embodiments, one or more of the climate control subsystems are combined in a single subsystem.

Figure 3C:
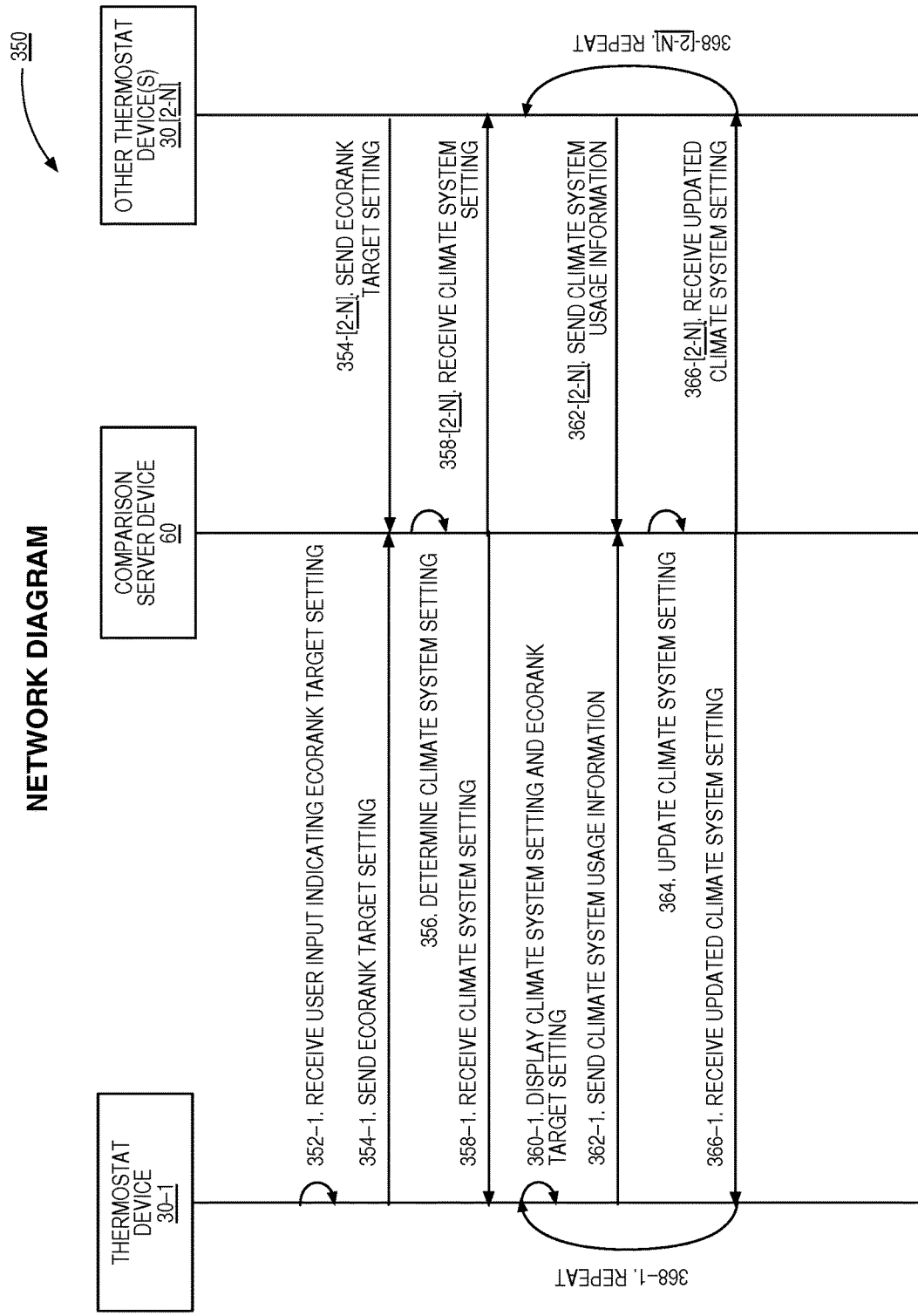
FIG. 3C is a network diagram showing the communications between the thermostat device, computing device, and comparison server device in eco priority mode.

FIGS. 3B and 3C each illustrates aspects of the network traffic flowing between the thermostat device 30-1, comparison device server 60, and a plurality of other thermostat devices 30-[2-N]. In some embodiments, the thermostat device 30-1 creates a WIFI-Direct network operable to allow other computing devices 20 to configure the thermostat device 30-1. Other networking protocols and technologies may be used in addition to or in replacement of WIFI-Direct. In some embodiments, the configuration information will be received at the computing device 30-1 based on user input provided by the user 10 at the thermostat device 30-1.

FIG. 3B illustrates the network traffic flow for the climate priority mode of operation. The thermostat device 30-1 is set to climate priority mode 304-1, indicating that the climate system settings may be manipulated 306-1. A climate system setting may be sent 308-1 to the comparison server device 60 and corresponding ecorank information determined 310. Asynchronously from the thermostat device 30-1, other thermostat devices 30-[2-N] may send other climate system settings. The ecorank information is received 312-1 at the thermostat device 30 from the comparison server device 60, and, when not in privacy mode, displayed along with the climate system settings 314-1 at the thermostat device 30. Asynchronously, other ecorank information is received at the other thermostat devices 30-[2-N]. In some embodiments, climate system usage data are sent to the comparison server 316-1. In some embodiments this comprises time stamped information indicating when the climate system components 90 are turned on and off. A plurality of other thermostat devices 30-[2-N] may be connected to the comparison server device 60 providing 316-[2-N] climate system usage data as well. As these other thermostat devices 30-[2-N] from other dwellings provide other climate system usage data, the ecorank information may be adjusted 318 and sent 320-1 to the thermostat device 30-1 without request by the thermostat device 30-1. This process may be repeated 322 on a periodic basis, when of updates have been provided by the other thermostat devices 30-[2-N], when requested by the thermostat device 30-1, or according to other criteria. The steps of sending the climate system settings 308, determining ecorank information 310, and receiving the ecorank information at the thermostat device 312 may be performed in real-time or near real-time (i.e., approximately real-time). Likewise, the steps of sending 316 climate system usage information, updating 318 ecorank information, and sending 320 ecorank information may be performed in real-time or near real-time (i.e., approximately real-time). Thus the operator of the thermostat device 30-1 is able to receive immediate feedback as they interactively make climate system setting changes at the thermostat device 30.

Referring now to FIG. 3C, the thermostat device 30-1 may be set to eco priority mode 352-1. In eco priority mode, the ecorank target setting may be received and sent 354-1 to the comparison server device 60. The climate system setting determined 356 at the comparison server device 60, returned 358-1 to the thermostat device 30, and displayed 360-1 along with the ecorank target setting at the thermostat device 30-1. In some embodiments, climate system usage data are sent 362-1 to the comparison server device 60. In some embodiments this comprises time stamped information indicating when the heating or cooling systems are turned on and off. A plurality of other thermostat devices 30-[2-N] may be connected to the comparison server device 60 asynchronously providing target ecorank settings 354-[2-N] and climate system usage information 362-[2-N]. As these other thermostat devices 30-[2-N] provide information, the climate system settings may need to be adjusted 364 and sent to the thermostat device 30 in 366-[2-N]. This process may be repeated on a periodic basis, when a number of updates have been provided by the other devices, when requested by the thermostat device 30, or according to other criteria. The steps of sending the ecorank target setting 354, determining climate system settings 356, and receiving the climate system settings at the thermostat device 358 may be performed in real-time or near real-time (i.e., approximately real-time). Thus the user operating the thermostat device is able to receive immediate interactive feedback as they make ecorank target setting changes at the thermostat device 30 or provide the settings remotely via a computing device 20.

Figure 4A:
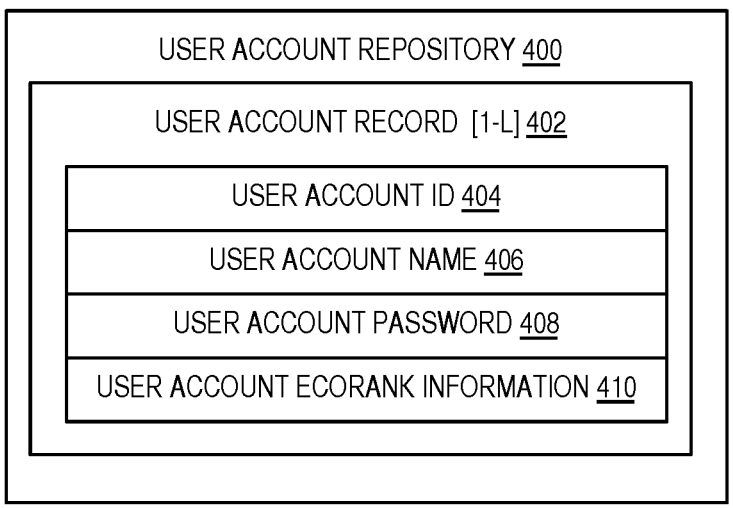
FIG. 4A illustrates an exemplary data structure for storing user account repository according to some embodiments.

FIG. 4A illustrates an exemplary structure in memory for storing user account repository according to some embodiments. The user account repository 400 may contain a plurality of user accounts 1-L 402. Each user account 402 is comprised of a user account id 404, user account name 406, user account password 408, and user account ecorank 410. The user id 404 field stores unique identifier for the user. The user account name 406 stores the name of the user associated with the user account 402. The user account password 408 stores the password of the user associated with the user account 402. user account id 404 and user account password 408 together form credentials used by the user to access the user account 402. The user account ecorank 410 stores information regarding the users most recent ecorank information. This information is determined by the comparison server device 60 and communicated to the thermostat device 30. It may be pushed periodically from the comparison server device 60, or it may be requested from the thermostat device 30 as needed.

Figure 4B:
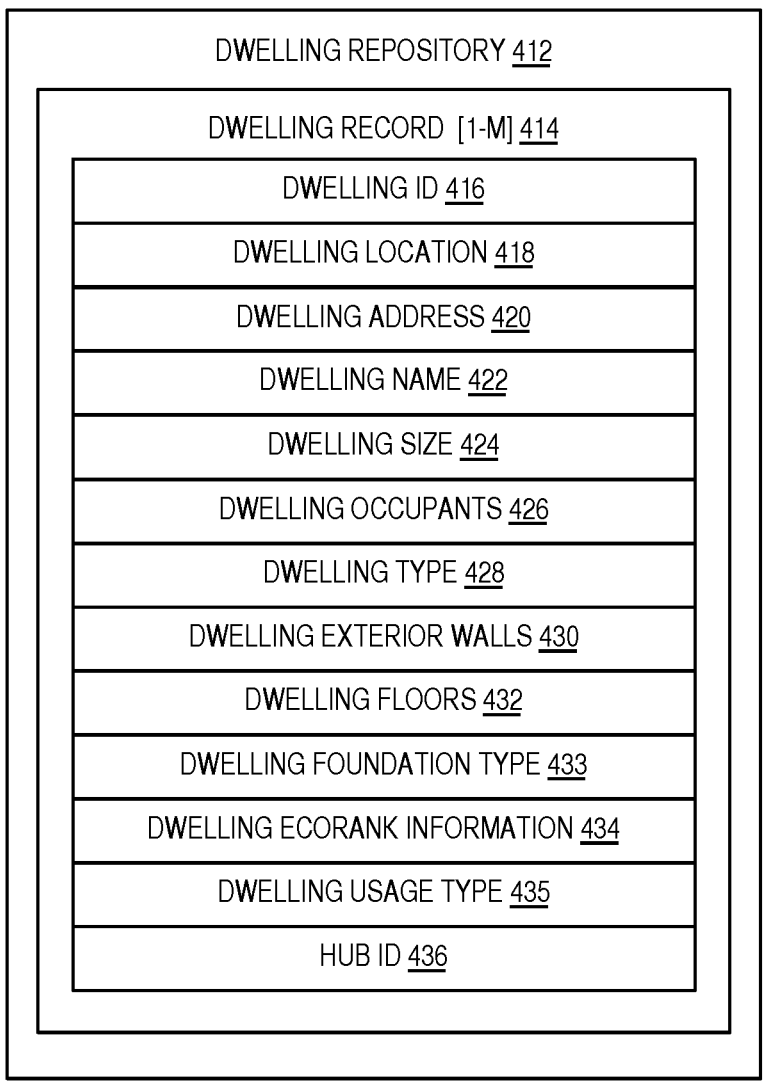
FIG. 4B illustrates an exemplary data structure for storing dwelling information according to some embodiments.

FIG. 4B illustrates an exemplary structure in memory for storing dwelling repository 412 according to some embodiments. As used herein, a dwelling 414 refers to a physical structure where one or more dwelling occupants 426 reside. The same physical structure may contain a single dwelling, as would be the case in a single family detached home, or multiple dwellings, as would be the case of a high-rise condominium tower. Each dwelling 414 is comprised of a dwelling id 416, a dwelling location 418, a dwelling address 420, a dwelling name 422, dwelling size 424, a number of dwelling occupants 426, a dwelling type 428, a number of dwelling exterior walls 430, dwelling floors 432, dwelling foundation type 433, dwelling ecorank information 434, and a hub ID 436. The dwelling id 416 is a unique identifier for the dwelling 414. The dwelling location 418 reflects the geographic location of the dwelling in which the thermostat device 30 is installed. In some embodiments, this information is stored as a zip code. In other embodiments, this information may be stored as GPS data. A computing device 20 associated with the thermostat device at the time of configuration may provide the GPS information. In some embodiments, the user is presented with a map and allowed to navigate to and pinpoint the location of the dwelling on the map. The location may also be determined using mapping methods to determine the location based on IP address assigned to the dwelling. The dwelling address 420 is the mailing address of the dwelling structure. The dwelling name 422 is a name assigned by the user. Examples might include "Primary House", "Beach House", "Vacation Condo", etc. The dwelling size 424 indicates the size of the dwelling in which the thermostat is installed. In some embodiments, this measurement is stored in square feet (sq. ft.), on other embodiments this measurement may be stored in cubic feet to account for ceiling height. The dwelling occupants 426 field stores the number of people currently occupying the dwelling. In some embodiments this will represent a number set by the occupant 10. In other embodiments, this may be an auto detected number based on motion detectors and/or geo-fencing using cellular phones carried by occupants or the like. In some embodiments, this number may represent a moving average. In other embodiments it may represent an instantaneous number. Still other embodiments will store a plurality of the aforementioned indicators in the dwelling occupants 426 field. In some embodiments, this information will be automatically determined based on based on a camera using facial recognition to determine unique occupants. This approach may also yield additional information as to how often the occupants are within the dwelling. In some embodiments, the occupants will register their respective mobile tracking devices so that the system may automatically determine how often they are within the dwelling, and for what duration. In some embodiments, this personal tracking device will be a cellular phone, such as computing device 20. The dwelling type 428 indicates the type of structure wherein the thermostat device 30 resides. Possible values for dwelling type are comprised of single family detached, multifamily detached, apartment, condominium, business, and the like. The dwelling exterior walls 430 indicate the amount of wall space in the structure that is externally exposed. In some embodiments this measurement is stored as linear feet. In some embodiments it may be stored as a number of exterior walls. In some embodiments, it may be stored as a percentage of exterior wall space in relation to total wall space. In other embodiments, it may be stored as a ratio of wall space to total wall space including floor and ceiling. The dwelling floors 432 stores information regarding the number of floors present in the dwelling. Dwelling foundation type 433 specifies a type of foundation supporting the dwelling. Dwelling foundation types 433 may in include crawlspace, concrete slab, basement, etc. . . . . The dwelling ecorank information 434 specifies information regarding the dwelling ecorank results. This information is determined by the comparison server device 60 and communicated to the thermostat device 30. It may be pushed periodically from the comparison server 60, or it may be requested from the thermostat device 30 as needed. Dwelling usage type 435 indicates how the dwelling is used. For example, if the dwelling is used for a home office, then one would expect the energy consumption to be higher due to additional time at the dwelling and additional equipment usage. When present, the hub 436 acts a communications bridge between the communications scheme used by the thermostats 30 and the hub 40 versus the communications scheme used between the hub 40 and the comparison server device 60. Each dwelling 414 may be comprised of one or more thermostats 440.

In another aspect of the present disclosure, portions of the dwelling information may be obtained from a 3rd party site such as Zillow®. In another aspect, information collected from the user regarding the dwelling may be provided back to the 3rd party site.

Figure 4C:
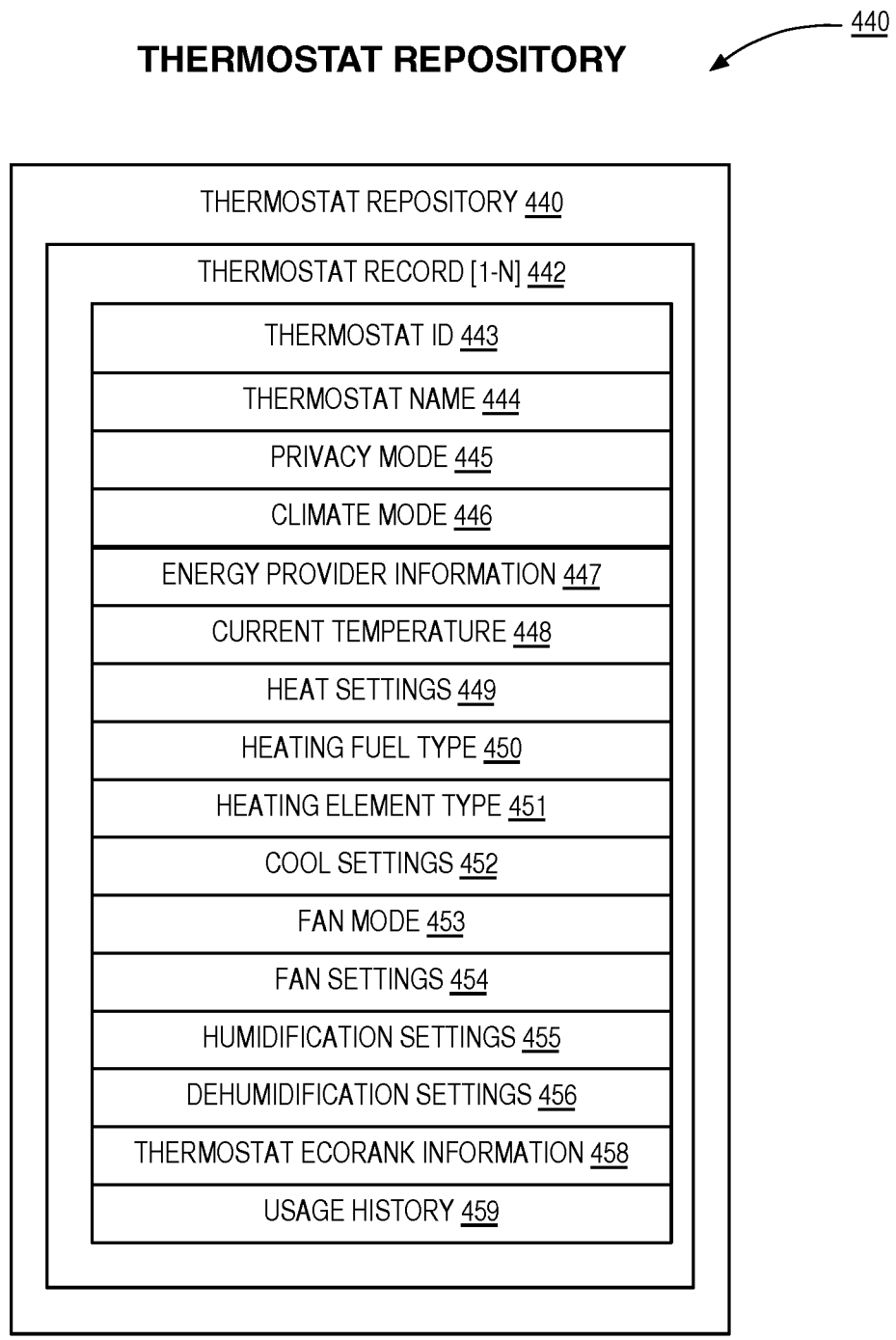
FIG. 4C illustrates an exemplary data structure for storing thermostat information according to some embodiments.

FIG. 4C illustrates an exemplary structure in memory for storing thermostat information 440 according to some embodiments. Each thermostat 442 [1-N] is may include a thermostat id 443, thermostat name 444, privacy mode 445, climate mode 446, energy provider 447, current temperature 448, heat setting 449, heating fuel type 450, heating element type 451, cool setting 452, fan mode 453, fan settings 454, humidification settings 455, dehumidification 456, ecorank information 458, and usage history 459. The thermostat id 443 is a unique identifier for the thermostat device. The thermostat name 444 is a name assigned by the user. Examples would include "Bedroom", "Den", "Living Room", "Upstairs", etc. The privacy mode 445 indicates whether the ecorank information should be presented on the display of the thermostat device 30. The climate mode 446 indicates the operating mode of the climate system. Examples would be "Heat", "Cool", "Auto", "Off". The energy provider 447 indicates one or more business entities providing the energy to fuel one or more climate system components for the climate system. The current temperature 448 reflects the temperature sensed at the thermostat device 30. The heat setting 449 is the minimum temperature that the climate system will attempt to maintain. The heating fuel type 450 reflects the type of fuel used in heating the dwelling. Possible types comprise gas, electric, oil, propane, and/or geothermal. The heating element type 451 indicates the type of heating unit associated with the thermostat. Possible values are comprised of forced air, in-floor radiant, radiators, and electric baseboards. The cool setting 452 is the maximum temperature that the climate system will attempt to maintain. The fan mode 453 represents the operating mode of the fan. Possible settings include "On", "Off", and "Auto". The fan setting 454 indicates the fan speed. Examples may include "Auto", "Low", "Medium", and "High". The humidification settings 455 indicate a target humidity level or a minimum humidity level, such as 30%. The dehumidification settings 456 indicate a target humidity level or a minimum humidity level, such as 70%. Thermostat ecorank information 458 stores information regarding the thermostat ecorank results. The thermostat ecorank information is determined by the comparison server 60 and communicated to the thermostat device 30.

The usage history 459 stores historical data regarding the energy consumption of the climate system associated with the thermostat device 30. In some embodiments, the usage history stores events that occur at the thermostat. These events may include the temperature being changed, the ecorank being changed, the heat turning on or off, the cooling turning on or off, movement detected in front of the thermostat, a change in priority mode, or a change in some other setting. These events may also comprise "program events" or events that are generated according to thermostat device program settings. In some embodiments, the identity of the person making the change is recorded along with the event. In some embodiments, the identity of the person making the change is detected using a camera housed in the thermostat and facial recognition. In some embodiments, the occupants of the dwelling may provide a profile image such that the occupant making the changes to the thermostat may be identified. In some embodiments, if a visitor who has not been registered with the system attempts to make a change to the climate system settings they are disallowed. In some embodiments, their image will be captured and may be visually inspected by the dwelling occupants at a later time. In some embodiments, occupants are identified with biometrics such as a fingerprint scanner.

In another aspect of the present disclosure an energy company, as indicated by the energy provider 447, may use the ecorank scores as a framework to enable a tiered pricing structure, awarding customers with a better ecorank score discounted pricing, and users with worse ecorank scores less favorable pricing. In another aspect of the present disclosure, the energy company may subsidize the purchase of the described thermostat device to further facilitate the reduction in peak energy consumption. In some embodiments, the energy company may control the operation of the thermostat during peak energy demand time windows to reduce peak energy demands. In some embodiments, users are awarded a better ecorank score in exchange for ceding control of the thermostat during.

Figure 4D:
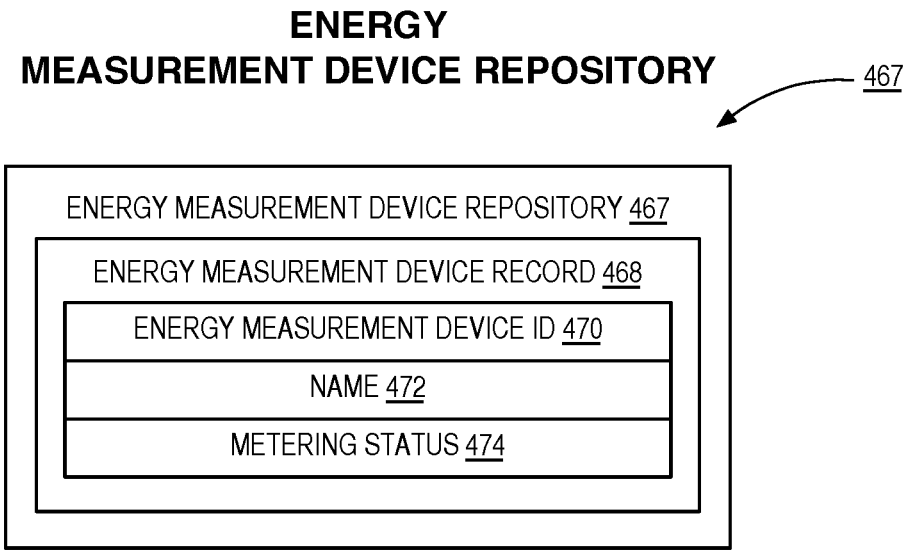
FIG. 4D illustrates an exemplary data structure for storing energy measurement device information according to some embodiments.

FIG. 4D illustrates an exemplary structure in memory for storing energy measurement device information according to some embodiments. Each energy measurement device 468 is comprised of an energy measurement device ID 470, a name 472, and a metering module 474. The energy measurement device id 470 is a unique identifier identifying the energy measurement device 50. The name 472 is a user assigned name. The meter 474 stores information regarding energy usage.

Figure 4E:
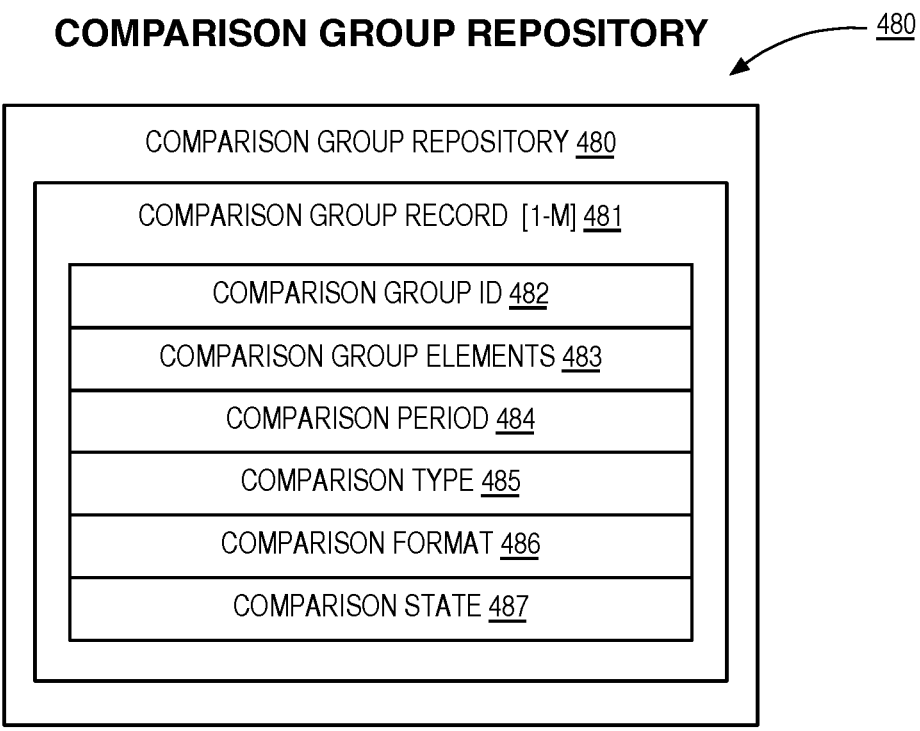
FIG. 4E illustrates an exemplary data structure for storing energy measurement device information according to some embodiments.

FIG. 4E is a graphical illustration of a comparison group. The comparison group 480 is comprised one or more comparison group records 481, each comparison group record comprising a comparison group id 482, a plurality of comparison group elements 483, a comparison period 484, comparison type 485, comparison format 486, and a comparison state 487. The comparison group id specifies a unique identifier for the comparison group. Comparison group elements 483 specify a plurality of entities being compared. The entities to be compared may include one of user accounts, dwellings, and thermostats (i.e. the entities to be compared are homogeneous). The comparison period 484 specifies the time period over which the comparison is being made. Possible values for this field may be specified in increments of days, months, quarters, and years. The comparison type 485 specifies if the comparison period 484 is a moving window or a set period. The comparison format 486 specifies whether the ecorank scores are normalized, and if so, the attributes on which the normalization takes place. The comparison state 487 specifies the current position within a stationary comparison window.

Figure 4F:
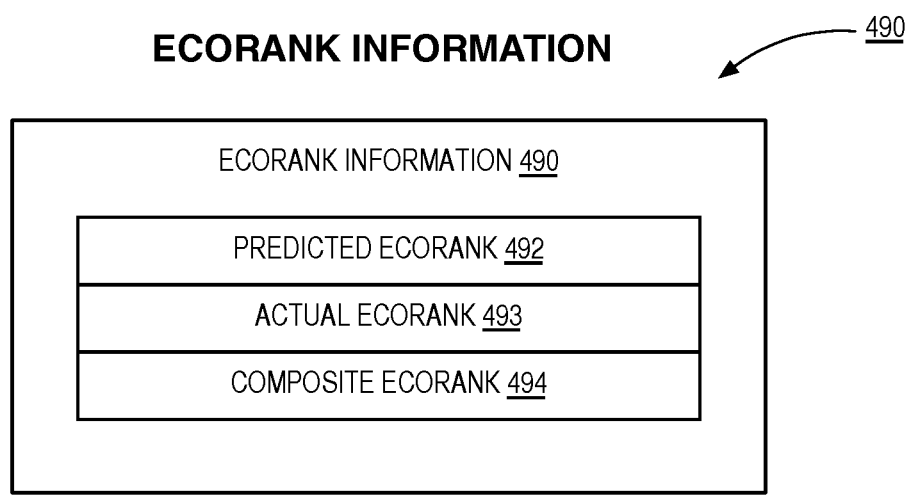
FIG. 4F illustrates an exemplary data structure for storing energy measurement device information according to some embodiments.

FIG. 4F is a graphical illustration of a ecorank information 490 structure. The ecorank information comprises a predicted ecorank 492 and an actual ecorank 493. In some embodiments, the predicted ecorank 492 and the actual ecorank 493 are represented as a single composite ecorank 494, wherein the composite ecorank 494 is based on a combination of the predicted ecorank 494 and an actual ecorank 495 depending on the data available at the time of ecorank determination.

FIG. 4G illustrates an exemplary entity relationship diagram 495 according to some embodiments. As indicated 496, the user account record 402 may be linked to one to many dwelling records 414, and the dwelling record 414 may be linked to zero to many user accounts 402. As indicated 497, the dwelling record 414 may be linked to one to many thermostat records 442, and the thermostat record 442 may be linked to one and only one dwelling record 414. As indicated 498, the thermostat record 442 may be linked to zero to many energy measurement device records 468, and the energy measurement device record 468 is linked one and only one thermostat. As indicated 499, the comparison group 480 is linked to a plurality of thermostats 442, while thermostat may belong to one or more comparison groups 480. Since ecorank comparisons may also be made at the dwelling 414 and user account 402 level, the comparison group has similar relationships with dwellings 414 and user accounts. For simplicity, these possible relationships, are not shown in FIG. 4E.

FIG. 5A shows a system diagram for the climate system 500 according to other embodiments. In these embodiments, the system is comprised of a computing device 20, thermostat device 30, hub device 40, energy measurement device 50, climate control subsystems 90, a comparison server device 60, and a network 15. Note that in some embodiments the hub device 40 will be present, but not the energy measurement device 50. In other embodiments the energy measurement device 50 but not the hub device 40. And in others, as shown in FIG. 5A, both are present.

The computing device 20, thermostat device 30, and comparison server device 60 perform similar roles as described in FIG. 3A.

The hub device 40 may be used to act as a bridge between the thermostat device 30, energy measurement device 50, comparison server device 60 and computing device 20. As such, the thermostat device 30 and energy measurement device 50 are able to interface with the hub device 40 using a first network interface and the hub device 40 communicates with the comparison server device 60 using a second, different interface. For example, the first network interface may employ one or more of a C-Bus, EnOcean, Insteon, KNX, UPB, X10, ZigBee, and Z-Wave protocols, while the second network interface uses internet protocols over WiFi and/or Ethernet. In some embodiments, the network communications may be encrypted, particularly for the devices that are communicating over the Internet to the comparison server 60. Encrypting the data traveling over the network provides additional security in terms of protecting the various data collected by the computing device, thermostat device, and energy measurement device. Additionally, this provides additional protection from nefarious entities attempting to remotely control the thermostat device over the Internet. The hub device 40 is comprised of a monitoring module 42, a communications module 43, and a configuration module 44. The monitoring module operates to obtain status updates from the various thermostat devices 30 and energy measurement devices 50 and provide that information to the comparison server device 60. The monitoring module 42 may also obtain information from the comparison server device 60, and direct it to the appropriate thermostat device 20. The monitoring information may be obtained using polling or interrupt techniques or any combination thereof. The communication module 43 operates to provide the network communications between the hub device 40 and the local devices (thermostat devices 30 and energy measurement devices 50), and between the hub device 40 and the comparison server 60. The configuration module 44 operates to receive configuration information and direct the hub device 40 to operate according to the configuration.

Zero or more energy measurement devices 50 may be used to monitor the energy being consumed by the HVAC system. The use of the energy measurement device 50 provides for a more accurate determination of the energy being consumed as compared to other methods disclosed herein where the energy being consumed is being estimated or inferred indirectly. For example, in some embodiments, the usage time for the various climate system components is used to determine ecorank. The usage time acts as a proxy for the energy being consumed. In other embodiments, the energy consumed will be determined as a product of the usage time for various climate system components and their typical in-use energy consumption profile. The energy measurement device 50 is comprised of a monitoring module 52, a communications module 53, and a configuration module 54. The monitoring module 52 operates to monitor the energy consumption for the circuit for which it is associated. In some embodiments this may be done in a digital fashion by periodically sampling the electrical current flowing through the circuit and integrating over time. In other embodiments, this may be accomplished using an analog counter that may be digitally read. The communications module 53 operates to provide the networking communications between the energy measurement device 50 and the hub device as shown in FIG. 4A. In other embodiments, the energy measurement device 50 may communicate directly through the LAN/WAN network 15 without going through the hub network 12. In some embodiments, the communications interface for the energy measurement device 50 may be provided at the individual circuit breaker level, so that not all breakers in a panel have to be network-enabled breakers. In some embodiments, the communications interface is provided at the panel, so that not each breaker has to contain a separate communications interface. The configuration module 54 operates to receive configuration information and direct the energy measurement device 50 to operate according to the configuration.

Examples of hub devices would include televisions, set-top-boxes (STBs), over-the-top devices (OTTs), gaming consoles, home security systems, and other computing devices. As used herein, an over-the-top device refers to a device operable to deliver audio, video, and other media over the Internet without the involvement of a multiple-system operator in the control or distribution of the content.

FIG. 5B is a network diagram showing the communications between the thermostat device 30, computing device 20, hub device 40, energy measurement device 50, and comparison server device 60 in climate priority mode. The computing device 20 sends network credentials 504 to the hub device 40 allowing the hub device 40 to join the network 506. In some embodiments, hub device 40 receives the credentials from the user directly at the hub device 40. The thermostat device 30 and the energy measurement device 50 similarly join (508, 510, respectively) the hub network 12. User input indicating the climate system setting is received 512 at the thermostat device 30. The climate system settings are sent to the hub 40 in 514 and relayed to the comparison server device 60 in 516. The comparison server device 60 determines ecorank information based on the climate system settings 518. The ecorank information is sent from the comparison server device 60 to the hub device 40 in 520 and relayed to the thermostat device 30 in 522. The climate system settings and corresponding ecorank information are displayed at the thermostat device 30 in 524. Energy consumption information is reported by the energy measurement device 50 to the hub device 40 in 526 and relayed to the comparison server device 60 528. The ecorank information is updated and sent to the hub device 40 in 430 and relayed to the thermostat device 30 in 532. This process may be repeated on a periodic basis, when a number of updates have been provided by the other devices, when requested by the thermostat device 30, or according to other criteria 534. The steps of sending the climate system settings 514 and 516, determining ecorank 518, and receiving the ecorank at the thermostat device 520 and 522 are performed in real-time or near real-time. Thus the user operating the thermostat device 30 is able to receive immediate feedback as they make climate system setting changes at the thermostat device 30.

FIG. 5C is a network diagram showing additional communications between the thermostat device 30, computing device 20, hub device 40, energy measurement device 50, and comparison server device 60 in eco priority mode. The priority mode is set to eco priority mode 554 based on user input. User input is received indicating an ecorank target setting 556. The ecorank target setting is sent to the hub device 40 in 558 and relayed to the comparison server device 60 in 560. An updated climate system setting is determined based on the target ecorank target setting 562, sent to the hub device 40 in 564, and relayed to the thermostat device 30 in 566. The target ecorank target setting and the corresponding climate system setting are displayed at the thermostat device 568. Energy consumption is reported 570 by the energy measurement device 50 to the hub device 40 and relayed 572 to the comparison server device 60. Based on the energy consumption information the climate system settings are updated and sent to the hub device 40 in 574, and relayed 576 to the thermostat device 30. This process may be repeated on a periodic basis, when a number of updates have been provide by the other devices, when requested by the thermostat device 30, or according to other criteria 570. The steps of sending the ecorank target setting 558 and 560, determining climate system settings 562, and receiving 564 and 566 the climate system settings at the thermostat device 30 are performed in real-time or near real-time. Thus the user operating the thermostat device 30 is able to receive immediate feedback as he or she makes ecorank target setting changes at the thermostat device 30.

FIG. 6A is a flowchart illustrating the process involved in operating an exemplary comparison server 600. Along the top of the diagram, various events 617 are listed, including a network message received event 601, an comparison period reset timer event 602, a comparison group refactor timer event 603, a weather forecast information received event 604, an incentive information received event 605, and an ecorank and climate settings re-compute timer event 606. The events feed into an event queue 607. The events are dispatched by the event dispatcher 608 to the event handlers 618 listed along the bottom of the diagram, including a user account event handler 609, a dwelling event handler 610, a thermostat event handler 611, a climate setting change event handler 612, an ecorank target setting change event handler 613, a zone setting change event handler 614, an ecorank request change event handler 615, and a usage information event handler 616.

FIG. 6B is a flowchart illustrating the process involved in responding to a user account event at an exemplary comparison server 60. The user account event handler 620 receives a user account event 621 from the event dispatcher 608. The user account repository is accessed 622. If the user event specifies a new user account should be added 623, then a user account is added 624. If the user event specifies a user account should be deleted 625, then a user account is deleted 626. If the user account event specifies a user account information should be stored 627, then the user account information is stored 628. Any of the above three events (624, 626, 628) may cause the comparison group to be updated 629, and an ecorank to be recomputed 630. If the user account event specifies that user account information should be obtained 631, then the user account information is sent to the requesting entity 632. Once the event has been handled control is returned 633 to the event dispatcher 608.

FIG. 6C is a flowchart illustrating the process involved in responding to a dwelling event at an exemplary comparison server 60. The dwelling event handler 640 receives a dwelling event 641 from the event dispatcher 608. The dwelling repository is accessed 642. If the dwelling event specifies a new dwelling should be added 643, then a dwelling is added 644. If the dwelling event specifies a dwelling should be deleted 645, then a dwelling is deleted 646. If the dwelling event specifies a dwelling information should be stored 647, then the dwelling information is stored 648. Any of the above three events (644, 646, 648) may cause the comparison group to be updated 649, and an ecorank to be recomputed 650. If the dwelling event specifies that dwelling information should be obtained 651, then the dwelling information is sent to the requesting entity 652. Once the event has been handled control is returned 653 to the event dispatcher 608.

FIG. 6D is a flowchart illustrating the process involved in responding to a thermostat event at an exemplary comparison server 60. The thermostat event handler 660 receives a thermostat event 661 from the event dispatcher 608. The thermostat repository is accessed 662. If the thermostat event specifies a new thermostat should be added 663, then a thermostat is added 664. If the thermostat event specifies a thermostat should be deleted 665, then a thermostat is deleted 666. If the thermostat event specifies a thermostat information should be stored 667, then the thermostat information is stored 668. Any of the above three events (664, 666, 668) may cause the comparison group to be updated 669, and an ecorank to be recomputed 670. If the thermostat event specifies that thermostat information should be obtained 671, then the thermostat information is sent to the requesting entity 672. Once the event has been handled control is returned 671 to the event dispatcher 608.

FIG. 6E is a flowchart illustrating the process involved in receiving a climate setting at an exemplary comparison server. A climate setting is received 682 by the climate setting change event handler 680. This serves as an implicit notice to the comparison server device 60 that the associated thermostat wishes to operate in climate priority mode 684. The climate settings are stored 686 in the usage history 466 log. The predicted ecorank is updated 688 and sent to the requesting thermostat 690. Once the event has been handled control is returned 692 to the event dispatcher 608.

FIG. 7A is a flowchart illustrating the process involved in receiving an ecorank target setting at an exemplary comparison server. An ecorank target setting 702 is received by the ecorank setting change event handler 700. This serves as an implicit notice to the server that the associated thermostat wishes to operate in eco priority mode 704. In some embodiments, an explicit signal may be sent instructing the server to enter eco priority mode. A position in a sorted list of entities is determined that will result in the desired ecorank 706. Information indicating the current energy usage is received 707. Information indicating the temporal comparison period to be used is received 708. The energy needed to achieve the ecorank target setting over the temporal comparison period is determined 710. Weather forecast information is received indicating the weather forecast over the temporal comparison period 712. The climate system settings needed to achieve the energy savings required to achieve the desired position to achieve the desired ecorank are determined 714. The climate system settings are sent to the corresponding thermostat device 30 in 716. Once the event has been handled control is returned 718 to the event dispatcher 608.

Note that when referring to "sorted list", this may be thought of as a conceptual construct. In some embodiments, actual sorted list may be used. In other embodiments, other implementations may be used to arrive at the same result.

FIG. 7B is a flowchart illustrating the process involved in receiving a zone setting at an exemplary comparison server device 60. The zone setting change event 721 is received at the zone setting change event handler 720 from the event dispatcher 608. The thermostat repository is accessed 722. If the event specifies a link request 723, then the linking between zones is initiated 724. If necessary, an aggregated ecorank is recomputed 725, and the updated ecorank is sent to the effected thermostat devices 726. If the event specifies an unlink request 727, then the unlinking between zones is initiated 728. If necessary, an un-aggregated ecorank is determined 729, and the updated ecorank is sent to the effected thermostat devices 730. If the event specifies a get zone list request 731, then the zone list is sent to the effected thermostat device 724. If the event specifies a set zone attribute request 733, then the zone attribute is set for the specified zone 734. Once the event has been handled control is returned 735 to the event dispatcher 608.

FIG. 7C is a flowchart illustrating the process involved in requesting ecorank information at an exemplary comparison server. The ecorank request event 742 is received at the ecorank request event handler 740. If the requesting thermostat is operating in climate priority mode 744, then the actual ecorank and ecorank target setting are retrieved 748 and sent to the requesting thermostat 750. If the requesting thermostat is operating in eco priority mode 746, then the actual ecorank and predicted ecorank are retrieved 752 and set to the requesting thermostat 754. Once the event has been handled control is returned 756 to the event dispatcher 608.

FIG. 7D is a flowchart illustrating the process involved in receiving usage information at an exemplary comparison server. The usage information event is received at the usage information event handler 760. The usage information is received 762 and stored 764 in the usage history 466 log. The usage information may include information regarding the usage of various components of the corresponding climate system. For example, the heater turning on/off, the air conditioning turning on/off, the fan turning on/off, and a humidifier turning on/off. In some embodiments this information is reported in the form on a time duration that the corresponding component has been used since a last usage information was reported. In some embodiments, the usage information will comprise energy consumed by various components as reported by a corresponding energy measurement device. Based on the new usage history, the ecorank is updated 768 and sent to the requesting thermostat. The ecorank may be updated immediately (synchronously), or scheduled for update at a later time (asynchronously). Once the event has been handled control is returned 770 to the event dispatcher 608.

FIG. 7E illustrates a process 780 for determining a comparison group. Information regarding the user, dwelling and thermostat is received 782. A match score between a target thermostat/dwelling and a plurality of other thermostat/dwellings is determined 784. The plurality of other thermostat/dwellings are then ranked by match score 786. The top N other thermostat/dwellings are selected as the comparison group for the target thermostat/dwelling 788. Information regarding the comparison group may be stored in the comparison group 481 of the corresponding dwelling 412.

The ecorank is then determined based on the entities position within the sort. For example, if an entity were $37^{th}$ in a group of 100 ranked entities, ranked lowest to highest, then an ecorank of 37 would be assigned. In some embodiments the entities will be ranked lowest to highest, with a low ecorank being better. Other embodiments may choose a different polarity for the ecorank, with a higher number indicating a more favorable ecorank. Some embodiments may use colors and/or graphical symbols to augment or replace a numerical ecorank indicator.

In some embodiments, the comparison groups may be formed through the use of clustering. Example of clustering techniques would comprise connectivity based clustering, centroid based clustering, distribution based clustering, and density based clustering.

The described system may operate in two different modes, temperature priority, and ecorank priority. In the case of temperature priority, the temperature is the independent variable, and the ecorank is the dependent variable. A climate setting is selected, and the ecorank follows. In the case of ecorank priority, the ecorank target setting is selected, and a climate setting must be determined. However, there is not a closed form equation to determine the setting because of other user's climate system settings and ecorank target settings will be varying and controlled independently. As a result, the climate settings to achieve the ecorank target setting must be determined in an iterative fashion, and updated over time. Note also that it may not be possible to achieve the ecorank target setting for a particular thermostat. For example, a user may desire an ecorank score of zero, but if all other users in a comparison group 481 desire the same score, then the best that can be achieved is a multiple way tie. That is, all of the thermostats are effectively shut off and no one uses any energy at all. Note that while this may be a desired goal of the present disclosure, it is not likely a realistic scenario.

When system 300 and 500 is first put into use, and there are only a few users of the system, there may be only one comparison group 481 and the comparisons will be very course and rudimentary. As the system continues to run and other users are added, the comparison groups may become more granular, and the comparisons more meaningful.

The actual ecorank is determined based on a time period window. In some embodiments, the time period window is an "N" day window. The time period window may be stationary or it may be moving. An example of a stationary time period window would be an ecorank that is calculated based on the month. At the beginning of January, the ecorank would be reset, and the ecorank would be calculated throughout the month based on the time elapsed within that month. For example, on the $6^{th}$ day of January, the ecorank would be based on data collected from January $1^{st}$ up through January $6^{th}$. An example of a moving time period window would be a 30 day moving window. So for our example of January $6^{th}$, using the moving time period window, the data used to compute the ecorank would be December 6th of the previous year up through January $6^{th}$. In some embodiments, the time period window would be a per comparison group 481 setting (assuming a symmetric comparison group). In other embodiments, the time period window would be a system wide setting. In other embodiments, the time period window may be a per user/thermostat/dwelling setting.

In another aspect of the present disclosure the comparison group 481 is further determined based on demographic data, such as household (dwelling) income data. User income may be correlated with energy consumption. For example, users with lower incomes are more likely to use less energy, however it may be for economic necessity as opposed to altruistic inclinations. As such, a comparison group determined based on demographic data may be preferable.

In another aspect of the present disclosure the comparison group 481 is determined based on climate mode settings, i.e. climate mode vs. eco mode. In some circumstances it may be preferable to have a comparison group 481 based on a common mode, i.e. all eco priority mode or all climate priority mode. In other instances, it may be preferable to have a mix of eco priority mode and climate priority mode. Therefore, a comparison group 481 determined based on priority mode may be preferable.

In some embodiments, input is received from the user selecting the entities to be included in a comparison group 481. In some embodiments, the comparison group 481 is comprised of the users friends on a social network. In some embodiments the comparison group 481 is comprised of a circle of friends representing a subset of friends on the social network. In some embodiments, the comparison group 481 is comprised of other users being followed on a social network. In some embodiments, the comparison group 481 is comprised of other users following the user on a social network. Examples of social networks include Facebook®, Google®, Twitter®, and the like. In some embodiments, ecorank information is provided by the comparison server device to a social network for display. In some embodiments, the display of the ecorank information is dictated based on friend groups and sharing permissions. In some embodiments, the display of the ecorank information is used to derive ad placement and resultant revenues. In some embodiments, the user may elect to have their ecorank information displayed only if it is above or below a certain threshold. In some embodiments, an energy provider may pay for the placement and display of ecorank information for users of the social network where the ecorank score is above or below a certain threshold.

FIG. 8A is a flowchart illustrating the process 800 involved in operating an exemplary thermostat device 30. Along the top of the diagram, various events 818 are listed, including a network message received event 802, a user input event 804, and a motion detection event 806. The events feed into an event queue 808. The events are dispatched by the event dispatcher 810 to the event handlers 820 listed along the bottom of the diagram, including a network message event handler 812, a user input event handler 814, and a motion detection event handler 816.

FIG. 8B is a flowchart illustrating the process 830 involved in receiving a network message 832 at exemplary thermostat device. If the network message indicates receiving actual ecorank information 834, then depending on privacy mode 836, the actual ecorank information is either stored and displayed 838, or stored and not displayed 839. If the network message indicates receiving predicted ecorank information 840, then depending on privacy mode 842, the predicted ecorank information is either stored and displayed 844, or stored and not displayed 845. If the network message indicates receiving ecorank target setting information 840, then depending on privacy mode 848, the ecorank target setting information is either stored and displayed 850, or stored and not displayed 851. If the network message indicates receiving zone state information 852, then the zone state information is displayed 854. If the network message indicates receiving a confirmation request 856, then the confirmation request is displayed (not shown). If confirmation is received 858, then the confirmation is sent 860, otherwise no confirmation is sent 861. Once the event has been handled 862 control is returned to the event dispatcher 810.

FIG. 8C is a flowchart illustrating the process 870 involved in receiving user input 872 at exemplary thermostat device. If the network message indicates receiving a navigate counterclockwise event 874, then the current menu item is changed to the previous menu item 876. If the network message indicates receiving a navigate clockwise event 878, then the current menu item is changed to the next menu item 880. If the network message indicates receiving a select event 882, then the current menu item is selected 884. Depending on the type of selected menu item, the current menu may be changed to a child menu 886, the selected menu item may be executed 888, or the current menu item may be changed to a parent menu 890. Once the event has been handled 892 control is returned to the event dispatcher 810.

FIG. 9 is a diagram illustrating the comparison period used in determining 900 ecorank information. The ecorank comparison period 916 is comprised of an actual ecorank 904 and a predicted ecorank 906. At the beginning 901 of the comparison period 916, and at end 903, a predicted ecorank is determined based on climate settings (for climate priority mode) and ecorank target settings (for eco priority mode). Past usage history may also be used when available (i.e. after the first time the thermostat device is used). The actual ecorank is determined, for interval 902, based on usage information reported 902. In climate priority mode, the predicted ecorank is determined, for interval 903, based on the temperature target setting 116. In eco priority mode, the predicted ecorank is determined, for interval 903, based on the ecorank target setting 118. T=0 912, reflects the current time. T−ELAPSED TIME 912, reflects the start of the comparison period. T−REMAINING TIME 916, reflects the end of the comparison period. Together, the ELAPSED TIME and REMAINING TIME are equal to the duration of the comparison period.

FIG. 10 is a diagram illustrating the various climate settings of the present system 1000. The climate settings are comprised of cool settings 1014 and heat settings 1016. The cool settings are comprised of away maximum temperature 1002 settings, home maximum temperature 1004 settings, and a cool temperature 1006 setting. The heat settings are comprised of away minimum temperature 1012 settings, home minimum temperature 1010 settings, and a heat temperature 1008 setting. The cool temperature 1006 and heat temperature 1008 operate as normal/traditional climate system settings and are applicable when the thermostat is operating in climate priority mode. The home maximum temperature 1004 and the home minimum temperature 1010 operate as temperature boundaries outside of which the system will not adjust the climate settings when operating in eco priority mode. The away maximum temperature 1004 and the away minimum temperature 1010 operate as temperature boundaries outside of which the system will not adjust the climate settings when operating in either climate priority mode or eco priority mode.

FIG. 11 illustrates factors (i.e., parameters) and computations used in an exemplary process for determining a match score between two dwellings/thermostats according to some embodiments of the present disclosure 1100. The match score is determined as a function (or through an analysis) of a geographic location factor 1102, a geographic location factor weight 1104, a dwelling type factor 1106, a dwelling type factor weight 1108, a dwelling size factor 1110, a dwelling size factor weight 1112, an occupant count factor 1114, an occupant count factor weight 1116, a dwelling floor count factor 1118, a dwelling floor count factor weight 1120, a heating fuel type match 1122, a heating fuel type match weight 1124, a heating element type match 1126, a heating element type match weight 1128, a usage type match 1130, and a usage type match weight 1132. Note that a plurality of other factors is identified within the present disclosure, and while not used in this exemplary computation, are considered within the scope of the disclosure.

Match Score (dwelling #1, dwelling #2) =

$GLFW * GLF + DSFW * DSF + DTFW * DTF + HFTMW * HFTM + HETMW * HETM + OCF * OCF + DFCFW * DFCF + UTMW * UTM$

FIG. 12A illustrates exemplary data for use in computing an ecorank. The table is comprised of a dwelling ID 416, city and state from a dwelling address 420, dwelling location 418, dwelling type 428 a dwelling size 424, dwelling occupants 426, dwelling floors 432, heating fuel type 450, heating element type 451, usage type 435, average cool setting, average heat setting, hours cooling, hours heating, total hours, and energy consumption. The table of FIG. 12A consist of M rows, one for each dwelling in the example data set. For this example, M=30. The first row is the table is for a dwelling in Cedar Rapids Iowa. The average cool setting, average heat setting, hours cooling, hours heating, total hours, and energy consumption are computed based on an N day moving window.

FIG. 12B illustrates an exemplary computation of a match score based on the data of FIG. 12A. The table of FIG. 12B consist of M−1 (29) rows. Each of the 29 rows contains the data for that dwelling in comparison to row 1 of the table of FIG. 9A (a.k.a. the dwelling in Cedar Rapids Iowa). The individual comparison factors (GLF, DTF, DSF, OCF, DFCF, HFTM, HETM, and UTM) are individually computed for each of the 29 rows. The comparison factors are detailed in the table below.

FIG. 12C illustrates an exemplary selection of a comparison group 481 based on the match score of FIG. 12B. The rows of FIG. 12C have been sorted by the match score 1202, with the highest match scores appearing at the top. For the purposes of this example calculation, we are choosing the comparison group 481 to be 10 dwellings (i.e., the Cedar Rapids dwelling plus the nine other dwellings with the highest match score as indicated by the cutoff line 1204). Note that comparison groups are not always symmetric. In other words, the comparison group 481 for dwelling A may contain dwelling B, but the comparison group 481 for dwelling B may contain necessarily contain dwelling A. I.e. asymmetric.

FIG. 12D illustrates an exemplary computation of an ecorank based on the comparison group 481 of FIG. 12C. The table appearing in FIG. 12D has been resorted based on the energy consumption 1206 with the dwelling with the lowest energy consumption appearing at the top. The Cedar Rapids dwelling appears third from the bottom and thus has an ecorank of 30. In this particular example, the ecorank was determined based on energy consumption, indicating that each of the dwellings was equipped with an energy measurement device. In real world applications, this would not likely be true. In scenarios where energy consumption is not available, the hours spent heating and cooling (total hours in the table of FIG. 12D) could be used. Note that the example data set of FIG. 12A was chosen for illustrative purposes. The dwellings are not disbursed geographically in terms of population. "In the wild", the number of dwellings would be several orders of magnitude greater, and they would likely be distributed according to real populations.

FIG. 13 illustrates an exemplary computation for determining a climate setting based on an ecorank target setting for a thermostat/dwelling. A match score is determined between a target thermostat device and a plurality of other thermostat devices. In this example, the target thermostat/dwelling is the Cedar Rapids dwelling. The thermostat device sends an indication that it wishes to operate according to eco priority mode 1302. A request is received from the thermostat device indicating that it wishes to be in the top three in terms of ecorank 1304. For the Cedar Rapids thermostat/dwelling to be in the top three, it needs to end up above the Lubbock, Tex. thermostat/dwelling 1306. The energy consumption differential is determined between Cedar Rapids thermostat/dwelling and Lubbock, Tex. thermostat/dwelling 1308. The time left in the comparison window is determined as 10 days. It is determined that the Cedar Rapids thermostat/dwelling needs to save 945 kilowatt hours (kwhs) over the 10-day period as 94.5 kwh/day 1310. The heat loss rate is determined 1312. The predicted energy consumption for the 10-day period is estimated based on the heat loss rate for the dwelling and the weather forecast for the area around the dwelling 1314. The heat loss rate is dependent on the temperature differential between the dwelling and the atmosphere around it so knowing the weather forecast (temperature) around the dwelling is needed. A temperature is determined that will result in the needed energy consumption savings over the 10-day period 1316.

FIGS. 14A, 14B, 14C, and 14D graphically illustrate exemplary user interfaces for interacting with the computing device 20 and/or thermostat device 30. When interacting with the computing device 30, the settings may be sent from the computing device 20 in a plurality of manners. The settings may be sent to the thermostat device 20 using a point to point protocol such as Bluetooth or WIFI direct, relayed through the hub 40, or sent to the comparison server 60 over the internet and relayed back to the thermostat device 30. In some embodiments, more than one protocol may be employed. The information accessed by the various panels may be stored at the thermostat device 30 and/or the comparison server device 60. In some embodiments, the information stored at the comparison server device 60 is stored in a structure in memory such as the structures described in FIGS. 4A-4D.

FIG. 14A graphically illustrates an exemplary user interface for setting user profile settings 1400. The user id control 1402 operates to enable access to the user id 404 data 1403. The password controls 1404 operates to enable access to the password 408 data 1405. The first name control 1406, last name control 1408, and middle name control 1410 operate to enable access to the user name 406 data 1407 1409 1411. The image control 1412 operates to enable access to the image 406 data 1416. The image 1416 stores an image, graphical depiction, icon, or likeness of the user represented by the user profile. The dwelling control 1414 operates to enable access to one or more dwellings 412 associated with the user. Selecting one of the one or more dwellings 412 using the dwellings control 1414 will effect the display of the dwellings profile settings of FIG. 14B. FIG. 14B graphically illustrates an exemplary user interface for setting dwelling profile settings 1420.

FIG. 14B graphically illustrates an exemplary user interface for setting dwelling profile settings 1420. The dwelling location control 1422 operates to enable access to the dwelling location 418 data 1423. The dwelling name control 1424 operates to enable access to the dwelling name 422 data 1425. The dwelling size control 1426 operates to enable access to the dwelling type 424 data 1427. The dwelling occupants control 1428 operates to enable access to the dwelling occupants 426 data 1429. The dwelling type control 1430 operates to enable access to the dwelling type 428 data 1431. The dwelling exterior walls control 1432 operates to enable access to the dwelling exterior walls 430 data 1433. The dwelling floors 1434 operates to operates to enable access to the dwelling floors 432 data 1435. The comparison group control 1436 operates to enable access to the comparison group 481 data 1437. The comparison period control 1438 operates to enable access to the comparison period 484 data 1439. The thermostat control 1440 operates to enable access to one or more thermostats associated with the thermostat device. Selecting one of the one or more thermostats using the thermostats control 1438 will effect the display of the climate system settings of FIG. 14C.

FIG. 14C graphically illustrates an exemplary user interface for effecting climate system settings 1440. The thermostat name control 1442 operates to enable access to the thermostat name 444 data 1443. The heating fuel type control 1444 operates to enable access to the heating fuel type 450 data 1445. The energy provider control 1446 operates to enable access to the energy provider 447 data 1447. The heating element type control 1448 operates to enable access to the heating element type 451 data 1449. The climate mode control 1450 operates to enable access to the mode 446 data 1451. The heat setting control 1452 operates to enable access to the mode 449 data 1453. The cool setting control 1454 operates to enable access to the mode 452 data 1455. The fan mode control 1456 operates to enable access to the fan mode 453 data 1457. The energy measurement device(s) controls 1458 operates to enable selection and configuration of the associated energy measurement device(s) 468.

FIG. 14D graphically illustrates an exemplary user interface for specifying energy measurement device settings 1460. The names of the energy measurement devices are listed on the left of the display area. For example: "heating subsystem" 1463, "air conditioning subsystem" 1465, "fan subsystem" 1467, and "humidification/dehumidification subsystem" 1469. A selector menu 1470 operates to receive input allowing the designation of the subsystem for which energy consumption is being measured. In some embodiments, the selection menu 1470 is populated based on information identifying the various subsystems provided by the energy measurement device.

In some embodiments of the present disclosure, the thermostat ecorank information is normalized by dwelling characteristics and/or occupant information such that thermostat ecorank information may be compared directly. In some embodiments, this is done so that thermostat ecorank information can be compared directly, and need not be put into comparison groups. For example, the thermostat ecorank information may be normalized based on the dwelling size, dwelling geographic location, and dwelling occupant count. In some embodiments, the thermostat ecorank information is normalized in addition to utilizing comparison groups.

In some embodiments of the present disclosure, the dwelling ecorank information is normalized by dwelling information such that dwelling ecorank information may be compared directly. In some embodiments, this is done so that dwelling ecorank information can be compared directly, and need not be put into comparison groups. For example, the thermostat ecorank information may be normalized based on the dwelling size, dwelling geographic location, and dwelling occupant count. In some embodiments, the dwelling ecorank information is normalized in addition to utilizing comparison groups. In some embodiments, the dwelling ecorank information is based on normalized thermostat ecorank information.

In some embodiments of the present disclosure, the user account ecorank information is normalized by user account information such that user account ecorank information may be compared directly. In some embodiments, this is done so that user account ecorank information can be compared directly, and need not be put into comparison groups. For example, the user account ecorank information may be normalized based on the country and or continent that the user primarily resides. For example, users residing in the U.S. have energy consumption rates that far exceed those of users residing in developing countries such as those found in Africa. In some embodiments, the user account ecorank information is normalized in addition to utilizing comparison groups. In some embodiments, the user account ecorank information is based on normalized thermostat ecorank information and normalized dwelling ecorank information.

FIG. 15A graphically illustrates an exemplary user interface 1500 for displaying an ecorank for a thermostat device 30 at either the computing device 20 or thermostat device 30. The thermostat ecorank displays 1502 the ecorank for the thermostat 1504. The comparison results 1506 explain how to interpret the ecorank results. The comparison group 481 describes 1508 the other thermostat devices included in the comparison group. The comparison period 484 displays 1510 the length of the comparison period.

FIG. 15B graphically illustrates an exemplary user interface for displaying 1520 an ecorank for a dwelling at either the computing device 20 or thermostat device 30. The dwelling ecorank 1522 displays the ecorank for the dwelling 1524. When a dwelling has a single thermostat, the ecorank for the dwelling is the same as the ecorank for the thermostat device. When a dwelling has more than one thermostat, the ecorank for the dwelling is the average of the ecoranks of the respective thermostat devices. The comparison results 1526 explain how to interpret the ecorank results. The comparison group 1528 describes the other thermostat devices included in the comparison group. The comparison period 1530 displays the length of the comparison period.

FIG. 15C graphically illustrates an exemplary user interface 1540 for displaying a user at either the computing device 20 or thermostat device 30. The user ecorank displays 1542 the ecorank for the user 1544. When a user has a single dwelling, the ecorank for the user 1552 is the same as the ecorank for the associated dwelling 1554. When a user has more than one dwelling, the ecorank for the user 1552 is the average of the ecoranks of the respective dwellings. The comparison results 1546 explain how to interpret the ecorank results. The comparison group 481 describes 1548 the other thermostat devices included in the comparison group. The comparison period 1550 displays the length of the comparison period.

FIG. 16A graphically illustrates relationships 1600 between dwellings 200, thermostat devices 30 and users 10 in instances when one or more of each are involved. In some instances, there will be a single dwelling, thermostat device, and occupant 1602. For example, a single occupant living in a single dwelling, such as a condo, with a single thermostat. In some instances, there will be a single dwelling, thermostat device, and multiple occupants 1604. For example, multiple occupants living in a single dwelling, such as a condo, with a single thermostat. In some instances, there will be a single dwelling, multiple thermostat devices, and a single occupant 1606. For example, one occupant living in a single dwelling, such as a condo, with multiple thermostats—for example a multi floor townhouse. In some instances, there will be a single dwelling, multiple thermostat devices, and multiple occupants 1608. For example, multiple occupants living in a single dwelling, such as a townhouse, with multiple thermostats—for example a multi floor townhouse.

FIG. 16B graphically illustrates additional relationships between dwellings 200, thermostat devices 30 and users 10 in instances when one or more of each are involved. In some instances, there will be multiple dwellings, a single thermostat device, and a single occupant 1610. For example, one occupant residing in two different dwellings, where both dwellings are controlled by the same thermostat—for example a main house and an out building that are both controlled by one thermostat. In some instances, there will be multiple dwellings, a single thermostat device, and multiple occupants 1612. For example, multiple occupants residing in two different dwellings, where both dwellings are controlled by the same thermostat—for example a main house and an out building that are both controlled by one thermostat. In some instances, there will be multiple dwellings, multiple thermostat devices, and a single occupant 1614. For example, one occupant residing in two different dwellings, where each dwelling is controlled by a separate thermostat—for example a main house and an out building wherein each building has its own thermostat. In some instances, there will be multiple dwellings, multiple thermostat devices, and multiple occupants 1616. For example, multiple occupants residing in two different dwellings, where each dwelling is controlled by a separate thermostat—for example a main house and an out building wherein each building has its own thermostat.

FIGS. 17A-F shows possible interactions between a controlled device 14, a control device 16, and an energy measurement device 50. As shown in FIG. 17A, the controlled device 14, the control device 16, and the energy measurement device 50, are all separate devices. As shown in FIG. 17B, the controlled device 14 and the control device 16 may be grouped together as one device 1720, interacting with a separate energy measurement device 50. As shown in FIG. 17C, the control device 16 and the energy measurement device 50 may be grouped together as a single device 1730 interacting with a separate controlled device 14. As shown in FIG. 17D, the controlled device 14 and the energy measurement device 50 may be grouped together as a single device 1730 interacting with a separate control device 16. Finally, as shown in FIG. 17E, the controlled device 14, the control device 16, and the energy measurement device 50, are all grouped as a single device 1740. In some embodiments, the control device 16 is a thermostat device 30. In some embodiments, the controlled device is a climate system component. In some embodiments, the energy measurement device 50 is a device capable of determining the energy used by each of a plurality of electrical subsystems and/or appliances in a dwelling 200. Further, the energy measurement device 50 may be operable to assign and/or receive names for the subsystems and/or appliances in a dwelling 200. In some embodiments the energy measurement device 50 is operable to perform signal processing to determine the identity and/or distinguish between subsystems and/or appliances in a dwelling 200.

FIG. 17 shows possible interactions between a controlled device 14, a control device 16, and then energy measurement device 30. As shown in FIG. 17A, the controlled device 14, the control device 16, and the energy measurement device 50, are all separate devices. As shown in FIG. 17B the controlled device 14 and the control device 16 may be grouped together as one device, interacting with the energy measurement device 50. As shown in FIG. 17C, the control device and their energy measurement device may be group together as a single device interacting with the controlled device 14. As shown in FIG. 17D, the controlled device 14 and the energy measurement device 50 may be group together as a single device interacting with the control device 16. Finally, as shown in FIG. 17E, the control device 16, the control device 16, and the energy measurement device 50, are all group does a single device.

FIG. 17F shows a networking diagram graphically illustrating the interactions between an exemplary control device, energy measurement device, and a comparison server 60 according to some embodiments. The energy measurement device 50 broadcast 1752 its presence on the network and is subsequently discovered 1754 by the control device 16. The control device 16 request a list of identified controlled devices 1756. The energy measurement device 50 sends 1758 the list of identified controlled devices 16 to the control device 16. The list of identified controlled devices 16 is displayed 1760 at the control device. User input is received selecting one or more of the list of identified controlled devices 16. The association between the control device 16 and the one or more energy measurement devices 50 is stored at the control device 16. Energy consumption information is requested 1766 by the control device 16 from the energy measurement device 50. Energy consumption information is sent 1768 from the energy measurement device 50 to the control device 16. Energy consumption information is sent from the control device 16 to the comparison server device 60. In some embodiments, the energy consumption information is collected 1765 asynchronously at the energy measurement device 50.

In some embodiments, the association(s) between the control device 16 and the one or more energy measurement devices 50 is stored at the comparison server device 60 and the energy consumption information is sent from the energy measurement device 50 to the comparison server device 60 without transmission to the control device 16.

FIG. 18 is a block diagram of a computing device according to one embodiment of the present disclosure. As illustrated, the computing device 20 includes a controller 1804 connected to memory 1806, one or more communications interfaces 1808, one or more user interface components 1810, one or more storage components 1812, and a location component 1814 by a bus 1802 or similar mechanism. The controller 1804 is a microprocessor, digital ASIC, FPGA, or the like. In general, the computing device 20 includes a control system 21 having associated memory 1806. In this embodiment, the controller 1804 is a microprocessor, and the user interface (UI) module 22, communications module 23, reporting module 24, and configuration module 25 are implemented in software and stored in the memory 1806 for execution by the controller 1804. However, the present disclosure is not limited thereto. The aforementioned functions and module may be implemented in software, hardware, or a combination thereof. The computing device 20 also includes a communication interface 1808 enabling the computing device 20 to connect to the network 15. The one or more user interface components 1810 include, for example, a touchscreen, a display, one or more user input components (e.g., a keypad), a speaker, or the like, or any combination thereof. The storage component(s) 1812 is a non-volatile memory. In this embodiment, the location component 1814 is a hardware component, such as a GPS receiver. However, the present invention is not limited thereto.

FIG. 19 is a block diagram of a thermostat device 30 according to one embodiment of the present disclosure. As illustrated, the thermostat device 30 includes a controller 1904 connected to memory 1906, one or more communications interfaces 1908, one or more user interface components 1910, one or more storage components 1912 by a bus 1902 or similar mechanism. The controller 1904 is a microprocessor, digital ASIC, FPGA, or the like. In general, the thermostat device 30 includes a control system 31 having associated memory 1906. In this embodiment, the controller 1904 is a microprocessor, and the and the UI module 32, sensing module 33, monitoring module 34, and communications module 35 are implemented in software and stored in the memory 1906 for execution by the controller 1904. However, the present disclosure is not limited thereto. The aforementioned modules may be implemented in software, hardware, or a combination thereof. The thermostat device 30 also includes a communication interface 1908 enabling the reference thermostat device 30 to connect to the network 15. The one or more user interface components 1910 include, for example, a touchscreen, a display, one or more user input components (e.g., a keypad), a speaker, or the like, or any combination thereof. The storage component(s) 1912 is a non-volatile memory.

FIG. 20 is a block diagram of a hub device 40 according to one embodiment of the present disclosure. As illustrated, the hub device 40 includes a controller 2004 connected to memory 2006, one or more communications interfaces 2008, one or more user interface components 2010, one or more storage components 2012 by a bus 2002 or similar mechanism. The controller 2004 is a microprocessor, digital ASIC, FPGA, or the like. In general, the hub device 40 includes a control system 41 having associated memory 2006. In this embodiment, the controller 2004 is a microprocessor, and the monitoring module 42, communication module 43, and configuration module 44 are implemented in software and stored in the memory 2006 for execution by the controller 2004. However, the present disclosure is not limited thereto. The aforementioned modules may be implemented in software, hardware, or a combination thereof. The hub device 40 also includes a communication interface 2008 enabling the reference hub device 40 to connect to the network 15. The one or more user interface components 2010 include, for example, a touchscreen, a display, one or more user input components (e.g., a keypad), a speaker, or the like, or any combination thereof. The storage component(s) 2012 is a non-volatile memory.

FIG. 21 is a block diagram of an energy measurement device 50 according to one embodiment of the present disclosure. As illustrated, the energy measurement device 50 includes a controller 2104 connected to memory 2106, one or more communications interfaces 2108, one or more user interface components 2110, one or more storage components 2112 by a bus 2102 or similar mechanism. The controller 2104 is a microprocessor, digital ASIC, FPGA, or the like. In general, the energy measurement device 50 includes a control system 51 having associated memory 2106. In this embodiment, the controller 2104 is a microprocessor, and the monitoring module 52, communications module 53, and a configuration module 54 is implemented in software and stored in the memory 2106 for execution by the controller 2104. However, the present disclosure is not limited thereto. The aforementioned modules may be implemented in software, hardware, or a combination thereof. The energy measurement device 50 also includes a communication interface 2108 enabling the reference energy measurement device 50 to connect to the network 15 (FIG. 1A). The one or more user interface components 2110 include, for example, a touchscreen, a display, one or more user input components (e.g., a keypad), a speaker, or the like, or any combination thereof. The storage component(s) 2112 is a non-volatile memory.

FIG. 22 is a block diagram of a comparison server device 60 according to an embodiment of the present disclosure. As illustrated, comparison server device 60 includes a controller 2204 connected to a memory 2206, one or more secondary storage components 2212, and one or more communications interfaces 2208 by a bus 2202 or similar mechanism. The controller 2204 is a microprocessor, digital Application Specific Integrated Circuit ASIC, Field Programmable Gate Array FPGA, or the like. In general, the comparison server device 60 includes a control system 61 having associated memory 2206. In this embodiment, the controller 2204 is a microprocessor, and the comparison module 62 is implemented in software and stored in the memory 2206 for execution by the controller 2204. However, the present disclosure is not limited thereto. The aforementioned module may be implemented in software, hardware, or a combination thereof. Further, the user repository 400, dwelling repository 412, thermostat device repository 440, and energy measurement device repository 467 may be stored in the one or more secondary storage components 2212. The secondary storage components 2212 are digital data storage components such as, for example, one or more hard disk drives. The comparison server device 60 also includes a communication interface 2208 enabling the comparison server device 60 to connect to the network 15.

In another embodiment of the present disclosure, the principles described herein are applied to water consumption as opposed to energy consumption. A dwelling has a networked connected water meter. The water meter is paired with a water consumption meter as opposed to an energy measurement device. A user is able to receive information indicating their water consumption in real-time, and the comparison server may compute an ecorank based on water consumption in relative to a comparison group. Alternatively, a user may specify a desired ecorank as it pertains to water use, and the water meter acts in conjunction with the comparison server device to try and achieve that target. The water meter, as instructed by the comparison server may restrict flow to landscape watering for example, to reduce the amount of water consumed at a dwelling. Likewise, it may cut off water to the dwelling altogether if the dwelling is not on schedule to meet its target ecorank. In a more sophisticated system, with additional controls, the water may be cut off to outside spigots, showers, baths, washing machines, and the like, but remain on and in use for flushing toilets, drinking taps, and other critical items.

In another embodiment of the present disclosure, the thermostat device is replaced with a general purpose control device. The control device is operable to control any number of subsystems within the dwelling, and to communicate with one or more energy measurement devices 50. The control device may be used to set an ecorank target, and the control device and comparison server device 60 work in tandem to control the energy consumption throughout the dwelling to meet or exceed the ecorank target.

Those skilled in the art will recognize improvements and modifications to the embodiments of the present disclosure. All such improvements and modifications are considered within the scope of the concepts disclosed herein and the claims that follow.

What is claimed is:

1. A server device comprising:
   a communications interface operable to:
      couple the server device to a plurality of thermostat devices, wherein each thermostat device of the plurality of thermostat devices controls a climate system;
   a processor and memory coupled with the communications interface and operable to:
      receive usage information from the plurality of thermostat devices, the usage information comprising first usage information of a first climate system controlled by a first thermostat device of the plurality of thermostat devices and other usage information of other climate systems controlled by other thermostat devices of the plurality of thermostat devices;
      determine ecorank information based on the usage information, the ecorank information comprising information reflecting a real-time comparison of the first usage information to the other usage information, the first usage information and the other usage information collected over a period of time including a current time; and
      send, to the first thermostat device, the ecorank information.

2. The server device of claim 1 further comprising:
   the processor and memory in determining the ecorank information further operable to:
      determine actual ecorank information based on the usage information;
      determine predicted ecorank information based on one or more of a pattern detected in the usage information and a climate system setting; and
      determine the ecorank information based on the actual ecorank information and the predicted ecorank information.

3. The server device of claim 1 further comprising:
   the processor and the memory, in sending the ecorank information, further operable to:
      in response to receiving the usage information from the first thermostat device:
         determine, in real-time, the ecorank information for the first thermostat device; and
         send, in real-time, to the first thermostat device, the ecorank information.

4. The server device of claim 1 wherein the usage information includes energy consumption information and the ecorank information further comprises information reflecting a comparison of energy consumption of the climate system controlled by the first thermostat device in comparison to other energy consumption of other climate systems controlled by other of the plurality of thermostat devices.

5. The server device of claim 1 wherein the climate system comprises one or more climate system components, the one or more climate system components comprising one or more of a heating component, a cooling component, a fan component, a humidification component, and a dehumidification component, and the one or more climate system components are fueled by one or more of electricity, gas, oil, wood, and coal.

6. The server device of claim 1 wherein the usage information further comprises a climate system setting, the climate system setting comprising one or more of a heat setting, cool setting, fan setting, a humidifier setting, and an ecorank target setting.

7. The server device of claim 6 further comprising:
   the processor and the memory associated with the communications interface and operable to:
      receive, from a first computing device associated with the first thermostat device, the climate system setting; and
      send to the first thermostat device, information reflecting the climate system setting.

8. The server device of claim 1 wherein receiving usage information comprises receiving one or more of heating component usage information, cooling component usage information, fan component usage information, humidification component usage information, and dehumidification component usage information.

9. The server device of claim 1 wherein receiving usage information comprises receiving one or more of heating component energy consumption information, cooling component energy consumption information, fan component energy consumption information, humidification component energy consumption information, and dehumidification component energy consumption information.

10. The server device of claim 1 further comprising:
the processor and the memory capable of determining the ecorank information and further operable to:
receive profile information from the plurality of thermostat devices;
determine, based on the profile information, a comparison group for the first thermostat device;
perform a comparison of the usage information from the first thermostat device to the usage information of the comparison group; and
determine, based on the comparison, the ecorank information.

11. The server device of claim 10 wherein the comparison group is chosen from the group consisting of: one of the plurality of thermostat devices, some of the plurality of thermostat devices and all of the plurality of thermostat devices.

12. The server device of claim 10 wherein the profile information is comprised of one or more of:
a geographical location of a dwelling associated with a one of the plurality of thermostat devices,
a size of the dwelling associated with a one of the plurality of thermostat devices,
a format of the dwelling associated with a one of the plurality of thermostat devices,
a number of floors in the dwelling associated with a one of the plurality of thermostat devices,
a number of occupants living in the dwelling associated with a one of the plurality of thermostat devices, and
a social group associated with a user of a one of the plurality of thermostat devices.

13. The server device of claim 10 wherein the comparison group is one of a symmetric group and an asymmetric group, wherein the symmetric group is defined as a group where if entity A is in entity B's group, then entity B is in entity A's group, and wherein the asymmetric group is defined as a group where entity A is in entity B's group, but entity B is not in entity A's group.

14. The server device of claim 10 further comprising:
the processor and the memory further operable to:
receive updated profile information from one of the plurality of thermostat devices;
determine an updated comparison group based on the updated profile information;
perform an updated comparison of the usage information for the updated comparison group;
determine an updated ecorank based on the updated comparison; and
send, to the first thermostat device, updated ecorank information.

15. The server device of claim 1 further comprising:
the processor and the memory, wherein to send the ecorank information, further operable to:
receive energy consumption information from an energy measurement device associated with a climate system component controlled by the first thermostat device; and
determining the ecorank information based on the energy consumption information.

16. The server device of claim 1 wherein the usage information comprises one or more of a cooling component on event, a cooling component off event, a heating component on event, a heating component off event, a fan component on event, a fan component off event, a humidification component off event, and a humidification component off event.

17. The server device of claim 1 wherein the ecorank information is one or more of a numerical score, percentage, graphic, icon, color, letter, ecorank trend indicator, audio item, and a video item.

18. The server device of claim 1 further comprising:
the processor and the memory associated with the communications interface and further operable to:
receive updated usage information from one or more of the plurality of thermostat devices;
perform an updated comparison of the updated usage information;
determine updated ecorank information based on the updated comparison; and
send, to the first thermostat device, the updated ecorank information.

19. The server device of claim 1 further comprising:
the processor and the memory, capable of sending the ecorank information, further operable to:
receive a request for the ecorank information from the first thermostat device; and
send, to the first thermostat device, the ecorank.

20. The server device of claim 1 further comprising:
the processor and the memory, capable of sending the ecorank information, further operable to:
send, to the first thermostat device at a time designated by the server device, the ecorank information.

21. The server device of claim 1 wherein the ecorank information is determined based on a temporal comparison window, the temporal comparison window being N days in length and being repositioned by the server device on a daily basis.

22. The server device of claim 1 wherein the ecorank information is determined based on a temporal comparison window, the temporal comparison window being N days in length and being moved by the server device at an end of the N days.

23. The server device of claim 1 further comprising:
the processor and the memory further operable to:
provide access to the ecorank information to a social network server operating a social network associated with a first user of the first thermostat device.

24. The server device of claim 1 further comprising:
the processor and the memory further operable to:
receive a ecorank target setting from the first thermostat device; and
send updated climate system settings to the first thermostat device.

25. The server device of claim 24 further comprising:
the processor and the memory further operable to:
receive a priority mode setting indicating eco priority mode; and
modify the priority mode of the first thermostat device based on the priority mode setting.

26. The server device of claim 24 further comprising:
the processor and the memory, capable of determining the updated climate system settings, further operable to:
determine a target position in a comparison group based on the ecorank target setting;
determine an energy savings needed to achieve the target position;
determine information reflecting a time period over which the target position is to be achieved; and determine climate system settings based on the information reflecting the time period and the energy savings needed.

27. The server device of claim 1 further comprising:
the processor and the memory, capable of receiving the usage information, further operable to:
receive first usage information from the first thermostat device from a hub device.

28. The server device of claim 27 wherein the first usage information is received at the hub device from the first thermostat device over a first communication protocol and the first usage information is received at the server device from the hub device over a second, different communication protocol.

29. The server device of claim 1 further comprising:
the processor and the memory capable of sending the ecorank information and further operable to:
send, to a computing device of a first user associated with the first thermostat device, the ecorank information.

30. A computer implemented method of operating a server device comprising:
receiving usage information from a plurality of thermostat devices, the usage information comprising first usage information of a first climate system controlled by a first thermostat device of the plurality of thermostat devices and other usage information of other climate systems controlled by other thermostat devices of the plurality of thermostat devices;
determining ecorank information based on the usage information, the ecorank information comprising information reflecting a real-time comparison of the first usage information to the other usage information, the first usage information and the other usage information collected over a period of time including a current time; and
sending, to first thermostat device, the ecorank information.

31. A non-transitory computer readable medium storing program codes that when executed instruct a microprocessor of a server device to:
receive usage information from a plurality of thermostat devices, the usage information comprising first usage information of a first climate system controlled by a first thermostat device of the plurality of thermostat devices and other usage information of other climate systems controlled by other thermostat devices of the plurality of thermostat devices;
determine ecorank information based on the usage information, the ecorank information comprising information reflecting a real-time comparison of the first usage information to the other usage information, the first usage information and the other usage information collected over a period of time including a current time; and
send, to first thermostat device, the ecorank information.

* * * * *